US012596738B2

(12) United States Patent
Bhat et al.

(10) Patent No.: US 12,596,738 B2
(45) Date of Patent: Apr. 7, 2026

(54) EXPLAINABLE LARGE LANGUAGE MODEL ROUTING WITH IMMUTABLE AUDIT TRAILS

(71) Applicant: Citibank, N.A., New York, NY (US)

(72) Inventors: Ganesh Prasad Bhat, New Jersey, NY (US); Zheyu Wang, Shanghai (CN); Haolin Jin, Shanghai (CN); Sourabh Deb, Tampa, FL (US); Jason Ryan Engelbrecht, London (GB); Payal Jain, London (GB); Tariq Husayn Maonah, London (GB); Mariusz Saternus, Cracow (PL); Daniel Lewandowski, Cracow (PL); Biraj Krushna Rath, London (GB); Stuart Murray, London (GB); Philip Davies, London (GB); Julisia Jackson, Irving, TX (US); Chamindra Desilva, London (GB); Shardul Malviya, London (GB); Wayne Liao, London (GB); Deepak Jain, London (GB); Samantha Cory, London (GB); Vishal Mysore, Mississauga (CA); Ramkumar Ayyadurai, Jersey City, NJ (US); James Myers, Clearwater, FL (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/313,684

(22) Filed: Aug. 28, 2025

(65) Prior Publication Data
US 2025/0384072 A1      Dec. 18, 2025

Related U.S. Application Data

(63) Continuation-in-part of application No. 19/309,601, filed on Aug. 25, 2025, which is a
(Continued)

(51) Int. Cl.
*G06F 16/338* (2019.01)
*G06F 16/383* (2019.01)

(52) U.S. Cl.
CPC .......... *G06F 16/338* (2019.01); *G06F 16/383* (2019.01)

(58) Field of Classification Search
CPC .................................................... G06F 16/338
See application file for complete search history.

(56) References Cited

U.S. PATENT DOCUMENTS 5,423,041 A      6/1995  Burke et al.
5,586,218 A     12/1996  Allen
(Continued)

FOREIGN PATENT DOCUMENTS

CN       106502890 A      3/2017
WO      2021160499 A1     8/2021
WO      2022125803 A1     6/2022
WO      2024020416 A1     1/2024

OTHER PUBLICATIONS

AI Risk Management Framework NIST, retrieved on Jun. 17, 2024, https://www.nist.gov/itl/ai-risk-management-framework.
(Continued)

*Primary Examiner* — Van H Oberly
(74) *Attorney, Agent, or Firm* — Perkins Coie LLP

(57) ABSTRACT

Systems for explainable large language model routing with immutable audit trails are disclosed. The system receives a query and determines its characteristics including complexity, domain, regulatory constraints, and performance requirements. It retrieves profiles for multiple LLMs from a model matrix containing performance attributes, resource consumption, and compliance parameters. The system selects a particular LLM by balancing resource consumption with performance requirements, evaluating regulatory compliance, ranking LLMs based on these factors, and priori-
(Continued)

tizing models with successful processing history. The system generates a human-readable explanation of the selection including decision factors, rationale, and alternatives considered. Finally, it records the selection and explanation in a tamper-evident, immutable audit trail data structure.

20 Claims, 15 Drawing Sheets

Related U.S. Application Data continuation-in-part of application No. 19/301,756, filed on Aug. 15, 2025, application No. 19/313,684 is a continuation-in-part of application No. 19/227,442, filed on Jun. 3, 2025, which is a continuation of application No. 19/061,848, filed on Feb. 24, 2025, now Pat. No. 12,339,886, which is a continuation-in-part of application No. 18/983,342, filed on Dec. 17, 2024, now Pat. No. 12,450,494, said application No. 19/301,756 is a continuation-in-part of application No. 18/812,913, filed on Aug. 22, 2024, said application No. 19/061,848 is a continuation-in-part of application No. 18/661,532, filed on May 10, 2024, now Pat. No. 12,111,747, said application No. 18/812,913 is a continuation-in-part of application No. 18/661,532, filed on May 10, 2024, now Pat. No. 12,111,747, which is a continuation-in-part of application No. 18/661,519, filed on May 10, 2024, now Pat. No. 12,106,205, said application No. 18/983,342 is a continuation-in-part of application No. 18/653,858, filed on May 2, 2024, now Pat. No. 12,198,030, which is a continuation-in-part of application No. 18/637,362, filed on Apr. 16, 2024, now Pat. No. 12,111,754, said application No. 18/661,532 is a continuation-in-part of application No. 18/633,293, filed on Apr. 11, 2024, now Pat. No. 12,147,513.

(56) References Cited

U.S. PATENT DOCUMENTS

| | | | |
|---|---|---|---|
| 5,671,361 | A | 9/1997 | Brown et al. |
| 6,169,981 | B1 | 1/2001 | Werbos |
| 6,208,720 | B1 | 3/2001 | Curtis et al. |
| 6,473,748 | B1 | 10/2002 | Archer |
| 6,546,545 | B1 | 4/2003 | Honarvar et al. |
| 6,587,846 | B1 | 7/2003 | Lamuth |
| 7,313,552 | B2 | 12/2007 | Lorenz et al. |
| 7,669,133 | B2 | 2/2010 | Chikirivao et al. |
| 7,822,621 | B1 | 10/2010 | Chappel |
| 7,984,513 | B1 | 7/2011 | Kyne et al. |
| 8,347,147 | B2 | 1/2013 | Adiyapatham et al. |
| 8,380,817 | B2 | 2/2013 | Okada |
| 8,387,020 | B1 | 2/2013 | Maclachlan et al. |
| 8,572,552 | B2 | 10/2013 | Kennaley |
| 8,656,343 | B2 | 2/2014 | Fox et al. |
| 8,930,298 | B2 | 1/2015 | Demuth et al. |
| 9,020,872 | B2 | 4/2015 | Junker |
| 9,215,212 | B2 | 12/2015 | Reddy et al. |
| 9,251,466 | B2 | 2/2016 | Rajesh |
| 9,842,045 | B2 | 12/2017 | Heorhiadi et al. |
| 9,858,828 | B1 | 1/2018 | Fuka |
| 10,157,355 | B2 | 12/2018 | Johnson et al. |
| 10,276,170 | B2 | 4/2019 | Gruber et al. |
| 10,324,827 | B2 | 6/2019 | Narayanan et al. |
| 10,438,212 | B1 | 10/2019 | Jilani et al. |
| 10,554,738 | B1 | 2/2020 | Ren |
| 10,607,141 | B2 | 3/2020 | Jerram et al. |
| 10,620,988 | B2 | 4/2020 | Lauderdale et al. |
| 10,755,103 | B2 | 8/2020 | Chang et al. |
| 10,764,150 | B1 | 9/2020 | Hermoni et al. |
| 10,943,067 | B1 | 3/2021 | Brown et al. |
| 10,949,337 | B1 | 3/2021 | Yalla et al. |
| 10,951,485 | B1 | 3/2021 | Hermoni et al. |
| 11,042,647 | B1 | 6/2021 | Joyce et al. |
| 11,074,107 | B1 | 7/2021 | Nandakumar |
| 11,106,801 | B1 | 8/2021 | Levine et al. |
| 11,133,942 | B1 | 9/2021 | Griffin |
| 11,153,177 | B1 | 10/2021 | Hermoni et al. |
| 11,164,078 | B2 | 11/2021 | Jin et al. |
| 11,227,047 | B1 | 1/2022 | Vashisht et al. |
| 11,227,187 | B1 | 1/2022 | Weinberger |
| 11,271,822 | B1 | 3/2022 | Hermoni et al. |
| 11,315,196 | B1 | 4/2022 | Narayan et al. |
| 11,328,068 | B1 | 5/2022 | Niedzwiedz et al. |
| 11,410,136 | B2 | 8/2022 | Cook et al. |
| 11,436,777 | B1 | 9/2022 | Karli et al. |
| 11,449,798 | B2 | 9/2022 | Olgiati et al. |
| 11,470,106 | B1 | 10/2022 | Lin et al. |
| 11,481,553 | B1 | 10/2022 | Durvasula et al. |
| 11,503,075 | B1 | 11/2022 | Sirianni et al. |
| 11,516,158 | B1 | 11/2022 | Luzhnica et al. |
| 11,516,222 | B1 | 11/2022 | Srinivasan et al. |
| 11,531,943 | B1 | 12/2022 | Kumar |
| 11,562,078 | B2 | 1/2023 | Sabourin et al. |
| 11,573,848 | B2 | 2/2023 | Linck et al. |
| 11,586,436 | B1 | 2/2023 | Jennings |
| 11,593,390 | B2 | 2/2023 | Sundel |
| 11,636,027 | B2 | 4/2023 | Sloane |
| 11,652,839 | B1 | 5/2023 | Aloisio et al. |
| 11,656,852 | B2 | 5/2023 | Mazurskiy |
| 11,663,409 | B2 | 5/2023 | Terry et al. |
| 11,663,662 | B2 | 5/2023 | Chen et al. |
| 11,676,685 | B2 | 6/2023 | Jaganathan et al. |
| 11,681,610 | B2 | 6/2023 | Chang et al. |
| 11,681,811 | B1 | 6/2023 | Dixit |
| 11,683,333 | B1 | 6/2023 | Dominessy et al. |
| 11,706,241 | B1 | 7/2023 | Cross et al. |
| 11,709,757 | B1 | 7/2023 | Kurian et al. |
| 11,720,686 | B1 | 8/2023 | Cross et al. |
| 11,734,418 | B1 | 8/2023 | Epstein |
| 11,734,591 | B2 | 8/2023 | Turner et al. |
| 11,741,226 | B2 | 8/2023 | Dixit |
| 11,750,717 | B2 | 9/2023 | Walsh et al. |
| 11,765,100 | B1 | 9/2023 | Sloane et al. |
| 11,803,792 | B2 | 10/2023 | Makhija et al. |
| 11,811,730 | B1 | 11/2023 | Kandasamy et al. |
| 11,823,108 | B1 | 11/2023 | Bradbury et al. |
| 11,842,408 | B1 | 12/2023 | Martinez et al. |
| 11,853,735 | B1 | 12/2023 | Choudhury et al. |
| 11,874,934 | B1 | 1/2024 | Rao et al. |
| 11,875,123 | B1 | 1/2024 | Ben David et al. |
| 11,875,130 | B1 | 1/2024 | Bosnjakovic et al. |
| 11,915,152 | B2 | 2/2024 | Baker |
| 11,924,027 | B1 | 3/2024 | Mysore et al. |
| 11,947,435 | B2 | 4/2024 | Boulineau et al. |
| 11,960,386 | B2 | 4/2024 | Indani et al. |
| 11,960,515 | B1 | 4/2024 | Pallakonda et al. |
| 11,983,806 | B1 | 5/2024 | Ramesh et al. |
| 11,990,139 | B1 | 5/2024 | Sandrew |
| 11,995,412 | B1 | 5/2024 | Mishra |
| 12,001,463 | B1 | 6/2024 | Pallakonda et al. |
| 12,007,963 | B1 | 6/2024 | Rajagopalan et al. |
| 12,026,599 | B1 | 7/2024 | Lewis et al. |
| 12,028,368 | B1 | 7/2024 | Cohen et al. |
| 12,088,611 | B1 | 9/2024 | Lin et al. |
| 12,094,010 | B1 | 9/2024 | Hampapur et al. |
| 12,106,205 | B1 | 10/2024 | Jain et al. |
| 12,111,747 | B1 | 10/2024 | Jain et al. |
| 12,111,754 | B1 | 10/2024 | Mysore et al. |
| 12,131,819 | B1 | 10/2024 | Murray et al. |
| 12,135,949 | B1 | 11/2024 | Cameron et al. |
| 12,147,513 | B1 | 11/2024 | Jain et al. |
| 12,149,553 | B1 | 11/2024 | Fly et al. |
| 12,149,558 | B1 | 11/2024 | Brown et al. |
| 12,155,781 | B1 | 11/2024 | Helfgott et al. |
| 12,182,258 | B2 | 12/2024 | Stokes et al. |
| 12,198,030 | B1 | 1/2025 | Mysore et al. |
| 2003/0007178 | A1 | 1/2003 | Jeyachandran et al. |
| 2004/0098454 | A1 | 5/2004 | Trapp et al. |

(56) References Cited

U.S. PATENT DOCUMENTS

| | | |
|---|---|---|
| 2005/0166094 A1 | 7/2005 | Blackwell et al. |
| 2005/0204348 A1 | 9/2005 | Horning et al. |
| 2006/0095918 A1 | 5/2006 | Hirose |
| 2007/0067848 A1 | 3/2007 | Gustave et al. |
| 2010/0275263 A1 | 10/2010 | Bennett et al. |
| 2010/0313189 A1 | 12/2010 | Beretta et al. |
| 2012/0161940 A1 | 6/2012 | Taylor |
| 2014/0137257 A1 | 5/2014 | Martinez et al. |
| 2014/0258998 A1 | 9/2014 | Adl-Tabatabai et al. |
| 2016/0103996 A1 | 4/2016 | Salajegheh et al. |
| 2017/0061132 A1 | 3/2017 | Hovor et al. |
| 2017/0262164 A1 | 9/2017 | Jain et al. |
| 2017/0279826 A1 | 9/2017 | Mohanty et al. |
| 2017/0295197 A1 | 10/2017 | Parimi et al. |
| 2018/0020021 A1 | 1/2018 | Gilmore et al. |
| 2018/0089252 A1 | 3/2018 | Long et al. |
| 2018/0095866 A1 | 4/2018 | Narayanan et al. |
| 2018/0239903 A1 | 8/2018 | Bodin et al. |
| 2018/0343114 A1 | 11/2018 | Ben-Ari |
| 2019/0079854 A1 | 3/2019 | Lassance Oliveira E Silva et al. |
| 2019/0188706 A1 | 6/2019 | Mccurtis |
| 2019/0236661 A1 | 8/2019 | Hogg et al. |
| 2019/0286816 A1 | 9/2019 | Fu |
| 2020/0012493 A1 | 1/2020 | Sagy |
| 2020/0043164 A1 | 2/2020 | Fuchs et al. |
| 2020/0074470 A1 | 3/2020 | Deshpande et al. |
| 2020/0133711 A1 | 4/2020 | Webster et al. |
| 2020/0153855 A1 | 5/2020 | Kirti et al. |
| 2020/0219009 A1 | 7/2020 | Dao et al. |
| 2020/0233979 A1 | 7/2020 | Tahmasebi Maraghoosh et al. |
| 2020/0259852 A1 | 8/2020 | Wolff et al. |
| 2020/0309767 A1 | 10/2020 | Loo et al. |
| 2020/0314191 A1 | 10/2020 | Madhavan et al. |
| 2020/0334326 A1 | 10/2020 | Zhang et al. |
| 2020/0349054 A1 | 11/2020 | Dai et al. |
| 2020/0380118 A1 | 12/2020 | Miller et al. |
| 2020/0387608 A1 | 12/2020 | Miller et al. |
| 2021/0012486 A1 | 1/2021 | Huang et al. |
| 2021/0049288 A1 | 2/2021 | Li |
| 2021/0089941 A1 | 3/2021 | Chen et al. |
| 2021/0097433 A1 | 4/2021 | Olgiati et al. |
| 2021/0133182 A1 | 5/2021 | Anderson et al. |
| 2021/0173935 A1 | 6/2021 | Ramasamy et al. |
| 2021/0185094 A1 | 6/2021 | Waplington et al. |
| 2021/0211431 A1 | 7/2021 | Albero et al. |
| 2021/0256125 A1 | 8/2021 | Miller et al. |
| 2021/0264547 A1 | 8/2021 | Li |
| 2021/0273957 A1 | 9/2021 | Boyer et al. |
| 2021/0390465 A1 | 12/2021 | Werder et al. |
| 2022/0050928 A1 | 2/2022 | Shukla et al. |
| 2022/0114251 A1 | 4/2022 | Guim Bernat et al. |
| 2022/0114399 A1 | 4/2022 | Castiglione et al. |
| 2022/0147636 A1 | 5/2022 | Mahuli et al. |
| 2022/0179906 A1 | 6/2022 | Desai et al. |
| 2022/0198304 A1 | 6/2022 | Szczepanik et al. |
| 2022/0263843 A1 | 8/2022 | Aslam et al. |
| 2022/0263855 A1 | 8/2022 | Engelberg et al. |
| 2022/0263860 A1 | 8/2022 | Crabtree et al. |
| 2022/0278889 A1 | 9/2022 | Malleshaiah et al. |
| 2022/0286438 A1 | 9/2022 | Burke et al. |
| 2022/0286474 A1 | 9/2022 | Kuppa et al. |
| 2022/0294789 A1 | 9/2022 | Tikhomirov et al. |
| 2022/0294810 A1 | 9/2022 | Tyagi et al. |
| 2022/0303300 A1 | 9/2022 | Egan |
| 2022/0303302 A1 | 9/2022 | Hwang et al. |
| 2022/0303352 A1 | 9/2022 | Herzog et al. |
| 2022/0311681 A1 | 9/2022 | Palladino et al. |
| 2022/0318654 A1 | 10/2022 | Lin et al. |
| 2022/0327620 A1 | 10/2022 | Ndoutoumou |
| 2022/0334818 A1 | 10/2022 | Mcfarland |
| 2022/0342846 A1 | 10/2022 | Kunchakarra et al. |
| 2022/0345457 A1 | 10/2022 | Jeffords et al. |
| 2022/0358023 A1 | 11/2022 | Moser et al. |
| 2022/0366140 A1 | 11/2022 | Saito et al. |
| 2022/0368728 A1 | 11/2022 | Murray et al. |
| 2022/0377093 A1 | 11/2022 | Crabtree et al. |
| 2022/0398149 A1 | 12/2022 | Mcfarland et al. |
| 2022/0400135 A1 | 12/2022 | Gamra |
| 2022/0414213 A1 | 12/2022 | Dixit |
| 2022/0414536 A1 | 12/2022 | M L et al. |
| 2022/0417274 A1 | 12/2022 | Madanahalli et al. |
| 2023/0007039 A1 | 1/2023 | Waplington |
| 2023/0009999 A1 | 1/2023 | Higuchi et al. |
| 2023/0019072 A1 | 1/2023 | Okunlola |
| 2023/0028339 A1 | 1/2023 | Sloane |
| 2023/0032686 A1 | 2/2023 | Williams et al. |
| 2023/0033317 A1 | 2/2023 | Lin et al. |
| 2023/0035321 A1 | 2/2023 | Vijayaraghavan |
| 2023/0039855 A1 | 2/2023 | Greene |
| 2023/0044102 A1 | 2/2023 | Anderson et al. |
| 2023/0052608 A1 | 2/2023 | Wattiau et al. |
| 2023/0067128 A1 | 3/2023 | Engelberg et al. |
| 2023/0071264 A1 | 3/2023 | Hakala et al. |
| 2023/0076372 A1 | 3/2023 | Engelberg et al. |
| 2023/0076795 A1 | 3/2023 | Indani et al. |
| 2023/0077527 A1 | 3/2023 | Sarkar |
| 2023/0109021 A1 | 4/2023 | Curtin et al. |
| 2023/0113621 A1 | 4/2023 | Griffin et al. |
| 2023/0114719 A1 | 4/2023 | Thomas et al. |
| 2023/0117962 A1 | 4/2023 | Kaimal et al. |
| 2023/0118388 A1 | 4/2023 | Crabtree et al. |
| 2023/0123314 A1 | 4/2023 | Crabtree et al. |
| 2023/0132703 A1 | 5/2023 | Marsenic et al. |
| 2023/0135660 A1 | 5/2023 | Chapman et al. |
| 2023/0148116 A1 | 5/2023 | Stokes et al. |
| 2023/0164158 A1 | 5/2023 | Fellows et al. |
| 2023/0169397 A1 | 6/2023 | Smith et al. |
| 2023/0171282 A1 | 6/2023 | Bollinger |
| 2023/0177441 A1 | 6/2023 | Durvasula et al. |
| 2023/0177613 A1 | 6/2023 | Crabtree et al. |
| 2023/0186175 A1 | 6/2023 | Usatov et al. |
| 2023/0205888 A1 | 6/2023 | Tyagi et al. |
| 2023/0205891 A1 | 6/2023 | Yellapragada et al. |
| 2023/0208869 A1 | 6/2023 | Bisht et al. |
| 2023/0208870 A1 | 6/2023 | Yellapragada et al. |
| 2023/0208871 A1 | 6/2023 | Yellapragada et al. |
| 2023/0229542 A1 | 7/2023 | Watkins et al. |
| 2023/0252393 A1 | 8/2023 | Orzechowski et al. |
| 2023/0259860 A1 | 8/2023 | Sarkar |
| 2023/0269272 A1 | 8/2023 | Dambrot et al. |
| 2023/0274003 A1 | 8/2023 | Liu et al. |
| 2023/0359789 A1 | 11/2023 | Andre et al. |
| 2023/0362200 A1 | 11/2023 | Crabtree et al. |
| 2023/0396641 A1 | 12/2023 | Hebbagodi et al. |
| 2023/0412635 A1 | 12/2023 | Binyamini et al. |
| 2024/0012734 A1 | 1/2024 | Lee et al. |
| 2024/0020538 A1 | 1/2024 | Socher et al. |
| 2024/0054233 A1 | 2/2024 | Ohayon et al. |
| 2024/0054249 A1 | 2/2024 | Loubet Moundi et al. |
| 2024/0095077 A1 | 3/2024 | Singh et al. |
| 2024/0129345 A1 | 4/2024 | Kassam et al. |
| 2024/0144082 A1 | 5/2024 | Tarapov et al. |
| 2024/0202442 A1 | 6/2024 | Saito et al. |
| 2024/0256678 A1 | 8/2024 | Thompson |
| 2024/0346283 A1 | 10/2024 | Ayachitula et al. |
| 2024/0364749 A1 | 10/2024 | Crabtree et al. |
| 2024/0370476 A1 | 11/2024 | Madisetti et al. |
| 2024/0403428 A1 | 12/2024 | Lal et al. |
| 2024/0403437 A1 | 12/2024 | Szigeti et al. |
| 2024/0403445 A1 | 12/2024 | Straub et al. |
| 2024/0406145 A1 | 12/2024 | Crabtree et al. |
| 2024/0411896 A1 | 12/2024 | Myers et al. |
| 2024/0414211 A1 | 12/2024 | Boyer et al. |
| 2025/0005303 A1* | 1/2025 | Gray ..................... G06F 40/56 |

OTHER PUBLICATIONS

Empower Your Team with a Compliance Co-Pilot, Sedric, retrieved on Sep. 25, 2024. https://www.sedric.ai/.

Independent analysis of AI language models and API providers. Artificial Analysis, retrieved on Jun. 13, 2024, https://artificialanalysis. ai/, 11 pages.

(56) References Cited

OTHER PUBLICATIONS

What is AI Verify?, AI Verify Foundation, Jun. 11, 2024, 3 pages, https://aiverifyfoundation.sg/.

Agarwal et al., How generative AI can help banks manage risk and compliance, Mckinsey & Company, Mar. 2024; Total Pages: 8 (Year: 2024).

Aka et al., Measuring Model Biases in the Absence of Ground Truth, AIES '21, May 19-21, 2021, Virtual Event, USA.; pp. 327-335 (Year: 2021).

Behravesh et al., "Rule Modeling Engine for Optimizing Complex Event Processing Patterns", IEEE, pp. 128-135 (Year: 2009).

Brown, D., et al., "The Great AI Challenge: We Test Five Top Bots on Useful, Everyday Skills," The Wall Street Journal, published May 25, 2024.

Burnashev et al., "Design and Implementation of Integrated Development Environment for Building Rule-Based Expert Systems", IEEE, pp. 1-4 (Year: 2020).

Cranium, Adopt & Accelerate AI Safely, retrieved on Nov. 7, 2024, from https://cranium.ai/.

Cuadrado et al., "An Autonomous Engine for Services Configuration and Deployment", IEEE, pp. 520-536 (Year: 2012).

Dong, Y., et al., "Building Guardrails for Large Language Models," https://ar5iv.labs.arxiv.org/html/2402.01822v1, published May 29, 2024, 20 pages.

Fickas, "Design Issues in a Rule-Based System", ACM, pp. 208-215 (Year: 1985).

Futurism, "Sam Altman Admits That OpenAI Doesn't Actually Understand How Its AI Works", Jun. 11, 2024, 4 pages, https://futurism.com/sam-altman-admits-openai-understand-ai.

Ge et al., "Automatic Generation of Rule-based Software Configuration Management Systems", ACM, pp. 659 (Year: 2005).

Geiger, et al., "TadGAN: Time series anomaly detection using generative adversarial networks", 2020 IEEE International Conference on Big Data, 2020 (Year: 2020).

Generative machine learning models; IPCCOM000272835D, Aug. 17, 2023. (Year: 2023).

Genesis et al "CI Ref: A Tool for Visualizing the Historical Data of Software Refactorings in Java Projects", ACM, pp. 174-179 (Year: 2023).

Guana et al, "Backward Propagation of Code Refinements on Transformational Code Generation Environments", IEEE, pp. 55-60 (Year: 2013).

Guldimann, P., et al. "COMPL-AI Framework: A Technical Interpretation and LLM Benchmarking Suite for the EU Artificial Intelligence Act," arXiv:2410.07959v1 [cs.CL] Oct. 10, 2024, 38 pages.

Halvonik et al, "Large Language Models and Rule-Based Approaches in Domain-Specific Communication", IEEE, pp. 107046-107058 (Year: 2024).

Hu, Q., J., et al., "ROUTERBENCH: A Benchmark for Multi-LLM Routing System," arXiv:2403.12031v2 [cs.LG] Mar. 28, 2024, 16 pages.

Huang et al, "AI Coding: Learning to Construct Error Correction Codes", IEEE, pp. 26-39 (Year: 2020).

International Search Report and Written Opinion received in Application No. PCT/US24/47571, dated Dec. 9, 2024, 10 pages.

International Search Report and Written Opinion received in Application No. PCT/US25/24406, dated Jul. 18, 2025, 10 pages.

International Search Report and Written Opinion received in Application No. PCT/US25/24939, dated Jul. 30, 2025, 12 pages.

International Search Report and Written Opinion received in Application No. PCT/US23/85942, dated Feb. 15, 2024, 6 pages.

Jiang et al, "Self-Planning Code Generation with Large Language Models", ACM, pp. 1-30 (Year: 2024).

Kibria et al, "Big Data Analytics, Machine Learning, andArtificial Intelligence in Next-Generation Wireless Networks", IEEE, pp. 32328-32338 (Year: 2018).

Kojima, Takeshi, et al. "Large Language Models are Zero-Shot Reasoners," 36th Conference on Neural Information Processing Systems (NeurIPS 2022), arXiv:2205.11916 [cs.CL], Jan. 29, 2023, 42 pages.

Kumar et al, "A Rule-based Recommendation System for Selection of Software Development Life Cycle Models", ACM, pp. 1-6 (Year: 2013).

Lai et al., Towards a Science of Human-AI Decision Making: A Survey of Empirical Studies, arXiv:2112.11471v1 [cs.AI 9 Dec. 21, 2021; Total Pages: 36 (Year: 2021).

Langley et al., "Applications of Machine Learning and Rule Induction", ACM, pp. 54-64 (Year: 1995).

Idrizi "Exploring the Role of Explainable Artificial Intelligence(XAI) in Adaptive learning systems", ACM, pp. 100-105 (Year: 2024).

Li, et al., "Anomaly detection with generative adversarial networks for multivariate time series" arXiv: 1809.04758V3 [cs.LG] Jan. 15, 2019.

Mathews, A. W., "What AI Can Do in Healthcare-and What It Should Never Do," The Wall Street Journal, published on Aug. 21, 2024, retrieved on Sep. 5, 2024 https://www.wsj.com.

Mavrepis, P., et al., "XAI for All: Can Large Language Models Simplify Explainable AI?," https://arxiv.org/abs/2401.13110, Jan. 23, 2024, 10 pages.

Mezini, Programming and Execution Models for Next Generation Code Intelligence Systems (Keynote), ACM, pp. 1-2 (Year: 2021).

Mollick, E., "Latent Expertise: Everyone is in R&D," One Useful Thing, published on Jun. 20, 2024, https://www.oneusefulthing.org/p/latent-expertise-everyone-is-in-r.

Nauta, M., et al., "From Anecdotal Evidence to Quantative Evaluation Methods: A Systematic Review of Evaluating Explainable AI" ACM Computing Surveys, vol. 55 No. 13s Article 295, 2023 [retrieved Jul. 3, 2024].

Peers, M., "What California AI Bill Could Mean," The Briefing, published and retrieved Aug. 30, 2024, 8 pages, https://www.theinformation.com/articles/what-california-ai-bill-could-mean.

Rattanasawad et al., "A Review and Comparison of Rule Languages and Rule-based Inference Engines for the Semantic Web", IEEE, pp. 1-6 (Year: 2013).

Schick et al., Toolformer: Language Models Can Teach Themselves to Use Tools, 37th Conference on Neural Information Processing Systems (NeurIPS 2023); Total Pages: 13 (Year: 2023).

Schlegl, et al., "f-AnoGAN: Fast unsupervised anomaly detection with generative adversarial networks", Medical Image Analysis 54 (2019) 30-44, 2019.

Soares et al., "Explaining Deep Learning Models Through Rule-Based Approximation and Visualization", IEEE, pp. 2399-2407 (Year: 2021).

Sottara et al., "Enhancing a Production Rule Engine with Predictive Models Using PMML", ACM, pp. 39-47 (Year: 2011).

Sumuk Shashidhar et al., 'Democratizing LLMs: An Exploration of Cost-Performance Trade-offs in Self-Refined Open-Source Models', arXiv:2310.07611v2, pp. 1-15, Oct. 2023.

Sun et al, "Efficient Rule Engine for Smart Building Systems", IEEE, pp. 1658-1669 (Year: 2015).

Vartak et al "MODELDB: A System for Machine Learning Model Management", ACM, pp. 1-3 (Year: 2016).

Vereschak et al., "Trust in AI-assisted Decision Making: Perspectives from Those Behind the System and Those for Whom the Decision is Made", ACM, pp. 1-14 (Year: 2024).

Verma et al, "Integration of Rule based and Case based Reasoning System to Support Decision Making", IEEE, pp. 106-108 (Year: 2014).

Wang et al, "Design and realization of distributed Rule Engine for scene linkage of Internet of Things", IEEE, pp. 396-401 (Year: 2024).

Wei, Jason, et al. "Chain-of-Thought Prompting Elicits Reasoning in Large Language Models," 36th Conference on Neural Information Processing Systems (NeurIPS 2022), arXiv:2201.11903 [cs.CL], Jan. 10, 2023, 43 pages.

Yang Liu et al., 'Trustworthy LLMS: A Survey and Guideline for Evaluating Large Language Models' Alignment', arXiv:2308.05374v2, pp. 1-81, Mar. 2024.

(56)        References Cited

OTHER PUBLICATIONS

Yuan et al., R-Judge: Benchmarking Safety Risk Awareness for LLM Agents, arXiv:2401.10019v1 [cs.CL] Jan. 18, 2024; Total Pages: 23 (Year: 2024).

Zhang et al., "Developing a Rule Engine for Automated Feature Recognition from CAD Models", IEEE, pp. 3925-3930 (Year: 2009).

Zhao, H., et al., "Explainability for Large Language Models: A Survey," https://arxiv.org/abs/2309.01029, Nov. 28, 2024, 38 pages.

Zhou, Y., Liu, Y., Li, X., Jin, J., Qian, H., Liu, Z., Li, C., Dou, Z., Ho, T., & Yu, P. S. (2024). Trustworthiness in Retrieval-Augmented Generation Systems: A Survey. ArXiv./abs/2409.10102.

"Singapore launches Project Moonshot", a generative Artificial Intelligence testing toolkit to address LLM safety and security challenges, https://www.imda.gov.sg/resources/press-releases-factsheets-and-speeches/press-releases/2024/sg-launches-project-moonshot, May 31, 2024, 8 pages.

Aggarwal, Nitin, KPIs for gen AI: Why measuring your new AI is essential to its success, https://cloud.google.com/transform/kpis-for-gen-ai-why-measuring-your-new-ai-is-essential-to-its-success.

ANTHROP/C, Mapping the Mind of a Large Language Model, https://www.anthropic.com/research/mapping-mind-language-model, May 21, 2024.

Claburn, Thomas, OpenAI's GPT-4 can exploit real vulnerabilities by reading security advisories, The Register, https://www.theregister.com/2024/04/17/gpt4_can_exploit_real_vulnerabilities/?utm_source=tldrai, Apr. 17, 2024, 3 pages.

Marshall, Andrew, Threat Modeling AI/ML Systems and Dependencies, Nov. 2, 2022, 27 pages.

Roose, Kevin, "A.I. Has a Measurement Problem", The New York Times, Apr. 15, 2024, 5 pages.

Roose, Kevin, "A.I.'s Black Boxes Just Got a Little Less Mysterious", The New York Times, May 21, 2024, 5 pages.

Shah, Harshay, Decomposing and Editing Predictions by Modeling Model Computation, arXiv:2404.11534v1 [cs.LG] Apr. 17, 2024.

Shankar, Ram, "Failure Modes in Machine Learning", Nov. 2019, 14 pages.

* cited by examiner

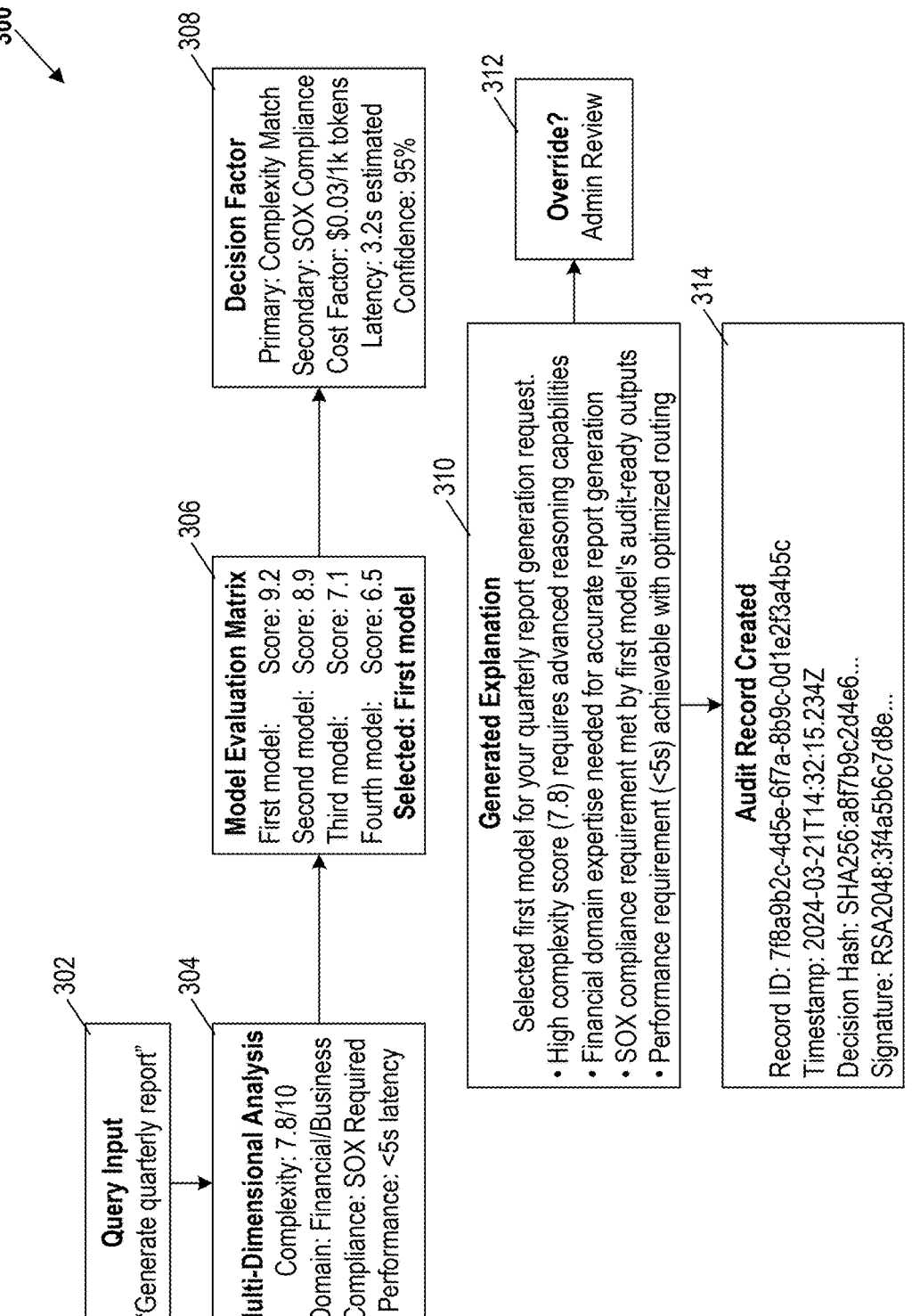

Query Input 302
"Generate quarterly report"

Multi-Dimensional Analysis 304
Complexity: 7.8/10
Domain: Financial/Business
Compliance: SOX Required
Performance: <5s latency

Model Evaluation Matrix 306
First model:        Score: 9.2
Second model:    Score: 8.9
Third model:       Score: 7.1
Fourth model:     Score: 6.5
Selected: First model

Decision Factor 308
Primary: Complexity Match
Secondary: SOX Compliance
Cost Factor: $0.03/1k tokens
Latency: 3.2s estimated
Confidence: 95%

Generated Explanation 310
Selected first model for your quarterly report generation request.
• High complexity score (7.8) requires advanced reasoning capabilities
• Financial domain expertise needed for accurate report generation
• SOX compliance requirement met by first model's audit-ready outputs
• Performance requirement (<5s) achievable with optimized routing

Override? 312
Admin Review

Audit Record Created 314
Record ID: 7f8a9b2c-4d5e-6f7a-8b9c-0d1e2f3a4b5c
Timestamp: 2024-03-21T14:32:15.234Z
Decision Hash: SHA256:a8f7b9c2d4e6...
Signature: RSA2048:3f4a5b6c7d8e...

Step 1: Original Query 702
"Analyze patient symptoms: persistent headache for 2 weeks, photophobia, neck stiffness, fever 38.5 °C. Previous history of migraines. Need differential diagnosis and treatment recommendations."

Step 2: Multi-Dimensional Analysis Results 704

| Complexity Analysis | Domain Classification | Compliance Requirements | Performance Needs |
|---|---|---|---|
| • Medical terminology: HIGH<br>• Clinical reasoning: COMPLEX<br>• Multi-factor analysis: YES<br>Score: 8.9/10 | • Primary: Medical/Clinical<br>• Specialty: Neurology<br>• Confidence: 0.97<br>MEDICAL | • HIPAA: REQUIRED<br>• Medical liability: HIGH<br>• Audit trail: MANDATORY<br>CRITICAL | • Response time: <10s<br>• Accuracy: CRITICAL<br>• Context window: LARGE<br>PRIORITY: HIGH |

Step 3: Model Evaluation and Selection 706

| Model | Medical Expertise | Compliance | Accuracy | Cost | Overall Score | Decision |
|---|---|---|---|---|---|---|
| Med-GPT | 9.8/10 | HIPAA Certified | 99.2% | $0.08/1k | 9.5 | SELECTED |
| GPT-4 | 7.5/10 | Partial | 95.1% | $0.03/1k | 7.2 | Rejected |
| Claude-3 | 6.8/10 | No | 93.5% | $0.02/1k | 6.1 | Rejected |

Step 4: Generated Explanation 708

Decision Summary:
Selected Med-GPT for your medical diagnosis query based on the following factors:
  • High complexity score (8.9/10) with critical medical terminology requires specialized medical AI model
  • HIPAA compliance is mandatory for processing patient symptoms and medical history
  • Med-GPT's 99.2% accuracy in differential diagnosis significantly exceeds other models
  • Despite high cost ($0.08 vs $0.03), patient safety and diagnostic accuracy are paramount

Step 5: Immutable Audit Record 710

| | |
|---|---|
| Record_ID: med_2024_03_21_14_35_42_789<br>Timestamp: 2024-03-21T14:35:42.789Z<br>Query_Hash: SHA256:7a8b9c0d1e2f3a4b5c6d7e8f9<br>Decision_Hash: SHA256:9f8e7d6c5b4a3f2e1d0c9b8a7<br>User_ID: dr_smith_neurology_dept<br>Signature: RSA2048:a1b2c3d4e5f6... | Model_Selected: Med-GPT-v3.2<br>Compliance_Met: [HIPAA, FDA-Medical-Device]<br>Decision_Confidence: 0.95<br>Processing_Time: 342ms<br>Override_Status: None<br>Chain_Previous: SHA256:6f5e4d3c2b1a... |

*FIG. 7*

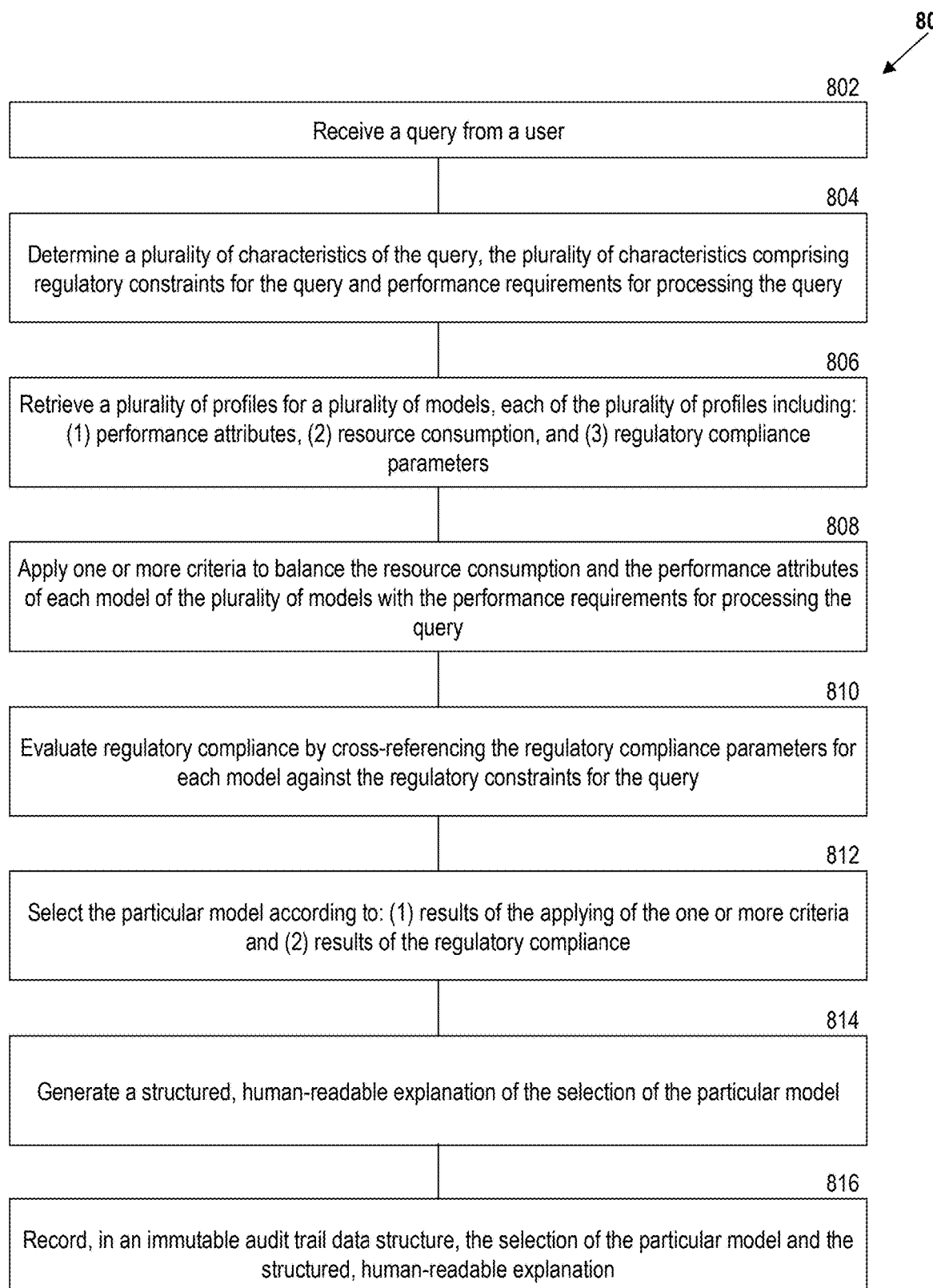

800

802

Receive a query from a user

804

Determine a plurality of characteristics of the query, the plurality of characteristics comprising regulatory constraints for the query and performance requirements for processing the query

806

Retrieve a plurality of profiles for a plurality of models, each of the plurality of profiles including: (1) performance attributes, (2) resource consumption, and (3) regulatory compliance parameters

808

Apply one or more criteria to balance the resource consumption and the performance attributes of each model of the plurality of models with the performance requirements for processing the query

810

Evaluate regulatory compliance by cross-referencing the regulatory compliance parameters for each model against the regulatory constraints for the query

812

Select the particular model according to: (1) results of the applying of the one or more criteria and (2) results of the regulatory compliance

814

Generate a structured, human-readable explanation of the selection of the particular model

816

Record, in an immutable audit trail data structure, the selection of the particular model and the structured, human-readable explanation

FIG. 8

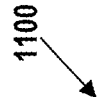
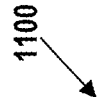
FIG. 11

1200

1202

Obtain an output generation request including an instruction for generation of an output using an artificial intelligence (AI) model

1204

Partition the output generation request into one or more segments by associating the output generation request to a set of domains indicating (1) a set of databases and (2) a set of guidelines associated with the set of databases

1206

Route each of the one or more segments to a set of domain-specific models

1208

Generate, using the set of domain-specific models, a query fragment for each domain-specific model by using one or more of: (1) a set of performance metric values associated with using the query fragment to retrieve domain-specific data from the set of databases or (2) a set of system resource metric values indicating an estimated usage of system resources to retrieve the domain-specific data using the query fragment

1210

Aggregate, using the AI model, the query fragments into an overall query configured to satisfy the set of guidelines associated with each database of the set of domains

| Input component(s)<br>1304 | Network connection component(s)<br>1316 |
|---|---|
| Output component(s)<br>1306 | Persistent storage(s)<br>1318 |
| Processor(s)<br>1308 | Computer-readable media drive(s)<br>1320 |

Storage(s) 1310

Application(s) 1312

| Application<br>1312a | Application<br>1312b | ... | Application<br>1312n |
|---|---|---|---|

Model(s) 1314

| Model<br>1314a | Model<br>1314b | ... | Model<br>1314n |
|---|---|---|---|

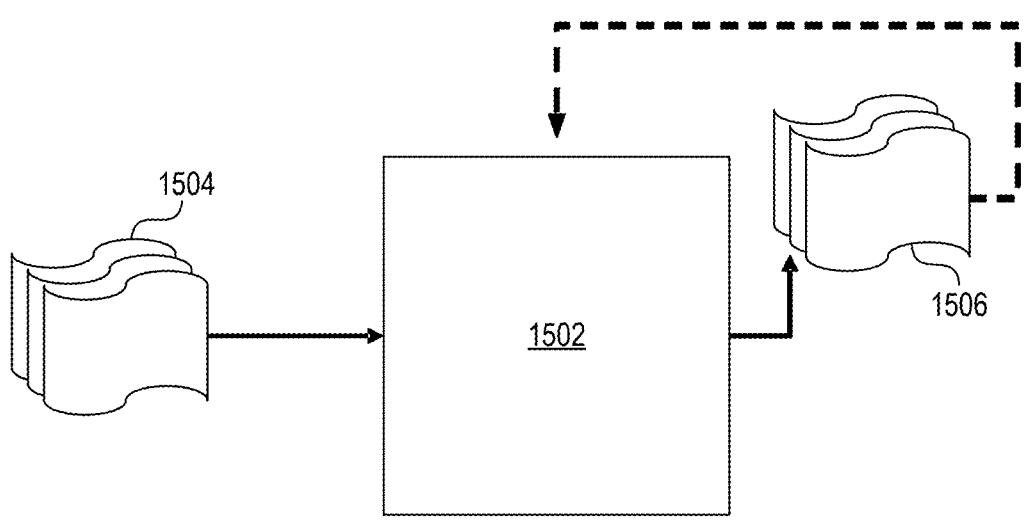
*FIG. 15*

EXPLAINABLE LARGE LANGUAGE MODEL ROUTING WITH IMMUTABLE AUDIT TRAILS

CROSS-REFERENCE TO RELATED APPLICATIONS

This application is a continuation-in-part of U.S. patent application Ser. No. 19/309,601 entitled "INTELLIGENT QUERY DECOMPOSITION, SPECIALIZED MODEL ROUTING, AND HIERARCHICAL AGGREGATION WITH CONFLICT RESOLUTION" filed on Aug. 25, 2025, which is a continuation-in-part of U.S. patent application Ser. No. 19/301,756 entitled "MULTI-VARIABLE OPTI- MIZATION FOR ROUTING REQUESTS TO LAN- GUAGE MODELS" filed on Aug. 15, 2025, which is a continuation-in-part of U.S. patent application Ser. No. 18/812,913 entitled "DYNAMIC SYSTEM RESOURCE- SENSITIVE MODEL SOFTWARE AND HARDWARE SELECTION" and filed Aug. 22, 2024, which is a continu- ation-in-part of U.S. patent application Ser. No. 18/661,532 entitled "DYNAMIC INPUT-SENSITIVE VALIDATION OF MACHINE LEARNING MODEL OUTPUTS AND METHODS AND SYSTEMS OF THE SAME" and filed May 10, 2024, which is a continuation-in-part of U.S. patent application Ser. No. 18/661,519 entitled "DYNAMIC, RESOURCE-SENSITIVE MODEL SELECTION AND OUTPUT GENERATION AND METHODS AND SYS- TEMS OF THE SAME" and filed May 10, 2024, and is a continuation-in-part of U.S. patent application Ser. No. 18/633,293 entitled "DYNAMIC EVALUATION OF LAN- GUAGE MODEL PROMPTS FOR MODEL SELECTION AND OUTPUT VALIDATION AND METHODS AND SYSTEMS OF THE SAME" and filed Apr. 11, 2024. This application is related to U.S. patent application Ser. No. 18/653,858 entitled "VALIDATING VECTOR CON- STRAINTS OF OUTPUTS GENERATED BY MACHINE LEARNING MODELS" and filed May 2, 2024, and U.S. patent application Ser. No. 18/637,362 entitled "DYNAMI- CALLY VALIDATING AI APPLICATIONS FOR COM- PLIANCE" filed on Apr. 16, 2024.

This application is further a continuation-in-part of U.S. patent application Ser. No. 19/227,442 entitled "QUERY- ING DATA USING SPECIALIZED AND GENERALIZED ARTIFICIAL INTELLIGENCE MODELS" and filed Jun. 3, 2025, which is a continuation of U.S. patent application Ser. No. 19/061,848 entitled "QUERYING DATA USING SPE- CIALIZED AND GENERALIZED ARTIFICIAL INTEL- LIGENCE MODELS" and filed Feb. 24, 2025, which is a continuation-in-part of U.S. patent application Ser. No. 18/983,342 entitled "VALIDATING AUTONOMOUS ARTIFICIAL INTELLIGENCE (AI) AGENTS USING GENERATIVE AI" and filed Dec. 17, 2024, which is a continuation-in-part of U.S. patent application Ser. No. 18/653,858 entitled "VALIDATING VECTOR CON- STRAINTS OF OUTPUTS GENERATED BY MACHINE LEARNING MODELS" and filed May 2, 2024, which is a continuation-in-part of U.S. patent application Ser. No. 18/637,362 entitled "DYNAMICALLY VALIDATING AI APPLICATIONS FOR COMPLIANCE" filed on Apr. 16, 2024. U.S. patent application Ser. No. 19/061,848 is further a continuation-in-part of U.S. patent application Ser. No. 18/661,532 entitled "DYNAMIC INPUT-SENSITIVE VALIDATION OF MACHINE LEARNING MODEL OUT- PUTS AND METHODS AND SYSTEMS OF THE SAME" and filed May 10, 2024, which is a continuation-in-part of U.S. patent application Ser. No. 18/661,519 entitled "DYNAMIC, RESOURCE-SENSITIVE MODEL SELEC- TION AND OUTPUT GENERATION AND METHODS AND SYSTEMS OF THE SAME" and filed May 10, 2024, and is a continuation-in-part of U.S. patent application Ser. No. 18/633,293 entitled "DYNAMIC EVALUATION OF LANGUAGE MODEL PROMPTS FOR MODEL SELEC- TION AND OUTPUT VALIDATION AND METHODS AND SYSTEMS OF THE SAME" and filed Apr. 11, 2024.

The content of the foregoing applications is incorporated herein by reference in its entirety.

BACKGROUND

Large language models (LLMs) are artificial intelligence systems trained on vast amounts of text data to understand and generate human-like language. These models use deep learning architectures, particularly transformer networks, to process and respond to natural language queries across diverse domains. LLMs can perform various tasks including text generation, translation, summarization, and question answering. Modern LLMs vary in their capabilities, com- putational requirements, and specialized training, with some optimized for general-purpose applications while others focus on specific domains such as code generation, scientific literature, or legal documents.

Audit trails in computing systems refer to chronological records that document sequences of activities, transactions, or events within a system. These records typically capture information about what actions occurred, when they hap- pened, who performed them, and what resources were affected. Audit trails serve multiple purposes including com- pliance verification, security monitoring, troubleshooting, and forensic analysis. Modern audit systems may incorpo- rate cryptographic techniques such as digital signatures and hash chains to provide tamper-evident properties and main- tain data integrity over time.

SUMMARY

Current LLM routing systems face significant technical challenges that limit their effectiveness and regulatory com- pliance. Existing routing systems operate as black boxes, making decisions without providing clear explanations for why specific models were selected for particular queries. This opacity creates substantial problems for organizations that must demonstrate compliance with various regulations, which require detailed audit trails of artificial intelligence (AI) decision-making processes. Furthermore, current sys- tems focus solely on performance optimization without explanation capabilities, leaving organizations unable to understand how routing decisions balance cost versus qual- ity considerations or meet regulatory requirements.

The lack of comprehensive audit trail mechanisms designed specifically for LLM routing decisions compounds these problems. Organizations in regulated industries such as financial services, healthcare, and government require transparent, tamper-proof records of all AI routing decisions to satisfy regulatory oversight. Conventional systems also lack human-in-the-loop override capabilities with proper authorization controls, preventing authorized personnel from reviewing and modifying routing decisions when nec- essary. Additionally, insufficient integration between routing decisions and compliance requirements means that existing systems cannot ensure that selected models meet jurisdic- tional and sector-specific regulatory constraints.

The disclosed system overcomes these technical problems by providing an explainable LLM routing architecture that generates human-readable explanations for each routing decision while maintaining cryptographically secured audit trails. The system analyzes incoming queries through multiple dimensions including complexity, domain requirements, compliance constraints, and cost-quality tradeoffs to make informed routing decisions. Each routing decision generates a structured explanation detailing the decision factors, selected model rationale, and alternative options considered, enabling full transparency and accountability. The system maintains an immutable audit trail with cryptographic signatures that captures the full decision context, including system state, user inputs, and environmental variables at the time of each decision. This approach ensures tamper-proof recordkeeping for regulatory compliance while enabling authorized users to perform role-based overrides when necessary. The integration of compliance checking directly into the routing process ensures that all selected models meet applicable regulatory requirements before processing queries.

In particular, the disclosed system can receive a query from a user via an input interface. The system determines a plurality of characteristics of the query, including the complexity of the query, a subject matter domain of the query, regulatory constraints for the query, and performance requirements for processing the query. For example, the system can classify the query into a subject matter domain using a domain classification model that assigns the query to a domain based on features extracted from the query. In some implementations, the system analyzes the complexity of the query by comparing features of the query against a knowledge base including predefined complexity metrics and patterns.

Moreover, the system retrieves, from a model matrix, a plurality of profiles for a plurality of large language models, where each profile includes performance attributes, resource consumption, and regulatory compliance parameters. The system then selects a particular LLM to process the query by applying one or more criteria to balance the resource consumption and performance attributes of the LLMs with the performance requirements for processing the query. In some implementations, the system applies the criteria to compare, for each LLM, the resource consumption and performance attributes against the performance requirements of the query, where the criteria include a tradeoff analysis between minimizing computational cost and maximizing response quality.

The system evaluates regulatory compliance by cross-referencing the regulatory compliance parameters for the LLMs against the regulatory constraints for the query. For example, the system can determine, for each of the plurality of profiles, whether the profile includes a plurality of certifications and authorizations required by the regulatory constraints for the query and exclude from further consideration any LLM for which the profile lacks at least one of the required certifications and authorizations. The system ranks the plurality of LLMs according to results of the applying of the criteria and results of the regulatory compliance evaluation. In some implementations, the system prioritizes LLMs that have successfully processed past queries matching the subject matter domain or complexity of the query. The system selects a particular LLM according to selection logic that accounts for the ranking and the prioritizing. Thus, the routing decision considers both current query characteristics and historical performance data to optimize model selection.

The system generates a structured, human-readable explanation of the selection of the particular LLM, where the explanation includes decision factors, rationale for LLM selection, and alternative LLMs considered when selecting the particular LLM. For example, the system can parse the selection logic used to select the particular LLM to determine a plurality of selection factors, select an explanation template having a format corresponding to the selection factors and query type, and embed within the explanation template both the selection logic and a list of alternative LLMs with reasons for non-selection.

The system records, in an immutable audit trail data structure, the selection of the particular LLM and the structured, human-readable explanation, where the audit trail data structure is secured to provide tamper-evident recordkeeping. In particular, the system can generate a hash of the structured explanation, record a timestamp in the hash using a secure time server, encrypt the hash with a cryptographic signature, and transmit the hash to a tamper-evident, append-only log. This approach ensures that all routing decisions can be verified and audited for regulatory compliance purposes.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 3 illustrates an explanation generation process, in accordance with some implementations of the present technology.

FIG. 7 illustrates a flowchart showing a query routing example, in accordance with some implementations of the present technology.

FIG. 8 illustrates a flowchart of a process for model selection and explanation generation, in accordance with some implementations of the present technology.

FIG. 11 is a block diagram illustrating an example environment of a domain-specific model used for distributed data queries, in accordance with some implementations to the disclosed technology.

FIG. 12 is a flow diagram illustrating an example process of dynamically selecting models for distributed data queries, in accordance with some implementations to the disclosed technology.

FIG. 15 shows a diagram of an artificial intelligence (AI) model, in accordance with some implementations to the disclosed technology.

Figure 1:
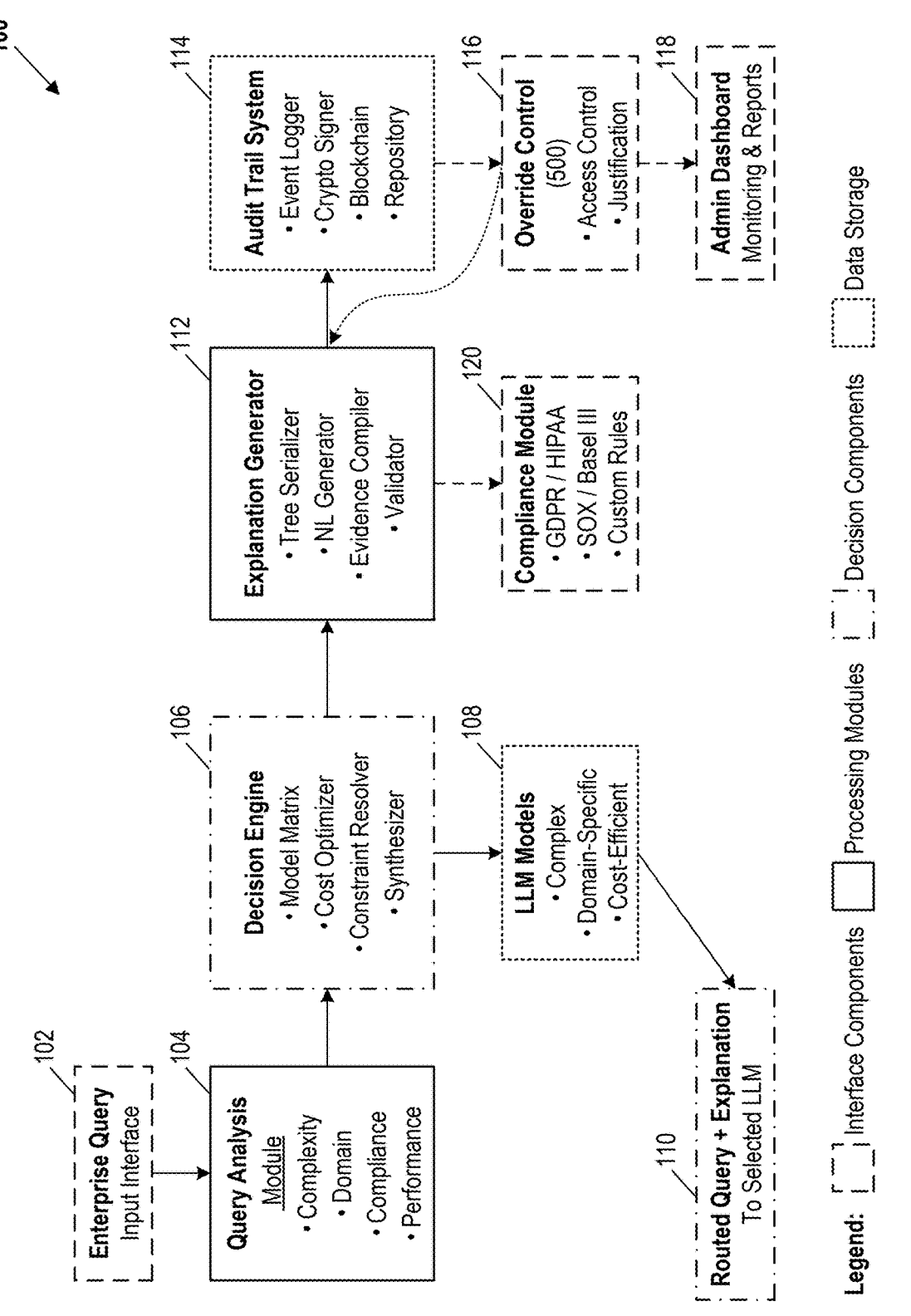
FIG. 1 illustrates an explainable LLM routing system architecture, in accordance with some implementations of the present technology.

The technologies described herein will become more apparent to those skilled in the art from studying the Detailed Description in conjunction with the drawings. Implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In the following description, for the purposes of explanation, numerous specific details are set forth in order to provide a thorough understanding of the disclosed implementations. It will be appreciated, however, by those having skill in the art, that the implementations can be practiced without these specific details or with an equivalent arrangement. In other cases, well-known models and devices are shown in block diagram form in order to avoid unnecessarily obscuring the disclosed implementations. It should also be noted that the methods and systems disclosed herein are also suitable for applications unrelated to explainable large language model routing systems with immutable audit trails.

The disclosed technology provides a system and method for explainable large language model routing with immutable audit trails. In particular, systems and methods described herein involve analyzing incoming queries across multiple dimensions, selecting appropriate LLMs based on performance and compliance criteria, generating human-readable explanations for routing decisions, and maintaining cryptographically secured audit records. Specifically, the present disclosure is directed to determining query characteristics including complexity and regulatory constraints, evaluating LLM profiles containing performance attributes and compliance parameters, applying selection criteria that balance resource consumption with performance requirements, and recording routing decisions in tamper-evident audit trail data structures. The system can implement explainable routing decisions that provide transparency for regulatory compliance while enabling authorized overrides when necessary across different operational domains and regulatory environments.

The system can utilize various types of models (e.g., LLMs, small language models (SLMs), retrieval-augmented generation (RAG) procedures, fine-tuned models, neural networks, Bayesian models, or other types of models). For example, LLMs can be employed for complex reasoning tasks that require extensive world knowledge and sophisticated language understanding, such as multi-step analytical queries or nuanced interpretation of ambiguous requests. SLMs with fewer parameters can be utilized for specific, well-defined tasks where computational efficiency is prioritized, such as entity extraction, classification, or simple factual retrieval, enabling faster response times and reduced resource consumption. RAG procedures can be integrated to combine the generative capabilities of language models with access to external knowledge bases, allowing the system to provide up-to-date information and domain-specific facts that are not present in the model's training data.

FIG. 1 illustrates an explainable LLM routing system architecture 100, in accordance with some implementations of the present technology. The explainable LLM routing system architecture 100 provides a comprehensive framework for intelligently routing queries to appropriate large language models while maintaining transparency and regulatory compliance. The architecture implements a modular design that separates concerns across multiple specialized components, enabling scalability and maintainability in enterprise environments. This modular approach allows organizations to customize specific components based on their unique requirements without affecting the overall system functionality.

The enterprise query interface 102 serves as the primary entry point for all user queries into the system. This interface can be implemented through multiple channels including web portals, application programming interface (API) endpoints, command-line interfaces, or integration with existing enterprise applications. The interface supports various authentication mechanisms to verify user identity and authorization levels before accepting queries. In some implementations, the interface provides real-time feedback to users about query formatting or potential issues before submission. The interface can also implement rate limiting and queue management to handle high-volume query scenarios efficiently.

The query analysis module 104 performs multi-dimensional evaluation of incoming queries to create a comprehensive profile that guides subsequent routing decisions. This module analyzes complexity through metrics such as token count, nested logic depth, and technical terminology density. It classifies queries into subject matter domains using machine learning models trained on domain-specific corpora. The module identifies applicable regulatory constraints by detecting sensitive data types and jurisdictional requirements. Additionally, it predicts performance requirements including expected response time, memory usage, and priority level. The analysis results are aggregated into a structured query profile that captures all relevant dimensions for optimal model selection.

The decision engine 106 contains several components that work together to determine the model for each query. The model matrix maintains comprehensive profiles of all available LLMs, including performance attributes, resource consumption metrics, and compliance certifications. The cost optimizer implements mathematical algorithms to balance computational efficiency with response quality, using techniques such as Pareto optimization or multi-attribute utility theory. The constraint resolver ensures all regulatory and business rules are satisfied before finalizing routing decisions. The synthesizer combines all factors using configurable weighting schemes to produce the final model selection. In some implementations, the decision engine can employ machine learning approaches that adapt weighting parameters based on historical performance data and user feedback.

The system interfaces with LLM models 108, which include a diverse range of options to address different query requirements. These models can include general-purpose commercial models for handling complex, high-stakes queries requiring advanced reasoning capabilities. The system also supports domain-specific models optimized for particular fields such as healthcare, finance, or legal applications. Cost-efficient models can be utilized for routine queries where computational efficiency is prioritized over maximum performance. The system can implement adapter interfaces to standardize communication with different model APIs, enabling seamless integration of new models as they become available. In some implementations, the system can support hybrid approaches that combine multiple models for optimal results on complex queries.

The routed query and explanation 110 component handles the transmission of the query to the selected LLM based on the decision engine's analysis. This component implements standardized API communication protocols to ensure reliable query delivery and response handling. It manages authentication credentials for different model providers and implements retry logic for handling temporary service disruptions. The component also captures performance metrics during query processing, such as actual response time and token usage, which can be fed back into the system to refine future routing decisions. In some implementations, this component can implement streaming response handling for large outputs or implement post-processing of model responses to ensure format consistency.

An explanation generator 112 creates comprehensive documentation of routing decisions to ensure transparency and accountability. This generator employs a decision tree serializer that converts the complex decision logic into a structured format that can be processed by subsequent components. The natural language generator transforms the structured decision data into human-readable explanations using templates tailored to different audience types, from technical explanations for system administrators to simplified explanations for end users. The evidence compiler gathers supporting data for decisions, including model benchmarks, historical performance metrics, and compliance certifications. The validator ensures explanations meet clarity standards by performing readability scoring, completeness verification, and professional tone assessment. The explanation generator can produce explanations in multiple formats including text, structured JSON, or visual decision trees depending on the intended consumption context.

The audit trail system 114 provides tamper-evident recordkeeping of all routing decisions to support regulatory compliance and governance requirements. This system implements an event logger that captures comprehensive details about each decision, including query characteristics, model options considered, selection criteria applied, and final choice made. The crypto signer applies digital signatures using asymmetric encryption to ensure record authenticity and prevent unauthorized modifications. The blockchain capability provides an optional distributed ledger integration for environments requiring maximum immutability guarantees. The repository implements secure storage with configurable retention policies to meet different regulatory requirements. The audit trail system can support various cryptographic approaches including hash chaining between records, trusted timestamping services, and zero-knowledge proofs for privacy-preserving verification.

The system includes an override control module 116 that enables authorized human intervention in the automated routing process. This module implements role-based access control to restrict override capabilities to appropriate personnel based on their responsibilities and expertise. It provides a specialized interface for reviewing routing decisions and their explanations before applying changes. The module captures detailed justifications for all overrides, ensuring accountability and creating learning opportunities for system improvement. It includes impact analysis tools that help users understand the potential consequences of their interventions, such as cost implications, performance changes, or compliance effects. In some implementations, the module can support multi-level approval workflows for critical overrides, requiring sign-off from multiple stakeholders before changes take effect.

An admin dashboard 118 provides comprehensive visibility and control over the entire routing system. This dashboard offers real-time monitoring of system performance metrics, including query volumes, model utilization rates, and response times. It generates detailed reports on routing patterns, override frequencies, and compliance status across different time periods and organizational units. The dashboard includes alerting capabilities for anomalous conditions such as unusual routing patterns, compliance violations, or performance degradations. It provides configuration interfaces for adjusting system parameters such as cost-quality weightings, compliance rules, or model availability. In some implementations, the dashboard can include predictive analytics that forecast future resource requirements based on historical usage patterns and identified trends.

The compliance module 120 ensures all routing decisions adhere to applicable regulatory requirements and organizational policies. This module maintains a comprehensive rule base of compliance requirements across different jurisdictions and industry sectors, such as the General Data Protection Regulation (GDPR) for European data, Health Insurance Portability and Accountability Act (HIPAA) for healthcare information, or the Sarbanes-Oxley (SOX) Act for financial reporting. It performs pre-routing checks to identify queries that trigger specific compliance requirements and ensures selected models have appropriate certifications. The module generates compliance documentation for audit purposes, including attestations of regulatory adherence and exception handling records. It implements continuous monitoring for regulatory changes and can automatically update compliance rules as requirements evolve. In some implementations, the module can integrate with external governance, risk, and compliance (GRC) systems to maintain alignment with enterprise-wide compliance frameworks.

In particular, the system receives a query or request from a user. In some implementations, the system receives the query or request via an input interface. The input interface can be a query interface that serves as the entry point for user queries into the system. For example, the input interface can include a web portal, API endpoint, or command-line interface that allows users to submit natural language queries or structured requests. In some implementations, the input interface can support multiple input formats including text, voice, or structured data. The interface can also implement authentication mechanisms to verify user identity and authorization levels before accepting queries. Moreover, the input interface can provide real-time feedback to users about query formatting or potential issues before submission.

In some implementations, the system can receive the query or request through various input channels. For example, the system can accept queries provided as spoken text through voice recognition interfaces, via API invocations from external systems, through structured data submissions, or through integration with existing communication platforms. Additionally, the interface can provide contextual guidance or auto-completion suggestions to help users formulate effective queries regardless of the input method used.

The system can preprocess incoming queries and requests through a series of preprocessing steps to standardize the input for subsequent analysis. This preprocessing includes tokenization, which segments the text into meaningful units such as words, phrases, or subwords; normalization, which converts text to consistent formats by handling case sensitivity, expanding contractions, and removing irrelevant variations; and initial classification, which performs preliminary categorization of the query type and intent. The preprocessing stage can also identify and extract key entities, technical terminology, and query parameters that will be relevant for later analysis stages. In multilingual environments, the preprocessing can include language detection to apply appropriate language-specific processing rules. These preprocessing steps can create a standardized representation of each request or query that enables more accurate and efficient analysis by downstream components of the system.

Figure 2:
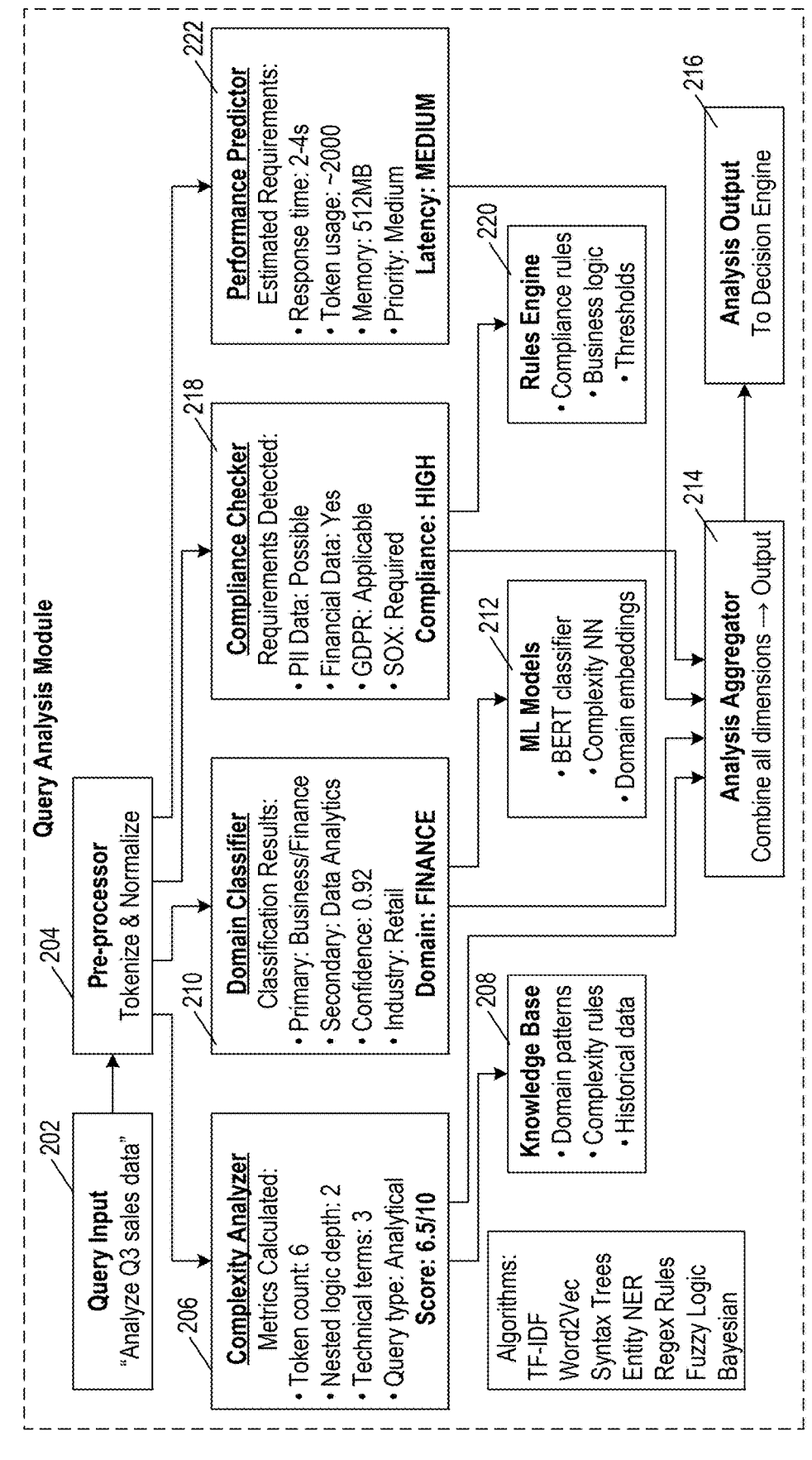
FIG. 2 illustrates a detailed architecture of a query analysis module, in accordance with some implementations of the present technology.

FIG. 2 illustrates a detailed architecture of a query analysis module 200, in accordance with some implementations of the present technology. The query analysis module 200 represents a sophisticated multi-dimensional analysis system designed to comprehensively evaluate incoming queries across various parameters. At the entry point of this module is the query input 202 that can include natural language or structured input text from users, such as "Analyze Q3 sales data" or more complex requests like "Generate a regulatory compliance report for healthcare data processing activities in the European Union." The query input 202 can accept inputs through various channels including API calls, web interfaces, or command-line tools, providing flexibility for different enterprise environments.

The query input 202 connects to a pre-processor 204 that performs essential linguistic preparation tasks including tokenization, normalization, and initial classification of the input text. The pre-processor 204 implements advanced natural language processing techniques to break down queries into analyzable components, remove irrelevant variations, and standardize formatting. For example, the pre-processor can convert all text to lowercase, remove punctuation, expand contractions, and identify key entities or technical terms. In some implementations, the pre-processor 204 can also perform language detection for multilingual environments, allowing subsequent analysis components to apply language-specific processing rules.

The pre-processor 204 feeds the standardized query into multiple parallel analysis components that evaluate different dimensions of the query. A complexity analyzer 206 calculates various metrics to determine the computational difficulty and resource requirements for processing the query. These metrics include token count (measuring raw length), nested logic depth (identifying complex conditional structures), technical terminology density (recognizing specialized vocabulary), and query type classification (distinguishing between simple retrieval, complex reasoning, creative generation, etc.). The complexity analyzer 206 produces a composite complexity score, typically on a scale of 1 to 10, that helps determine which models have sufficient capabilities to handle the query effectively. For example, a query requesting "List the top 5 sales regions" can receive a complexity score of 2, while "Analyze market trends and predict next quarter performance with confidence intervals" can score 8.5.

The complexity analyzer 206 utilizes various algorithms and reference data stored in an associated knowledge base 208. This knowledge base contains structured information including domain-specific patterns (such as financial terminology or medical concepts), complexity classification rules (heuristics for identifying difficult query structures), and historical data from previously processed queries. The knowledge base 208 can be regularly updated with new patterns and rules based on system performance and user feedback, enabling continuous improvement of complexity assessment accuracy. In some implementations, the knowledge base 208 can include specialized dictionaries for different professional domains, allowing more precise identification of technical terminology and domain-specific complexity factors.

A domain classifier 210 processes the pre-processed query to determine its subject matter area, which is important for routing to appropriately specialized models. The domain classifier produces classification results that include both primary and secondary domains with associated confidence scores. For example, a query about "stock market performance during inflation periods" can be classified as Primary: Finance (95% confidence), Secondary: Economics (78% confidence). This multi-domain classification allows the system to handle queries that span multiple subject areas and require diverse expertise. The domain classifier can identify dozens of different domains including finance, healthcare, legal, technical, creative, educational, and general knowledge, with further sub-domain specialization within each category.

The domain classifier 210 interfaces with machine learning models 212 that incorporate multiple AI technologies. These include Bidirectional Encoder Representations from Transformers (BERT) classifiers (fine-tuned transformer models that understand contextual language patterns), complexity neural networks (specialized for identifying intricate query structures), and domain embeddings (vector representations of different subject areas that capture semantic relationships). The machine learning models 212 are trained on extensive corpora of domain-specific texts and continuously refined through supervised learning techniques. In some implementations, the system can employ ensemble methods that combine predictions from multiple classification models to improve accuracy and robustness, particularly for queries that fall at the boundaries between domains.

The query analysis module 200 further includes a compliance checker 218 that performs regulatory analysis of the query content. This component detects various compliance-sensitive elements such as personally identifiable information (PII) data handling requirements (identifying when PII can be processed), financial data considerations (detecting references to regulated financial activities), and specific regulatory frameworks like GDPR (for European data protection) and SOX (for financial reporting) compliance. For example, if a query mentions patient data in a European context, the compliance checker can flag GDPR requirements for health data processing. Similarly, queries about financial reporting in publicly traded companies can trigger SOX compliance flags.

The compliance checker 218 connects to a rules engine 220 that contains structured compliance rules, business logic, and threshold definitions. This rules engine incorporates regulatory requirements from multiple jurisdictions and industry sectors, allowing the system to identify applicable compliance constraints based on query content, user location, and organizational context. The rules engine 220 can be updated as regulations evolve, ensuring the system maintains current compliance awareness. In some implementations, the rules engine can incorporate machine learning components that learn to recognize patterns indicative of compliance requirements from historical data, complementing the explicit rule-based approach with pattern recognition capabilities.

A performance predictor 222 analyzes the query to estimate various operational requirements for processing. This component forecasts metrics including expected response time (how quickly an answer should be generated), token usage (the computational resources required), and memory requirements (random-access memory (RAM) needed for processing) and assigns appropriate priority levels based on business importance and time sensitivity. For example, a query marked as "urgent" from an executive user can receive a high priority designation requiring sub-second response time, while a background analysis task can receive lower priority with more relaxed performance constraints. The performance predictor can consider factors such as query complexity, historical processing patterns for similar queries, current system load, and explicit user requirements when generating these estimates.

The outputs from all these specialized analysis components feed into an analysis aggregator 214 that serves as the integration point for the multi-dimensional evaluation. The analysis aggregator 214 combines all dimensions into a consolidated, structured output that captures the complete query profile. This aggregation process applies weighting algorithms that balance different factors according to configurable business priorities. For example, in highly regulated industries like healthcare, compliance factors can receive higher weighting than performance metrics. The aggregator can also identify potential conflicts between dimensions (such as when high performance requirements conflict with strict compliance needs) and apply resolution rules to determine the balance.

The analysis aggregator 214 connects to an analysis output 216 that formats and forwards the processed information to the decision engine for model selection. The analysis output 216 implements standardized data structures that ensure consistent communication between the analysis and decision components. This structured output includes all relevant query characteristics, confidence scores for each dimension, and any special handling flags that can influence routing decisions. In some implementations, the analysis output can include visualization capabilities that generate graphical representations of the multi-dimensional analysis for administrative dashboards, helping system operators understand the basis for routing decisions.

In particular, the system determines a plurality of characteristics of the query, the plurality of characteristics including regulatory constraints for the query and performance requirements for processing the query. In some implementations, the plurality of characteristics includes a complexity of the query, a subject matter domain of the query, regulatory constraints for the query, and performance requirements for processing the query. The complexity of the query can refer to the computational difficulty and resource intensity required to process the query effectively. For example, complexity can be measured through metrics such as token count, nested logic depth, technical terminology density, and query type classification. The subject matter domain identifies the specific field or topic area to which the query pertains, such as finance, healthcare, legal, or technical domains. Regulatory constraints encompass the legal, compliance, and governance requirements applicable to processing the specific query, which can vary based on data types, jurisdictions, and industry sectors. Performance requirements define the operational parameters needed for satisfactory query processing, including response time expectations, memory usage limits, and priority levels. The system can employ specialized analysis modules to evaluate each characteristic dimension, creating a comprehensive profile of the query that guides subsequent model selection decisions.

Determining the plurality of characteristics of the query can involve classifying the query into a subject matter domain using a domain classification model, where the domain classification model is configured to assign the query to a domain based on one or more features extracted from the query. For example, the domain classification model can utilize natural language processing techniques to identify key terms, entities, and concepts within the query text that indicate its subject area. The system can analyze the complexity of the query by comparing features of the query against a knowledge base including predefined complexity metrics and patterns. In particular, this analysis can involve evaluating syntactic structures, semantic complexity, and computational requirements based on established benchmarks and historical data. The system can determine the regulatory constraints for the query by invoking a rules engine configured to identify jurisdictional and sector-specific compliance requirements for the query. For example, the rules engine can apply pattern matching and contextual analysis to detect mentions of PII, financial data, or healthcare information that trigger specific regulatory frameworks like GDPR, SOX, or HIPAA. The system can determine the performance requirements for the query by analyzing the query using a performance predictor, where the performance predictor is configured to assess expected response time, memory requirements, and priority level for processing the query. Thus, the performance predictor can evaluate query complexity, user expectations, and system load to establish appropriate service level targets for query processing.

FIG. 3 illustrates a decision flow and explanation generation process 300, in accordance with some implementations of the present technology. The process represents a workflow for analyzing queries, selecting appropriate language models, generating explanations, and creating audit records. This multi-stage process ensures transparency, accountability, and regulatory compliance throughout the model selection lifecycle. The process begins with query input 302, for example, "Generate quarterly report." This represents a query that requires financial expertise, regulatory compliance awareness, and natural language processing capabilities. The system accepts this input through standardized interfaces that can include API endpoints, web portals, or command-line tools, providing flexibility for different enterprise environments.

The query then undergoes multi-dimensional analysis 304, where various parameters are evaluated through specialized analytical components. The complexity analysis assigns a rating of 7.8/10, indicating a relatively complex query requiring advanced reasoning capabilities. This complexity score is derived from multiple factors including token count, nested logic requirements, technical terminology density, and query structure analysis. The domain classification identifies the query as belonging to the Financial/ Business domain with high confidence, enabling the system to prioritize models with financial expertise. The compliance requirements analysis determines that SOX (Sarbanes-Oxley) compliance is required for this query as it involves financial reporting that can be subject to regulatory oversight. The performance metrics analysis establishes that the query requires responsive processing with <5 s latency to meet user expectations. Alternative performance requirements can include memory constraints, token budget limitations, or specific accuracy thresholds depending on the query context and business priorities.

The process flows to a model evaluation matrix 306, which implements a comparison framework for candidate language models. This matrix evaluates multiple models against the specific requirements identified in the analysis phase. Each model is scored based on its capabilities, compliance certifications, resource consumption, and historical performance for similar queries. The evaluation applies weighted criteria that balance performance needs with resource efficiency, using mathematical optimization techniques such as Pareto efficiency analysis or multi-attribute utility theory. For this particular query, a first model achieves the highest composite score of 9.2 and is selected as the model. The matrix shows that while a second model scored well (8.9), it had slightly lower financial domain expertise. A third model (7.1) and a fourth model (6.5) scored lower due to limitations in handling the complexity requirements and SOX compliance capabilities, despite their more favorable cost profiles. This comparative evaluation ensures that the selected model optimally balances all relevant factors for the specific query context.

The evaluation leads to decision factor 308, which provides a structured representation of the primary and secondary considerations that influenced the model selection. The primary factors include complexity match (indicating the first model's ability to handle the 7.8/10 complexity rating), SOX compliance (confirming the first model's certification for financial regulatory requirements), and domain expertise (highlighting the first model's strong capabilities in financial analysis). Secondary factors include cost considerations ($0.03/1 k tokens, which represents the computational and financial resource consumption), latency estimates (3.2 s, which meets the <5 s requirement), and an overall confidence level of 95% in the selection decision. The decision factors are weighted according to configurable business priorities, with regulatory compliance typically receiving higher weighting in regulated industries like finance. Alternative weighting schemes can prioritize cost efficiency for high-volume, routine queries or emphasize performance for time-sensitive applications. The decision factors provide a comprehensive justification for the model selection that balances multiple competing objectives.

Following the decision, a generated explanation 310 is produced through a sophisticated natural language generation process. This explanation transforms the technical decision factors into a human-readable narrative that clearly communicates the rationale for selecting the first model. The explanation is structured to address multiple aspects of the decision, beginning with complexity requirements ("the first model was selected because this query requires handling complex financial reporting structures . . . "). It continues with domain expertise justification ("the first model demonstrates superior performance in financial analysis tasks . . . "), SOX compliance capabilities ("the first model maintains current SOX compliance certification required for financial reporting . . . "), and performance metrics ("the model delivers responses within the required latency window . . . "). The explanation also addresses alternatives that were considered but not selected ("the second model was considered but ranked lower due to . . . "). This comprehensive explanation ensures transparency and accountability in the model selection process, enabling users and auditors to understand exactly why a particular model was chosen for the specific query context.

The process then includes an override 312 option that enables authorized human intervention in the automated routing process. This component implements role-based access control to restrict override capabilities to appropriate personnel based on their responsibilities and expertise. For example, compliance personnel can have authority to override model selections for regulatory reasons, while a financial analyst can have permission to select alternative models for specialized financial queries. The override interface provides a specialized dashboard for reviewing routing decisions and their explanations before applying changes. It captures detailed justifications for all overrides, ensuring accountability and creating learning opportunities for system improvement. The override component includes impact analysis tools that help users understand the potential consequences of their interventions, such as cost implications, performance changes, or compliance effects. In some implementations, the override system can support multi-level approval workflows for critical overrides, requiring sign-off from multiple stakeholders before changes take effect.

The final step involves audit record creation 314, which generates a complete, cryptographically secured record of the entire decision process. This audit record includes comprehensive metadata such as unique identifiers (record ID, session ID, user ID), precise timestamps from secure time servers, and cryptographic hashes of the query, selected model, and explanation. The record also contains digital signatures created using asymmetric encryption to ensure authenticity and prevent unauthorized modifications. The audit system implements sophisticated security measures including hash chaining between records, where each new record contains a reference to the previous record's hash, creating a tamper-evident chain of decisions. The audit records can be stored in distributed systems such as blockchain networks, immutable cloud storage, or specialized compliance repositories with appropriate retention policies. This comprehensive audit capability enables retrospective analysis, compliance verification, and accountability for all model selection decisions, satisfying regulatory requirements in industries like finance, healthcare, and government. The process steps are sequentially numbered from 1 to 6, encompassing query input, analysis, model evaluation, explanation, audit trail, and optional override functionality, providing a clear workflow for the entire decision lifecycle.

In particular, the system retrieves, from a model matrix, a plurality of profiles for a plurality of LLMs, each of the plurality of profiles including performance attributes, resource consumption, and regulatory compliance parameters. The model matrix serves as a comprehensive repository of information about available LLMs that can be selected for query processing. Performance attributes describe the capabilities and effectiveness of each model across different tasks and domains, including accuracy metrics, specialization areas, and historical performance data. Resource consumption parameters quantify the computational costs associated with using each model, such as processing time, memory usage, and financial costs per token. Regulatory compliance parameters document each model's certifications, authorizations, and compliance status with respect to various regulatory frameworks and standards. For example, the model matrix can include profiles for general-purpose models, as well as domain-specialized models optimized for specific fields such as healthcare, finance, or legal applications. The system can maintain this matrix as a dynamic database that is regularly updated with new performance benchmarks, compliance certifications, and resource metrics to ensure selection decisions are based on current information.

The system selects a particular LLM to process the query. The selection process involves multiple steps that evaluate different aspects of model suitability for the specific query. For example, the system can apply sophisticated selection algorithms that balance performance needs with resource efficiency, ensuring cost-quality tradeoffs. Regulatory compliance verification can filter out models lacking required certifications for the query type. The system can rank candidate models based on these evaluations and prioritize those with successful processing history in similar domains. This comprehensive selection approach ensures that the chosen LLM optimally balances performance capabilities, resource efficiency, and compliance requirements for each specific query context.

In some implementations, the system applies one or more criteria to balance the resource consumption and the performance attributes of one or more LLMs of the plurality of LLMs with the performance requirements for processing the query. This balancing process involves sophisticated tradeoff analysis between computational efficiency and response quality. For example, the system can apply weighted scoring algorithms that consider factors such as processing time, memory usage, and financial cost per token against performance metrics like accuracy, relevance, and domain expertise. The criteria can include cost optimization functions that identify the most economical model capable of meeting minimum performance thresholds for the query type. These optimization functions can implement various mathematical approaches including linear programming, constraint satisfaction algorithms, or utility maximization techniques that formally express the relationship between resource inputs and performance outputs.

In some implementations, the system can employ adaptive criteria that adjust weightings based on query priority, time sensitivity, or user preferences. These adaptive mechanisms can incorporate feedback loops that learn from past routing decisions, gradually refining the weighting parameters based on observed performance outcomes and user satisfaction metrics. The system can implement different optimization strategies depending on operational contexts, such as using greedy algorithms for time-sensitive queries or more thorough combinatorial optimization approaches for complex, high-stakes queries where model selection is important. The balancing process can also incorporate system-wide resource management considerations to prevent overloading high-demand models when alternatives can provide satisfactory results. This can include load balancing techniques that distribute queries across multiple models based on current utilization rates and queue depths, ensuring efficient resource allocation across the entire system.

The system can implement Pareto optimization techniques that identify non-dominated solutions where no improvement in one criterion (such as performance) can be achieved without sacrificing another criterion (such as cost efficiency). For high-priority queries, the system can employ a lexicographic preference ordering that first satisfies mandatory constraints before considering secondary factors. Alternatively, for balanced decision-making, the system can use multi-attribute utility theory to combine different dimensions into a single utility score that represents the overall value of each potential model selection. This multi-dimensional optimization approach enables the system to make nuanced selection decisions that appropriately balance performance needs with resource constraints for each specific query context while providing mathematical rigor and explainability to the selection process.

The system evaluates regulatory compliance by cross-referencing the regulatory compliance parameters for one or more LLMs against the regulatory constraints for the query. This evaluation ensures that the selected model meets all applicable legal and governance requirements for processing the specific query. For example, if a query involves healthcare data subject to HIPAA regulations, the system verifies that candidate models possess the necessary HIPAA compliance certifications. The cross-referencing process can involve checking multiple compliance dimensions simultaneously, such as data sovereignty requirements, industry-specific regulations, and organizational governance policies. In some implementations, the system can implement a hierarchical compliance verification approach that first checks mandatory requirements before evaluating secondary compliance factors. The compliance evaluation can also consider jurisdictional variations in regulatory requirements based on user location, data sources, or processing locations. This comprehensive compliance verification ensures that model selection decisions satisfy all relevant regulatory constraints, reducing legal and governance risks associated with query processing.

Evaluating regulatory compliance can involve the system determining, for each of the plurality of profiles for the plurality of LLMs, whether the profile includes a plurality of certifications and authorizations required by the regulatory constraints for the query. For example, the system can check if models have necessary certifications such as SOC 2, ISO 27001, or domain-specific authorizations like HIPAA Business Associate Agreements. The system can exclude from further consideration any LLM for which the profile lacks at least one of the plurality of certifications and authorizations. In particular, this filtering step ensures that only fully compliant models remain in the candidate pool for selection. The certification verification process can involve checking digital signatures, expiration dates, and scope parameters of compliance documentation. For example, when processing financial data subject to SOX regulations, the system can verify that candidate models have current SOX compliance certifications with appropriate scope coverage. This strict compliance filtering prevents the use of non-compliant models regardless of their performance capabilities or resource efficiency.

The system ranks the plurality of LLMs according to results of the applying of the one or more criteria and results of the regulatory compliance. This ranking process creates an ordered list of candidate models based on their suitability for the specific query. For example, the system can generate composite scores that combine performance metrics, resource efficiency, and compliance status into a single ranking value. The ranking algorithm can apply different weighting schemes depending on query characteristics, such as prioritizing performance for complex queries or emphasizing resource efficiency for high-volume, routine queries. The system can implement various ranking methodologies including weighted sum models, where each attribute receives a configurable importance weight, or Analytic Hierarchy Process (AHP) techniques that systematically decompose the decision problem into a hierarchy of more easily comprehensible sub-problems. For example, when processing a financial query with strict regulatory requirements, the system can apply weights of 40% for compliance factors, 30% for domain expertise, 20% for performance metrics, and 10% for resource efficiency, resulting in a different ranking than can be generated for a creative writing query.

In some implementations, the system can generate multidimensional rankings that allow comparison across different attributes rather than collapsing all factors into a single score. This approach can utilize Pareto optimization techniques to identify non-dominated solutions where no improvement in one criterion can be achieved without sacrificing another. For example, the system can present a ranking visualization showing that Model A excels in performance but has higher resource costs, while Model B offers better efficiency with slightly reduced accuracy. The ranking process can also incorporate confidence intervals or uncertainty measures to reflect the reliability of the assessment for each model. For example, a model with limited historical data for a specific domain can receive a wider confidence interval in its ranking score compared to a well-established model with extensive performance history. The system can also implement dynamic ranking adjustments based on real-time system conditions, such as current load balancing requirements, temporary unavailability of specific models, or changing cost structures. This comprehensive ranking approach enables the system to identify the most suitable models while maintaining awareness of the tradeoffs involved in each potential selection.

The ranking system can further incorporate feedback mechanisms that learn from past routing decisions and their outcomes. By analyzing historical performance data, the system can refine ranking algorithms over time to better predict which models will perform optimally for specific query types. For example, if a particular LLM consistently outperforms its predicted ranking for medical queries despite having a lower initial score, the system can automatically adjust the weighting factors to better account for this observed performance pattern. The ranking can also include specialized tie-breaking logic for situations where multiple models receive similar scores. This tie-breaking can consider factors such as load balancing across available resources, cost optimization for equivalent performance options, or preferential selection of models with more transparent operation for highly regulated use cases. For example, if two models score within 2% of each other on the primary ranking metrics, the system can select the model with lower computational requirements to optimize resource utilization, or it can select the model with better explainability features if the query comes from a regulated industry requiring detailed decision justification.

The system prioritizes LLMs of the plurality of LLMs having successfully processed past queries matching the subject matter domain or the complexity of the query. This historical performance consideration introduces an experience-based dimension to the selection process. For example, the system can maintain performance records that track success rates, accuracy metrics, and user satisfaction scores for each model across different query types and domains. The prioritization can involve boosting the ranking scores of models with proven track records in handling similar queries. In some implementations, the system can implement time-weighted historical analysis that gives greater weight to recent performance while still considering longer-term patterns. The historical prioritization can also account for performance trends, identifying models that show improving capabilities in relevant domains over time. This experience-based prioritization enables the system to leverage institutional knowledge about model performance, reducing the risk of selecting models that have theoretical capabilities but unproven practical effectiveness for specific query types.

The system selects a particular LLM of the plurality of LLMs according to selection logic that accounts for the ranking and the prioritizing. This final selection step applies decision rules to the ranked and prioritized list of candidate models to identify the optimal choice for processing the query. For example, the selection logic can implement a decision tree that considers primary factors like compliance and performance thresholds before evaluating secondary factors like resource efficiency and historical success rates. The decision tree can first filter for models meeting all mandatory compliance requirements, then evaluate performance capabilities against query complexity, and finally consider resource efficiency among qualified candidates. In complex enterprise environments, the selection logic can incorporate multiple decision layers with different weighting schemes depending on query characteristics and organizational priorities.

The selection logic can include fallback mechanisms that identify alternative models if the top-ranked model is unavailable due to capacity constraints or operational issues. For example, if the primary selected model is experiencing high latency due to peak usage, the system can automatically route to the next best alternative that meets all requirements while maintaining acceptable performance levels. These fallback paths can be predefined based on similarity analysis between models or dynamically determined based on real-time system conditions and performance metrics. The fallback logic can implement sophisticated retry policies with exponential backoff for temporary unavailability versus immediate rerouting for complete outages.

In some implementations, the system can employ probabilistic selection approaches that occasionally choose lower-ranked but promising models to gather performance data and prevent optimization lock-in. For example, the system can implement an epsilon-greedy strategy that selects the highest-ranked model with probability $1-\varepsilon$ (e.g., 0.9) and explores a randomly selected alternative model with probability $\varepsilon$ (e.g., 0.1). This exploration component enables the system to continuously evaluate the performance of all available models across different query types and domains, preventing the system from becoming overly dependent on a small subset of models. The exploration rate can be dynamically adjusted based on query criticality, with lower exploration rates for high-stakes queries requiring maximum reliability and higher rates for routine queries where performance variability is more acceptable.

The selection logic can also incorporate organizational policies such as preferred vendor relationships or cost management directives that influence model selection beyond pure performance considerations. For example, an enterprise can have negotiated volume discounts with specific LLM providers, leading the selection logic to prefer those providers' models when performance differences are within acceptable thresholds. The system can implement budget-aware routing that tracks cumulative spending across different models and adjusts selection preferences to ensure compliance with departmental or project-specific budget allocations. In regulated industries, the selection logic can incorporate model certification status, preferring models that have undergone formal security assessments or bias evaluations even if they have slightly lower performance metrics than alternatives.

The selection logic can implement context-aware decision-making that considers the broader operational context beyond the immediate query characteristics. For example, when processing a sequence of related queries from the same user session, the system can prefer routing consecutive queries to the same model to maintain contextual consistency, even if another model scores slightly higher for an individual query in isolation. Similarly, for collaborative workflows involving multiple users, the selection logic can prioritize models that provide consistent outputs across different users working on the same project. This sophisticated selection logic ensures that the final model choice optimally balances all relevant factors while adhering to organizational constraints and preferences.

Selecting the particular LLM to process the query can involve applying the one or more criteria to compare, for each LLM, the resource consumption and the performance attributes against the performance requirements of the query, where the one or more criteria include a tradeoff analysis between minimizing computational cost and maximizing response quality. For example, the system can calculate efficiency ratios that measure performance gained per unit of computational resource consumed. These efficiency ratios can be expressed as accuracy per token cost, or quality score per compute hour, providing a standardized metric for comparing models with different cost structures and performance profiles. The system can implement sophisticated cost modeling that accounts for both direct costs (e.g., API fees, compute resources) and indirect costs (e.g., latency impact on user productivity, error remediation costs) when evaluating the true efficiency of different models.

The tradeoff analysis can employ various mathematical approaches to formalize the relationship between cost and quality. For example, the system can use Pareto efficiency analysis to identify models that offer optimal tradeoffs where no improvement in quality can be achieved without increasing cost, or vice versa. For time-sensitive applications, the system can implement time-utility functions that quantify the decreasing value of responses as latency increases, enabling more precise optimization of the speed-quality-cost tradeoff. In multi-stakeholder environments, the system can apply game theory concepts to balance competing objectives from different organizational units, such as finance departments prioritizing cost control versus operational teams prioritizing performance.

The system can generate, for the plurality of LLMs, a plurality of scores indicating a degree of fit to the performance requirements of the query while managing resource consumption. In particular, these scores can reflect how well each model balances the specific performance needs of the query with resource efficiency considerations. The scoring mechanism can implement dimensional weighting that adjusts the importance of different factors based on query characteristics. For example, for a complex financial analysis query, the system can weight accuracy at 60%, domain expertise at 25%, and cost efficiency at 15%, while for a simple informational query, the weights can be 30% for accuracy, 20% for domain expertise, and 50% for cost efficiency. The scoring system can incorporate confidence intervals that reflect uncertainty in performance predictions, particularly for models with limited historical data for specific query types.

The system can generate a ranking of the plurality of LLMs based on the plurality of scores, where the selection of the particular LLM is based at least in part on the ranking. For example, the system can sort models from highest to lowest score and select the top-ranked model that meets all mandatory requirements. The ranking process can implement sophisticated tie-breaking mechanisms for models with similar scores, such as preferring models with more consistent performance over those with higher variance or preferring models with better explainability features for regulated use cases. In some implementations, the system can generate multi-dimensional rankings rather than collapsing all factors into a single score, enabling more nuanced comparison across different attributes.

The scoring and ranking process can employ various algorithmic approaches, including weighted sum models, multi-objective optimization, or utility function maximization. For complex enterprise environments, the system can implement AHP techniques that systematically decompose the decision problem into a hierarchy of more easily comprehensible sub-problems. The system can also apply machine learning approaches that learn optimal weighting schemes from historical performance data and user feedback, gradually refining the scoring model to better predict which models will perform best for specific query types. This structured comparison approach ensures that model selection decisions are based on quantitative assessment of fit-for-purpose while maintaining resource efficiency.

Once the model is selected, the system generates a structured, human-readable explanation of the selection of the particular LLM, the structured, human-readable explanation including decision factors, rationale for LLM selection, and alternative LLMs considered when selecting the particular LLM. This explanation generation capability creates transparency and accountability for model selection decisions. For example, the explanation can document primary decision factors such as complexity match, domain expertise, compliance capabilities, and performance metrics that led to the selection. The rationale component can provide logical justification for why the selected model was deemed optimal for the specific query characteristics. The alternative models section can identify other candidates that were considered but not selected, along with reasons for their non-selection such as compliance gaps, performance limitations, or resource inefficiencies. In some implementations, the system can generate explanations with varying levels of detail based on the intended audience, from technical explanations for system administrators to simplified explanations for end users.

Generating the structured, human-readable explanation of the selection of the particular LLM can involve parsing the selection logic used to select the particular LLM to determine a plurality of selection factors. For example, the system can extract key decision points from the selection algorithm's execution path, identifying the specific factors that influenced the final choice. The system can select, from a plurality of explanation templates, an explanation template having a format corresponding to the plurality of selection factors and a type of the query. In particular, the template selection can match the explanation structure to the complexity and domain of the query using appropriate terminology and organization. The system can embed, within the explanation template, both the selection logic for selecting the particular LLM and a list of alternative LLMs, each alternative LLM annotated with at least one reason for non-selection. For example, the embedded selection logic can include a narrative description of how factors were weighted and evaluated, while the alternatives section can provide a comparative analysis of why other models were ranked lower. The template-based approach ensures consistency in explanation format while allowing customization based on query characteristics and decision factors. This structured explanation generation creates transparency that helps users understand and trust the model selection process.

Figure 4:
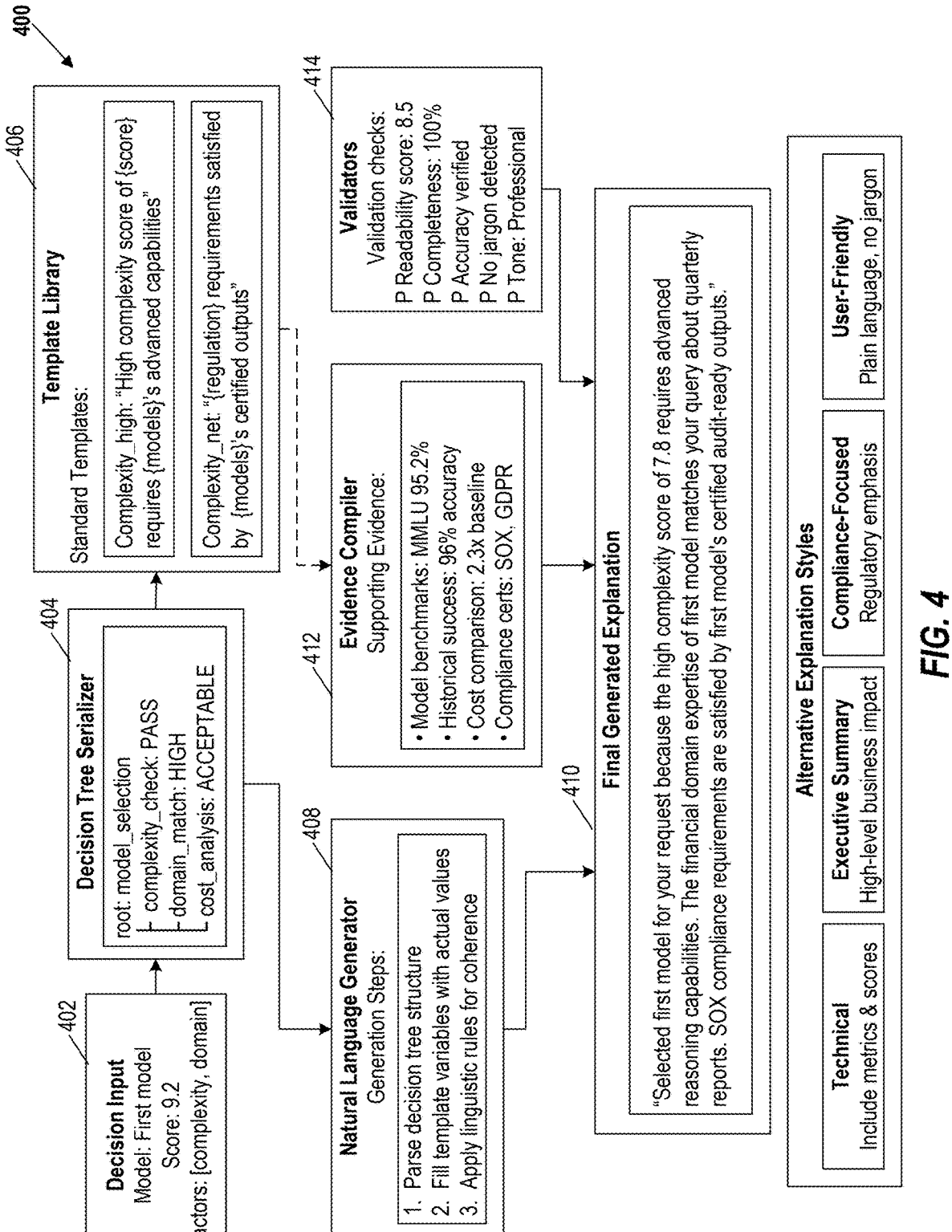
FIG. 4 illustrates an explanation generation process using templates, in accordance with some implementations of the present technology.

FIG. 4 illustrates a block diagram of an explanation generation system 400, in accordance with some implementations of the present technology. The explanation generation system 400 represents an architecture designed to transform complex routing decisions into clear, human-readable explanations that satisfy various stakeholder requirements. At the entry point of this system is the decision input 402 that provides structured model selection data and associated decision factors. For example, the decision input can include information such as "Model: the first model, Selected for: Financial Query, Primary Factors: Complexity (7.8/10), Domain (Financial), Compliance (SOX required)." This structured input encapsulates all relevant dimensions of the routing decision that must be explained to users, administrators, or regulatory authorities.

The decision input 402 connects to a decision tree serializer 404, which can transform the decision logic into a structured, machine-processable format. This component implements sophisticated algorithms that capture the hierarchical nature of the decision process, preserving the conditional logic and branching paths that led to the final model selection. For example, the serializer can encode decision paths such as "IF complexity>7 AND domain=Financial AND SOX_compliance_required=TRUE THEN select models with financial_expertise>0.8 AND SOX_certification=TRUE." The serializer preserves the complete decision context, including threshold values, comparison operators, and logical relationships between different decision factors. In some implementations, the serializer can employ different encoding formats depending on the complexity of the decision, ranging from simple JSON structures for straightforward decisions to more sophisticated graph-based representations for complex, multi-factor decisions with numerous interdependencies.

A template library 406 serves as a comprehensive repository of pre-designed explanation frameworks tailored to different decision scenarios and audience needs. This library contains various categories of templates including complexity-related templates (e.g., "This query was routed to [MODEL] because its complexity score of [SCORE] requires advanced reasoning capabilities . . . "), domain-specific templates (e.g., "For financial queries like this, [MODEL] was selected due to its specialized training in [DOMAIN_DETAILS] . . . "), and requirement-based templates focusing on specific constraints like compliance or performance. The template library implements a sophisticated indexing system that enables rapid retrieval of appropriate templates based on multiple dimensions including decision type, audience expertise level, regulatory context, and explanation purpose. Templates can include conditional sections that are only included when specific decision factors are present, allowing for dynamic composition of explanations that precisely match the specific decision context. The library can be regularly updated with new templates based on user feedback, regulatory changes, or emerging explanation best practices.

The decision tree serializer 404 and template library 406 feed into a natural language generator 408, which represents the core intelligence of the explanation system. This sophisticated component performs multiple processing steps to create coherent, contextually appropriate explanations. First, it parses the serialized decision tree structure to identify the decision points and their relationships. Next, it selects appropriate templates from the library based on the decision characteristics and target audience. The generator then fills template variables with specific values from the decision context, such as model names, performance metrics, or compliance certifications. Finally, it applies linguistic rules for coherence, including pronoun resolution, transitional phrases, and discourse markers that create a natural flow between explanation sections. The natural language generator can implement various approaches ranging from template-based generation with variable substitution to more sophisticated neural language generation techniques that can produce more flexible and natural-sounding explanations. For complex decisions, the generator can employ hierarchical explanation strategies that first provide a high-level summary before elaborating on specific decision factors.

The system includes an evidence compiler 412 that enhances explanations with supporting factual information drawn from multiple data sources. This component compiles diverse types of evidence including model benchmarks (e.g., accuracy scores on standard test sets), historical success metrics (e.g., "the first model has successfully processed 98.7% of similar financial queries in the past month"), detailed cost comparisons (e.g., token usage projections and associated costs), and compliance certifications (e.g., SOX compliance verification dates and certification authorities). The evidence compiler implements sophisticated data retrieval mechanisms that can access historical performance databases, compliance registries, and real-time system monitoring metrics. It applies contextual relevance algorithms to select the most persuasive and applicable evidence for each specific decision explanation. For example, when explaining a decision that prioritized compliance over performance, the compiler can emphasize certification details and regulatory requirements rather than performance benchmarks. The compiler can also generate comparative evidence that illustrates the tradeoffs between the selected model and alternatives, providing quantitative support for why specific models were preferred over others.

A validator 414 ensures that all generated explanations meet rigorous quality standards before being presented to users or included in audit records. This component performs multiple validation checks including readability scoring using established metrics such as Flesch-Kincaid or SMOG indexes to ensure explanations are appropriate for the intended audience. It conducts completeness verification to confirm that all relevant decision factors are addressed in the explanation, with no elements omitted. The validator performs accuracy verification by cross-checking explanation content against the original decision data to prevent misrepresentations or inconsistencies. It also assesses professional tone and terminology usage to ensure explanations maintain appropriate formality and precision, particularly for regulatory or compliance contexts. In some implementations, the validator can employ machine learning approaches trained on human-rated explanations to predict explanation quality and identify potential improvements. The validation process can be configured with different thresholds depending on the criticality of the decision, with stricter standards applied to high-stakes decisions in regulated domains.

The natural language generator 408 and evidence compiler 412 work in concert to produce a final generated explanation 410 that combines narrative clarity with factual support. The final generated explanation 410 provides comprehensive details about the model selection process and underlying reasoning in a format that balances completeness with readability. A typical explanation can begin with a summary statement (e.g., "the first model was selected to process your financial analysis query because it offers the optimal combination of financial domain expertise, SOX compliance certification, and performance capabilities"), followed by sections addressing specific decision dimensions such as complexity considerations, domain expertise requirements, compliance factors, and performance metrics. Each section can include both qualitative reasoning and quantitative evidence supporting the decision. The explanation can also address alternatives that were considered but not selected, with clear rationales for their non-selection (e.g., "the second model was considered but ranked lower due to slightly less extensive financial regulatory compliance history").

The system also includes options for generating alternative explanation styles tailored to different audiences and purposes. Technical explanations provide detailed algorithmic information for system administrators or technical auditors, including specific threshold values, scoring algorithms, and mathematical formulations of tradeoff calculations. Executive summaries offer concise, high-level explanations focusing on business impact, cost implications, and risk management for leadership audiences. Compliance-focused explanations emphasize regulatory adherence, certification details, and governance considerations for compliance officers and regulatory reviewers. User-friendly formats provide simplified explanations with minimal technical terminology for end users who need to understand the basics of why a particular model was chosen without requiring deep technical knowledge. The system can dynamically select the appropriate explanation style based on user roles, request context, or explicit style preferences, ensuring that explanations are maximally useful for their intended audience while maintaining complete fidelity to the underlying decision logic.

The system records, in an immutable audit trail data structure, the selection of the particular LLM and the structured, human-readable explanation, where the audit trail data structure is secured to provide tamper-evident recordkeeping. This audit trail capability creates a permanent, verifiable record of model selection decisions for compliance and governance purposes. For example, the audit trail can capture the complete decision context, including query characteristics, model options considered, selection criteria applied, and final choice made. The immutable structure ensures that once recorded, audit entries cannot be altered or deleted, preserving the integrity of the decision history. The tamper-evident security features can include cryptographic signatures, hash chaining between records, and distributed storage to prevent unauthorized modifications. In some implementations, the system can implement blockchain or similar distributed ledger technologies to enhance the immutability and verifiability of the audit records. The audit trail can also include metadata such as timestamps, user identifiers, and system state information to provide complete context for each recorded decision. This comprehensive audit capability enables retrospective analysis, compliance verification, and accountability for all model selection decisions.

Recording in the immutable audit trail data structure includes generating a hash of the structured, human-readable explanation. For example, the system can apply cryptographic hash functions like SHA-256 to create a unique digital fingerprint of the explanation content. The system can record a timestamp in the hash using a secure time server. In particular, this trusted timestamping provides cryptographic proof of when the record was created, preventing backdating or temporal manipulation. The system can encrypt the hash with a cryptographic signature. For example, the system can use asymmetric encryption with a private key to create a signature that can be verified but not forged. The system can transmit the hash to a tamper-evident, append-only log. For example, the system can send the signed hash to a distributed storage system that only permits new entries to be added but never modified or deleted. The cryptographic approach ensures that any attempt to alter audit records will be detectable through hash verification failures. This multi-layered security approach creates a robust audit trail that can withstand sophisticated tampering attempts and provide cryptographic proof of record authenticity and chronology.

Figure 5:
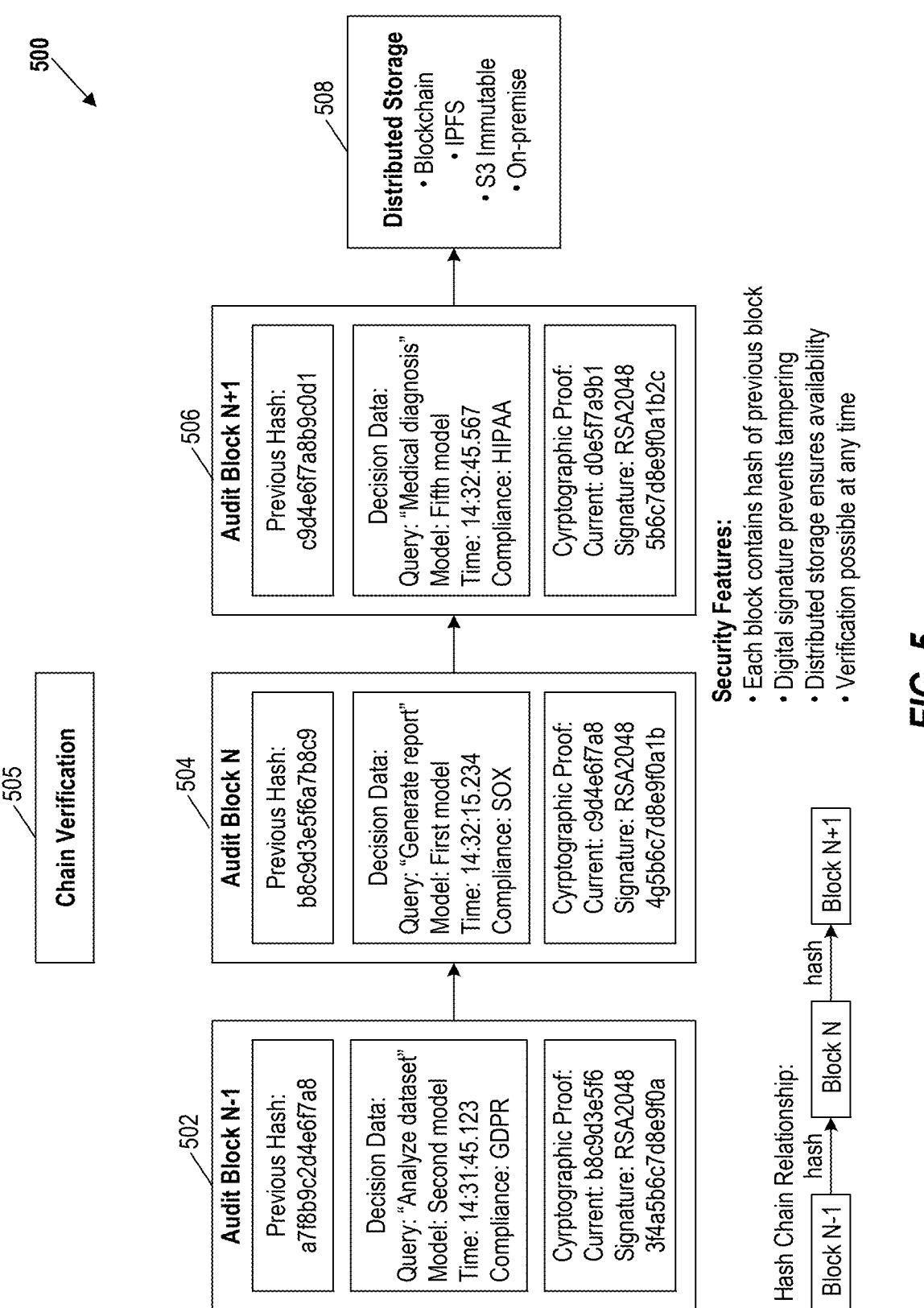
FIG. 5 illustrates an immutable audit trail architecture, in accordance with some implementations of the present technology.

FIG. 5 illustrates an immutable audit trail architecture 500, in accordance with some implementations of the present technology. The immutable audit trail architecture 500 represents a cryptographic framework designed to maintain tamper-evident records of all routing decisions made within the explainable LLM routing system. This architecture implements multiple layers of security to ensure that once a routing decision is recorded, it cannot be altered or deleted without detection, providing the verifiable chain of evidence required for regulatory compliance in industries such as finance, healthcare, and government. The system architecture employs a sequential block structure where each new decision record is cryptographically linked to previous records, creating an unbroken chain of verifiable events that can withstand forensic examination and regulatory scrutiny.

The system includes an audit block N−1 502 that can serve as the foundation for the audit chain. This initial block contains several components that establish the integrity of the entire audit trail. The previous hash field can contain a null value for the genesis block or can reference an organizational root hash that ties this audit trail to broader enterprise governance structures. The decision data section contains comprehensive metadata about the routing decision, including the original query text (or its cryptographic hash for privacy-sensitive queries), the selected model identifier, timestamp information from secure time servers, user identification data, and applicable compliance requirements such as GDPR, HIPAA, or SOX regulations that influenced the decision. The cryptographic proof section includes the current block's hash value, typically generated using secure hash algorithms such as SHA-256 or SHA-3, and digital signatures created using asymmetric encryption with organizational private keys. These signatures can be verified using corresponding public keys but cannot be forged without access to the secured private keys, providing cryptographic proof of authenticity. The audit block N 504 maintains the same fundamental structure as the audit block N−1 502, containing hash references, decision data, and cryptographic proofs, but represents the next addition to the audit chain.

The chain verification 505 mechanism can verify the linkage between sequential audit blocks that ensures the immutability of the entire record series. This verification process implements multiple cryptographic techniques to detect any tampering attempts. The primary method involves hash chaining, where each block contains a cryptographic hash of the previous block's contents. For example, if Block N contains hash H(N−1) referencing Block N−1, and someone attempts to modify Block N−1, the hash value can change to H'(N−1), creating a mismatch with the reference stored in Block N. This discrepancy can be immediately detectable during verification processes. The system can implement various hash algorithms depending on security requirements, including SHA-256 for standard applications or more computationally intensive algorithms like SHA-512 or BLAKE2 for maximum security environments. The verification process can also include timestamp validation through secure time servers, signature verification using public key infrastructure, and consistency checks across distributed storage locations to provide defense in depth against sophisticated tampering attempts.

The audit block N+1 506 maintains the same fundamental structure as previous blocks, containing hash references, decision data, and cryptographic proofs, but represents the most recent addition to the audit chain. This block can represent the current state of the audit trail and serve as the attachment point for future records. The last block can include additional security measures such as broadcast timestamps (where the block's hash is published to multiple external sources as a temporal anchor) and can implement more extensive cryptographic proofs for the chain terminus. Some implementations can include a special status field indicating that this is currently the terminal block in the chain, which can be modified when a new block is appended. The system can also implement special verification procedures for the last block, including more frequent integrity checks and redundant storage, as it represents the most likely target for tampering attempts seeking to add unauthorized new blocks to the chain.

The distributed storage 508 component provides multiple technological approaches for maintaining the audit records across diverse storage systems, enhancing both security and availability. The system supports several storage options including public or private blockchain networks, InterPlanetary File System (IPFS) distributed storage, Amazon S3 with immutable object configurations and legal hold capabilities, and on-premise solutions with specialized compliance features. Each storage approach offers different advantages: blockchain provides inherent immutability through consensus mechanisms across distributed nodes; IPFS offers content-addressed storage where records are retrieved based on their cryptographic hash rather than location; S3 with Object Lock provides WORM (Write Once Read Many) capabilities with configurable retention periods; and on-premise solutions can satisfy data sovereignty requirements for organizations that cannot store sensitive data in external systems. Many implementations utilize multiple storage approaches simultaneously, such as maintaining primary records in on-premise WORM storage while publishing hash references to public blockchain networks as additional verification anchors.

The system implements several security features to ensure the integrity of the audit trail. Hash chaining between blocks creates a cryptographic dependency where modifying any block can require recalculating all subsequent hashes, making tampering computationally infeasible without detection. Digital signatures applied using organizational private keys ensure that only authorized systems can create valid audit records, while allowing anyone with the corresponding public keys to verify authenticity. These signatures can implement various algorithms including RSA, ECDSA, or post-quantum cryptographic approaches for forward security. The distributed storage architecture ensures that even if one storage location is compromised, records remain available and verifiable through alternative locations. Some implementations include Merkle tree structures that enable efficient verification of specific records without processing the entire chain, particularly valuable for large-scale audit systems with millions of records. The system can also implement zero-knowledge proofs that allow verification of record properties (such as regulatory compliance) without revealing sensitive details contained within the records themselves.

The hash chain relationship demonstrates the fundamental cryptographic principle that ensures the immutability of the entire audit trail. This relationship shows how Block N−1 connects to Block N and Block N+1 through cryptographic hash values, creating a continuous chain of verifiable records. For example, if Block N contains the hash H(N−1) of Block N−1, and Block N+1 contains the hash H(N) of Block N, then any modification to Block N can change its hash from H(N) to a different value H'(N), creating a mismatch with the reference stored in Block N+1. This principle extends throughout the entire chain, where modifying any block can require recalculating all subsequent hashes and digital signatures—a computationally infeasible task without access to the secured private keys. The system can implement various verification protocols that regularly traverse the entire chain to confirm integrity, including scheduled verification jobs, random spot-checks, and triggered verification upon access. Each block maintains comprehensive decision data related to specific queries, model selections, and compliance requirements, with corresponding cryptographic proofs ensuring that the entire history of routing decisions remains intact and verifiable for regulatory compliance, governance reviews, and system optimization purposes.

Figure 6:
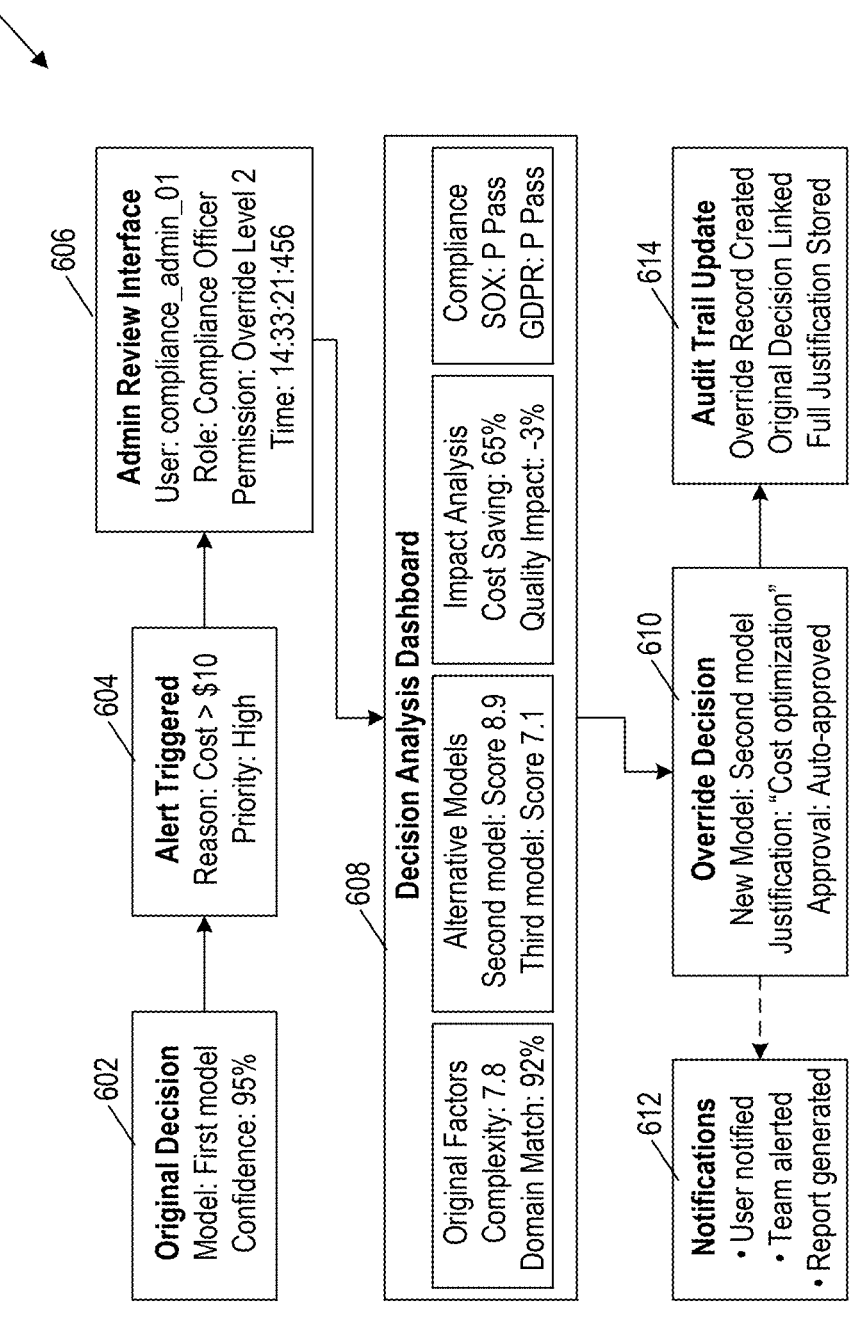
FIG. 6 illustrates an override control system workflow, in accordance with some implementations of the present technology.

FIG. 6 illustrates an override control system workflow 600, in accordance with some implementations of the present technology. The override control system workflow 600 represents a comprehensive framework for enabling authorized human intervention in the automated routing process while maintaining full accountability and audit capabilities. This human-in-the-loop mechanism addresses regulatory requirements in industries where automated decisions must be subject to expert review and potential modification. The workflow begins with an original decision 602, which displays the initial model selection made by the automated routing system. In this example, the system has selected a first model with a confidence level of 95%, indicating high certainty in the appropriateness of this model for the specific query characteristics. The original decision component captures all relevant decision metadata including the selected model, confidence metrics, cost estimates, and compliance status to provide a complete picture of the automated selection.

Following the original decision, the override control system workflow 600 includes an alert triggered 604, which represents the system's automated monitoring capabilities that flag potential issues requiring human review. In this implementation, the alert indicates a "Reason: Cost>$10" with "Priority: High," demonstrating how the system can identify decisions that exceed predefined thresholds for various metrics. The alert system can be configured with multiple trigger conditions beyond cost considerations, including compliance uncertainty, novel query types, or specific regulatory flags. For example, in financial services applications, the system can trigger alerts for model selections involving high-value transactions or in healthcare contexts for patient-critical information. Each alert can be assigned different priority levels (e.g., Low, Medium, High, Critical) that determine response time requirements and escalation paths. The alert component includes mechanisms for notification delivery through multiple channels including dashboard displays, email notifications, and integration with enterprise messaging systems to ensure timely review by appropriate personnel.

The override control system workflow 600 proceeds to an admin review interface 606, which implements a sophisticated role-based access control system for override capabilities. The interface displays comprehensive user information including identification as a compliance admin user, role designation as Compliance Officer, override level 2 permission, and a precise timestamp for audit purposes. The role-based permission system restricts override capabilities to appropriate personnel based on their responsibilities and expertise within the organization. For example, a Level 1 permission can allow overrides only for cost optimization without changing compliance parameters, while Level 3 permissions can permit overrides even for compliance decisions. The admin review interface provides contextual information about the original decision, alert trigger conditions, and historical patterns of similar decisions to help the reviewer make informed judgments. The interface can implement different views optimized for various roles such as compliance officers, technical administrators, or business analysts, with each view emphasizing the most relevant decision factors for that role.

The process then flows to a decision analysis dashboard 608, which serves as the central analytical component for override decisions. The dashboard is divided into four specialized sections that provide comprehensive decision context: Original Factors, Alternative Models, Impact Analysis, and Compliance information. The Original Factors section displays detailed metrics about the initial decision, including complexity scores (e.g., 7.8/10), domain match percentages (e.g., Financial: 92%), and other query characteristics that influenced the original model selection. The Alternative Models section presents viable alternative options with comparative metrics, enabling the reviewer to understand tradeoffs between different model choices. The Impact Analysis section provides quantitative assessments of potential changes, including projected cost savings (e.g., $8.50 per query, $4,250 monthly), performance impacts (e.g., +0.3 s latency), and quality differentials (e.g., −2% accuracy). The Compliance section displays detailed regulatory status information, showing compliance status for various frameworks such as SOX and GDPR, with indicators for certification status, expiration dates, and scope coverage. This multi-dimensional dashboard enables reviewers to make fully informed override decisions with clear understanding of all potential consequences.

From the comprehensive analysis dashboard, the override control system workflow 600 continues to an override decision 610 component that captures the specific changes being made, indicating in this example a "New Model: Second model" with detailed justification for "Cost optimization" and showing auto-approval status based on the reviewer's permission level. The override decision component implements sophisticated validation logic to ensure that the selected alternative meets all mandatory requirements, particularly for compliance-critical applications. For example, if a reviewer attempts to select a model lacking required certifications for a regulated use case, the system can display warnings or prevent the override entirely depending on configuration. The override component can support different approval workflows based on the significance of the change, with options ranging from auto-approval for routine overrides by authorized personnel to multi-level approval chains for changes that can require sign-off from multiple stakeholders such as compliance officers, technical administrators, and business owners.

A notifications 612 component implements comprehensive communication protocols to ensure that all relevant stakeholders are informed about the override. This includes user notification (informing the original query submitter about the change in processing model), team alerts (notifying relevant technical and business teams about the override pattern), and report generation (creating formal documentation for compliance purposes). The notification system can be configured with different delivery mechanisms including real-time alerts, digest summaries, and integration with enterprise communication platforms. For example, individual users can receive immediate notifications about overrides affecting their specific queries, while management can receive daily or weekly summaries of override patterns and their business impacts. The notification component can implement intelligent aggregation to prevent alert fatigue, such as grouping similar overrides into single notifications when appropriate while ensuring that critical overrides always generate immediate alerts.

An audit trail update 614 component ensures comprehensive documentation of the entire override process within the system's immutable recordkeeping framework. This component creates a detailed override record containing all relevant information about the decision change, links this record to the original decision to maintain the complete decision history, and stores the full justification provided by the reviewer along with their identity and timestamp. The audit trail implements sophisticated cryptographic techniques to ensure tamper-evident recordkeeping, including digital signatures of override records using the reviewer's credentials, hash chaining to previous audit records, and secure timestamping from trusted time sources. For regulated industries, the audit component can generate specialized compliance artifacts such as signed attestations, decision certificates, or regulatory filing documents that satisfy specific governance requirements. The audit trail can maintain different retention policies for override records based on the applicable regulatory frameworks, such as seven-year retention for financial records under SOX or indefinite retention for certain healthcare decisions under HIPAA.

FIG. 7 illustrates a flowchart showing a medical diagnosis query routing example 700, in accordance with some implementations of the present technology. The flowchart provides a comprehensive visualization of the entire routing process from initial query to final audit record creation, demonstrating how the system handles complex medical queries requiring specialized knowledge and regulatory compliance. The example showcases the system's ability to process healthcare information while maintaining HIPAA compliance and providing transparent decision rationales that can be audited for regulatory purposes. This medical use case represents a demanding scenario for LLM routing systems, as it involves sensitive patient data, specialized domain knowledge requirements, and strict regulatory constraints that must all be balanced against performance and cost considerations.

The flowchart begins with step 702, which shows an original query containing patient symptoms including persistent headache, photophobia, neck stiffness, and fever, along with a request for differential diagnosis and treatment recommendations. This example query demonstrates several challenging aspects of medical queries, including the presence of specialized terminology, implicit urgency due to potentially serious symptoms, and the need for both diagnostic reasoning and treatment planning capabilities. The query text includes specific clinical symptoms that can indicate various conditions ranging from migraine to meningitis, requiring sophisticated medical knowledge to analyze properly. The system must recognize both the explicit content (the symptoms themselves) and the implicit requirements (medical expertise, diagnostic reasoning capabilities) to route this query effectively. Alternative query types in the medical domain can include medication interaction checks, medical literature research requests, or patient education material generation, each with different routing requirements.

The flowchart proceeds to step 704, which displays multidimensional analysis results across four categories: complexity analysis, domain classification, compliance requirements, and performance needs. The complexity analysis section shows a high complexity score of 8.9/10, reflecting the sophisticated reasoning required for differential diagnosis. It identifies multiple complexity factors including specialized terminology density, diagnostic reasoning requirements, and treatment planning needs. The domain classification section categorizes the query primarily in the Medical/Clinical domain with a specialty of Neurology, with 97% confidence, demonstrating the system's ability to recognize multiple relevant knowledge areas. The compliance requirements section identifies HIPAA as the primary regulatory framework, with specific requirements for protected health information (PHI) handling, medical data processing restrictions, and patient confidentiality safeguards. The performance needs section establishes strict requirements that can include high accuracy (>95%), moderate response time (<10 s), and high priority status, reflecting the critical nature of medical information processing. This comprehensive analysis creates a detailed profile of the query that guides subsequent model selection decisions.

Moving to step 706, the flowchart shows model evaluation and selection results comparing different models (Med-GPT, GPT-4, Claude-3) based on medical expertise, compliance, accuracy, and cost factors, with corresponding scores and a final selection decision. The evaluation matrix presents a detailed comparison across multiple dimensions, with Med-GPT scoring highest overall at 9.5/10, followed by GPT-4 at 7.2/10 and Claude-3 at 6.1/10. Med-GPT demonstrates superior medical domain expertise (9.8/10) compared to GPT-4 (7.5/10) and Claude-3 (6.8/10), reflecting its specialized training on medical literature and clinical data. Med-GPT is HIPAA certified, GPT-4 is partially compliant with HIPAA, and Claude-3 is non-compliant. In some implementations, Med-GPT offers additional medical-specific certifications. The accuracy metrics show Med-GPT achieving 99.2% on medical benchmarks, outperforming both GPT-4 (95.1%) and Claude-3 (93.5%). Cost considerations are also presented, with Med-GPT showing a moderate cost profile of $0.08/1 k tokens, compared to GPT-4's higher cost of $0.03/1 k tokens and Claude-3's $0.02/1 k tokens. The system selects Med-GPT as the optimal model based on this comprehensive evaluation, prioritizing domain expertise and accuracy over slight cost disadvantages for this critical medical use case.

The process continues to step 708, which presents a generated explanation summarizing the routing decision. The explanation employs natural language generation techniques to transform the technical decision factors into a clear, structured narrative accessible to both technical and non-technical stakeholders. It begins with a summary statement identifying Med-GPT as the selected model due to its specialized medical capabilities and HIPAA compliance. The explanation details the selection rationale, including factors such as complexity score, specialized medical terminology requirements, and model performance metrics. It can highlight Med-GPT's superior performance on medical diagnostic tasks. The explanation addresses regulatory considerations by noting Med-GPT's HIPAA compliance certification and specialized PHI handling capabilities. It also discusses alternatives that were considered, explaining that while GPT-4 and Claude-3 both met basic requirements, they scored lower on medical expertise metrics important for differential diagnosis tasks. The explanation concludes with performance expectations, including estimated response time and confidence level. This comprehensive explanation ensures full transparency in the routing decision, enabling users, administrators, and auditors to understand exactly why Med-GPT was selected for this particular medical query.

The flowchart concludes with step 710, showing an immutable audit record containing technical details such as record ID, timestamp, query hash, model selection information, compliance data, and processing metrics. This record implements sophisticated cryptographic techniques to ensure tamper-evident recordkeeping suitable for regulatory compliance in healthcare environments. The record includes a unique identifier that enables precise retrieval and reference. The timestamp is obtained from a secure time server with cryptographic verification to prevent backdating. The query content is represented by a secure hash rather than the full text, protecting patient privacy while maintaining verifiability. The model selection section can document both the selected model (e.g., Med-GPT v3.2) and alternatives considered (e.g., GPT-4, Claude-3) with respective scores. Compliance information can include HIPAA certification details and other relevant details. Processing metrics can capture performance data. The record is secured with a cryptographic signature using asymmetric encryption and linked to previous records through hash chaining, creating an unbroken chain of verifiable events. This comprehensive audit record provides the verifiable trail of the routing decision and its implementation, satisfying healthcare compliance requirements while enabling system optimization through performance analysis.

FIG. 8 illustrates a flowchart of a process 800 for model selection and explanation generation, according to some implementations of the disclosed technology. In some implementations, process 800 can be performed by a system including components of the explainable LLM routing system architecture 100 illustrated and described in more detail with reference to FIG. 1. The system can be implemented on a server, distributed computing environment, or cloud-based infrastructure. Implementations can include different and/or additional operations or can perform the operations in different orders.

In operation 802, the system receives a query from a user via an input interface. The input interface can serve as the entry point for user queries into the explainable LLM routing system. For example, the input interface can include a web portal, API endpoint, or command-line interface that allows users to submit natural language queries or structured requests. The system can preprocess incoming queries through tokenization, normalization, and initial classification to prepare them for further analysis. In some implementations, the input interface can support multiple input formats including text, voice, or structured data and can implement authentication mechanisms to verify user identity and authorization levels before accepting queries. The interface can also provide real-time feedback to users about query formatting or potential issues before submission.

In operation 804, the system determines a plurality of characteristics of the query, the plurality of characteristics including regulatory constraints for the query and performance requirements for processing the query. The system can analyze multiple dimensions of the incoming query to create a comprehensive profile that guides subsequent model selection decisions. For example, the system can determine the complexity of the query by evaluating syntactic structures, semantic complexity, and computational requirements based on established benchmarks and historical data. The system can classify the query into a subject matter domain using a domain classification model that utilizes natural language processing techniques to identify key terms, entities, and concepts within the query text. The regulatory constraints can be determined by invoking a rules engine configured to identify jurisdictional and sector-specific compliance requirements, such as detecting mentions of PII, financial data, or healthcare information that trigger specific regulatory frameworks like GDPR, SOX, or HIPAA. Performance requirements can be assessed using a performance predictor that evaluates query complexity, user expectations, and system load to establish appropriate service level targets.

In operation 806, the system retrieves a plurality of profiles for a plurality of models, each of the plurality of profiles including performance attributes, resource consumption, and regulatory compliance parameters. The model matrix can serve as a comprehensive repository of information about available LLMs that can be selected for query processing. Performance attributes can describe the capabilities and effectiveness of each model across different tasks and domains, including accuracy metrics, specialization areas, and historical performance data. Resource consumption parameters can quantify the computational costs associated with using each model, such as processing time, memory usage, and financial costs per token. Regulatory compliance parameters can document each model's certifications, authorizations, and compliance status with respect to various regulatory frameworks and standards. For example, the model matrix can include profiles for general-purpose models as well as domain-specialized models optimized for specific fields such as healthcare, finance, or legal applications. The system can maintain this matrix as a dynamic database that is regularly updated with new performance benchmarks, compliance certifications, and resource metrics.

In operation 808, the system applies one or more criteria to balance the resource consumption and performance attributes of each model with the performance requirements for processing the query. This balancing process can involve sophisticated tradeoff analysis between computational efficiency and response quality. For example, the system can apply weighted scoring algorithms that consider factors such as processing time, memory usage, and financial cost per token against performance metrics like accuracy, relevance, and domain expertise. The criteria can include cost optimization functions that identify the most economical model capable of meeting minimum performance thresholds for the query type. In some implementations, the system can employ adaptive criteria that adjust weightings based on query priority, time sensitivity, or user preferences, incorporating feedback loops that learn from past routing decisions and gradually refine weighting parameters based on observed performance outcomes and user satisfaction metrics. The system can implement different optimization strategies depending on operational contexts, such as using greedy algorithms for time-sensitive queries or more thorough combinatorial optimization approaches for complex, high-stakes queries.

In operation 810, the system evaluates regulatory compliance by cross-referencing the regulatory compliance parameters for each model against the regulatory constraints for the query. This evaluation can ensure that the selected model meets all applicable legal and governance requirements for processing the specific query. For example, if a query involves healthcare data subject to HIPAA regulations, the system can verify that candidate models possess the necessary HIPAA compliance certifications. The cross-referencing process can involve checking multiple compliance dimensions simultaneously, such as data sovereignty requirements, industry-specific regulations, and organizational governance policies. In some implementations, the system can implement a hierarchical compliance verification approach that first checks mandatory requirements before evaluating secondary compliance factors. The system can determine, for each model profile, whether it includes the certifications and authorizations required by the regulatory constraints and exclude from further consideration any model lacking required compliance credentials.

In operation 812, the system selects a particular model according to results of the applying of the one or more criteria and results of the regulatory compliance. This selection process can involve multiple evaluation steps that assess different aspects of model suitability for the specific query. The system can rank the plurality of models according to the results of the criteria application and regulatory compliance evaluation, creating an ordered list of candidate models based on their suitability. For example, the system can generate composite scores that combine performance metrics, resource efficiency, and compliance status into a single ranking value. The system can prioritize models having successfully processed past queries matching the subject matter domain or complexity of the current query, introducing an experience-based dimension that leverages institutional knowledge about model performance. The final selection can apply decision rules to the ranked and prioritized list, implementing decision trees that consider primary factors like compliance and performance thresholds before evaluating secondary factors like resource efficiency and historical success rates.

In operation 814, the system generates a structured, human-readable explanation of the selection of the particular model. This explanation generation capability can create transparency and accountability for model selection decisions. The system can parse the selection logic used to select the particular model to determine a plurality of selection factors, extracting key decision points from the selection algorithm's execution path. For example, the system can select an explanation template from a plurality of templates, choosing one with a format corresponding to the selection factors and query type. The system can embed within the explanation template both the selection logic for selecting the particular model and a list of alternative models, with each alternative annotated with reasons for non-selection such as compliance gaps, performance limitations, or resource inefficiencies. The explanation can document primary decision factors such as complexity match, domain expertise, compliance capabilities, and performance metrics that led to the selection, providing logical justification for why the selected model was deemed optimal for the specific query characteristics.

In operation 816, the system records the selection of the particular model and the structured, human-readable explanation in an immutable audit trail data structure. This audit trail capability can create a permanent, verifiable record of model selection decisions for compliance and governance purposes. The system can generate a hash of the structured explanation using cryptographic hash functions like SHA- 256 to create a unique digital fingerprint of the explanation content. The system can record a timestamp in the hash using a secure time server, providing cryptographic proof of when the record was created and preventing backdating or temporal manipulation. For example, the system can encrypt the hash with a cryptographic signature using asymmetric encryption with a private key to create a signature that can be verified but not forged. The system can transmit the hash to a tamper-evident, append-only log, such as a distributed storage system that only permits new entries to be added but never modified or deleted. This multi-layered security approach can create a robust audit trail that withstands sophisticated tampering attempts and provides cryptographic proof of record authenticity and chronology.

Other Implementations

The disclosed system (hereinafter "data generation platform") herein enables dynamic model selection for processing inputs to generate associated outputs across distributed data sources. The data generation platform uses a generalized model to partition query requests into segments and route the segments to domain-specific models that are specialized for particular domains through training on domain-specific data. The domain-specific models generate query fragments by comparing performance metrics and system resource usage metrics. The query fragments can be aggregated into an overall query that satisfies guidelines across the domains. The data generation platform can, in some implementations, maintain a feedback loop that adjusts domain-specific models based on user interactions and performance metrics. When processing queries, the data generation platform measures performance metrics including compound values based on factors such as compliance, computation speed, resource usage, number of tokens, and accuracy. The data generation platform can consider specific user features learned over time, such as explicit user requests, inferred autonomy preferences, and skill level. Thus, the data generation platform is enabled to dynamically adapt to different users' needs, reducing intervention for experienced users while providing additional support and automated workflows for less experienced users. Additionally, the data generation platform can provide context-specific recommendations based on detected user focus areas, such as suggesting related queries when users consistently work with particular types of data.

Further, users or services of pre-existing software development systems (e.g., data pipelines for data processing and model or application development) do not have intuitive, consistent, or reliable ways to select particular models (e.g., domain-specific models) and/or design associated prompts in order to solve a given problem (e.g., to generate a desired query associated with a particular software application). As such, pre-existing systems risk selection of sub-optimal (e.g., relatively inefficient and/or insecure) generative machine learning models. Moreover, pre-existing development pipelines do not validate outputs of the models for security breaches in a context-dependent and flexible manner. Code generated through a model can contain an error or a bug that can cause system instability (e.g., through loading the incorrect dependencies). Some generated outputs can be misleading or unreliable (e.g., due to model hallucinations or obsolete training data). Additionally or alternatively, some generated data (e.g., associated with natural language text) is not associated with the same severity of security risks.

The data generation platform disclosed herein further enables dynamic evaluation of machine learning prompts for model selection, as well as validation of the resulting outputs, in order to improve the security, reliability, and modularity of data pipelines (e.g., software development systems). The data generation platform can receive a prompt from a user (e.g., a human-readable request relating to software development, such as code generation) and determine whether the user is authenticated based on an associated authentication token (e.g., as provided concurrently with the prompt). Based on the selected model, the data generation platform can determine a set of performance metrics (and/or corresponding values) associated with processing the requested prompt via the selected model. By doing so, the data generation platform can evaluate the suitability of the selected model (e.g., LLM) for generating an output based on the received input or prompt. The data generation platform can validate and/or modify the user's prompt according to a prompt validation model.

The selected model(s) (e.g., domain-specific models) encounter further challenges as AI applications increasingly adopt AI agentic frameworks. AI agentic frameworks enable computing (e.g., software, software and hardware, and so forth) agents to operate autonomously, making decisions and performing actions based on their programming, learned behavior, or suggestions from AI models, or a combination of all three. While AI agentic frameworks offer substantial benefits in automating complex tasks, one major concern is the potential for agents to become rogue and make unauthorized or harmful decisions autonomously. The potential high risk associated with particular applications, databases, and systems creates significant challenges in managing agentic frameworks because the components often handle sensitive data. Conventional approaches to controlling rogue agent actions are predominantly reactive, often addressing issues only after they have occurred, which can be too late to prevent significant damage.

As such, the data generation platform disclosed herein further continuously monitors and evaluates the actions of autonomous agents (e.g., domain-specific models) in near real time. The disclosed system receives a set of alphanumeric characters (e.g., boundaries, regulations, guidelines, and so forth) defining constraints and operational data for a set of agents. Each agent (AI-based or not AI-based) uses predefined objectives to generate proposed actions. The system can identify gaps, or deficiencies in the agent's proposed actions, by comparing expected actions with proposed actions. AI model(s) (same or different) can use the identified gaps to modify the proposed actions by adding, altering, or removing actions.

Non-compliance of AI applications is further complicated as guidelines (e.g., regulations, standards) increasingly become more complex (e.g., protections against bias, harmful language, intellectual property (IP) rights). For example, guidelines can include requirements that require AI applications to produce outputs that are free from bias, harmful language, and/or IP rights violations to uphold ethical standards and protect users. Traditional approaches to regulatory compliance often involve manual interpretation of regulatory texts, followed by ad hoc efforts to align AI systems with compliance requirements. However, the manual process is subjective, lacks scalability, and is error-prone, which makes the approach increasingly unsustainable in the face of growing guidelines and the rapidly increasing prevalence of AI applications.

As such, the data generation platform disclosed herein further assesses and ensures adherence to guidelines (e.g., preventing bias, harmful language, IP violations). The data generation platform uses a meta-model that consists of one or more models to analyze different aspects of AI-generated content. For example, one of the models can be trained to identify certain patterns (e.g., patterns indicative of bias) within the content by evaluating demographic attributes and characteristics present in the content. In some implementations, the system can incorporate a correction module to adjust the parameters of the AI model and/or updates training data based on the findings of the detection models to ensure that non-compliant content is promptly addressed and mitigated.

In cases where non-compliance is detected, conventional approaches to mapping gaps (e.g., issues) in controls (e.g., a set of expected actions) to operative standards (e.g., obligations, criteria, measures, principles, conditions) heavily rely on manually mapping each gap to one or more operative standards. Using manual processes heavily depends on individual knowledge and thus poses a significant risk for potential bias. This subjectivity can result in inconsistent mappings, as different individuals may understand and apply operative standards such as regulatory requirements in varied ways.

As such, the data generation platform disclosed herein further uses generative AI (e.g., GAI, GenAI, generative artificial intelligence) models, such as an LLM in the above-described data generation platform, to map gaps in controls to corresponding operative standards. The data generation platform can determine a set of vector representations of alphanumeric characters represented by one or more operative standards, which contain a first set of actions adhering to constraints in the set of vector representations. The data generation platform uses a received output generation request to construct a set of prompts for each gap to compare the corresponding gap against the first set of actions of the operative standards or the set of vector representations. For each gap, the system maps the gap to one or more operative standards of the set of vector representations.

Further, in cases where non-compliance is detected, conventional approaches to identifying actionable items from guidelines present several challenges. Typically, conventional methods include either human reviewers or automated systems processing guidelines in a linear fashion. The conventional linear approach often leads to an overwhelming number of actionable items being identified. Furthermore, conventional approaches lack the ability to dynamically adapt to changes in guidelines over time.

As such, the data generation platform disclosed herein further identifies actionable items from guidelines. The data generation platform partitions guidelines into multiple subsets based on predetermined criteria, such as the length or complexity of each text subset. Using the partitioned guidelines, the data generation platform constructs a set of prompts for each text subset. Each text subset can be mapped to one or more actions in the first set of actions. Unlike conventional linear processes that result in an overwhelming number of redundant actionable items, by heuristically analyzing guidelines, the system can identify common actionable items without parsing through the guideline documents word by word.

While the current description provides examples related to LLMs, one of skill in the art would understand that the disclosed techniques can apply to other forms of machine learning or algorithms, including unsupervised, semi-supervised, supervised, and reinforcement learning techniques. For example, the disclosed data generation platform can evaluate model outputs from support vector machine (SVM), k-nearest neighbor (KNN), decision-making, linear regression, random forest, naïve Bayes, or logistic regression algorithms, and/or other suitable computational models.

Overview of the Data Generation Platform

Figure 9:
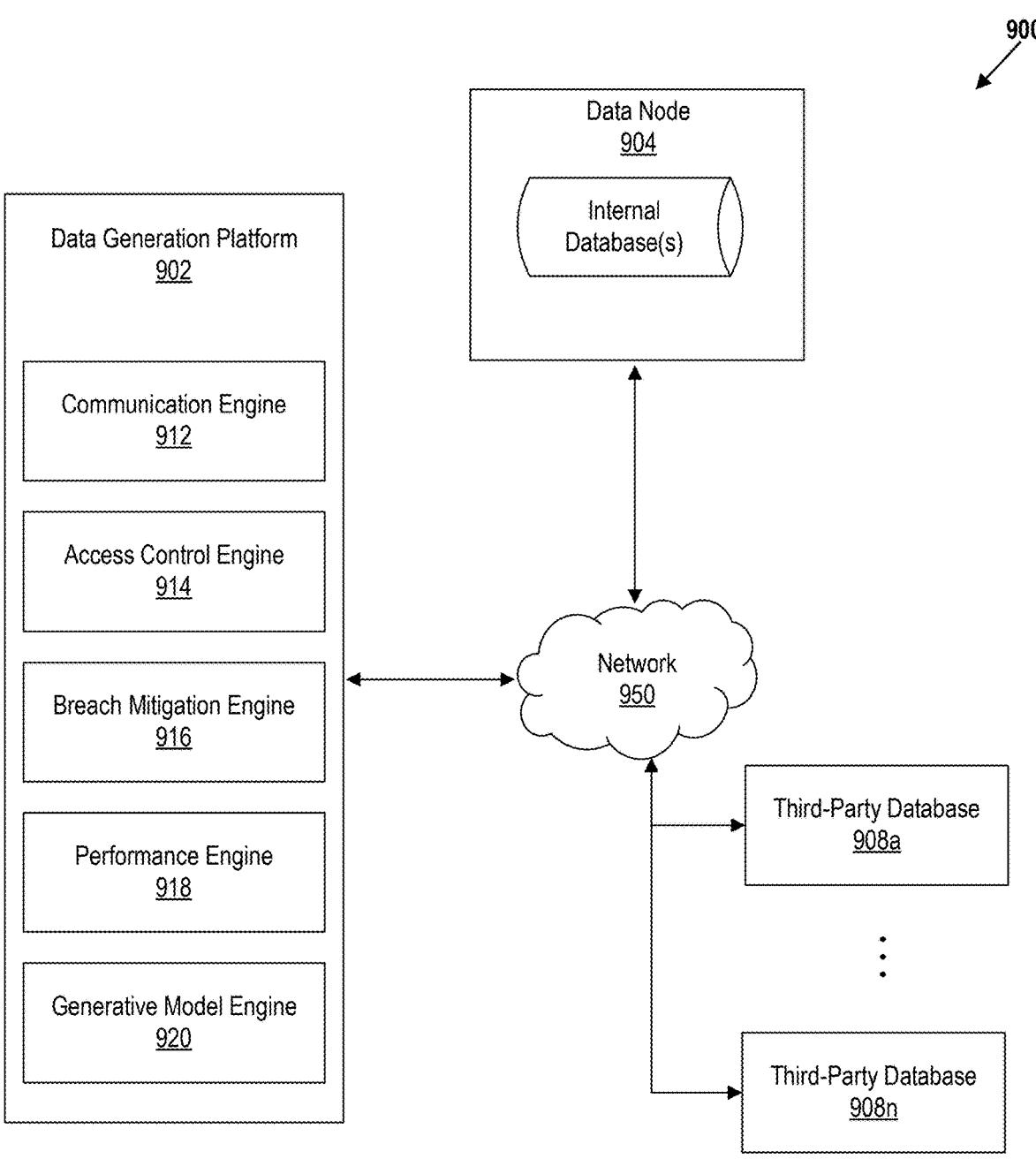
FIG. 9 shows an illustrative environment for evaluating language model prompts and outputs for model selection and validation, in accordance with some implementations to the disclosed technology.

FIG. 9 shows an illustrative environment 900 for evaluating machine learning model inputs (e.g., language model prompts) and outputs for model selection and validation, in accordance with some implementations to the disclosed technology. For example, the environment 900 includes the data generation platform 902, which is capable of communicating with (e.g., transmitting or receiving data to or from) a data node 904 and/or third-party databases 908a-908n via a network 950. The data generation platform 902 can include software, hardware, or a combination of both and can reside on a physical server or a virtual server running on a physical computer system. For example, the data generation platform 902 can be distributed across various nodes, devices, or virtual machines (e.g., as in a distributed cloud server). In some implementations, the data generation platform 902 can be configured on a user device (e.g., a laptop computer, smartphone, desktop computer, electronic tablet, or another suitable user device). Furthermore, the data generation platform 902 can reside on a server or node and/or can interface with third-party databases 908a-908n directly or indirectly.

The data node 904 can store various data, including one or more machine learning models, prompt validation models, associated training data, user data, performance metrics and corresponding values, validation criteria, and/or other suitable data. For example, the data node 904 includes one or more databases, such as an event database (e.g., a database for storage of records, logs, or other information associated with LLM-related user actions), a vector database, an authentication database (e.g., storing authentication tokens associated with users of the data generation platform 902), a secret database, a sensitive token database, and/or a deployment database.

An event database can include data associated with events relating to the data generation platform 902. For example, the event database stores records associated with users' inputs or prompts for generation of an associated natural language output (e.g., prompts intended for processing using an LLM). The event database can store timestamps and the associated user requests or prompts. In some implementations, the event database can receive records from the data generation platform 902 that include model selections/determinations, prompt validation information, user authentication information, and/or other suitable information. For example, the event database stores platform-level metrics (e.g., bandwidth data, central processing unit (CPU) usage metrics, and/or memory usage associated with devices or servers associated with the data generation platform 902). By doing so, the data generation platform 902 can store and track information relating to performance, errors, and troubleshooting. The data generation platform 902 can include one or more subsystems or subcomponents. For example, the data generation platform 902 includes a communication engine 912, an access control engine 914, a breach mitigation engine 916, a performance engine 918, and/or a generative model engine 920.

A vector database can include data associated with vector embeddings of data. For example, the vector database includes a numerical representations (e.g., arrays of values) that represent the semantic meaning of unstructured data (e.g., text data, audio data, or other similar data). For example, the data generation platform 902 receives inputs such as unstructured data, including text data, such as a prompt, and utilize a vector encoding model (e.g., with a transformer or neural network architecture) to generate vectors within a vector space that represents meaning of data objects (e.g., of words within a document). By storing information within a vector database, the data generation platform 902 can represent inputs, outputs, and other data in a processable format (e.g., with an associated LLM), thereby improving the efficiency and accuracy of data processing.

An authentication database can include data associated with user or device authentication. For example, the authentication database includes stored tokens associated with registered users or devices of the data generation platform 902 or associated development pipeline. For example, the authentication database stores keys (e.g., public keys that match private keys linked to users and/or devices). The authentication database can include other user or device information (e.g., user identifiers, such as usernames, or device identifiers, such as medium access control (MAC) addresses). In some implementations, the authentication database can include user information and/or restrictions associated with these users.

A sensitive token (e.g., secret) database can include data associated with secret or otherwise sensitive information. For example, secrets can include sensitive information, such as API keys, passwords, credentials, or other such information. For example, sensitive information includes personally identifiable information (PII), such as names, identification numbers, or biometric information. By storing secrets or other sensitive information, the data generation platform 902 can evaluate prompts and/or outputs to prevent breaches or leakage of such sensitive information.

A deployment database can include data associated with deploying, using, or viewing results associated with the data generation platform 902. For example, the deployment database can include a server system (e.g., physical or virtual) that stores validated outputs or results from one or more LLMs, where such results can be accessed by the requesting user.

The data generation platform 902 can receive inputs (e.g., prompts), training data, validation criteria, and/or other suitable data from one or more devices, servers, or systems. The data generation platform 902 can receive such data using communication engine 912, which can include software components, hardware components, or a combination of both. For example, the communication engine 912 includes or interfaces with a network card (e.g., a wireless network card and/or a wired network card) that is associated with software to drive the card and enables communication with network 950. In some implementations, the communication engine 912 can also receive data from and/or communicate with the data node 904, or another computing device. The communication engine 912 can communicate with the access control engine 914, the breach mitigation engine 916, the performance engine 918, and the generative model engine 920.

In some implementations, the data generation platform 902 can include the access control engine 914. The access control engine 914 can perform tasks relating to user/device authentication, controls, and/or permissions. For example, the access control engine 914 receives credential information, such as authentication tokens associated with a requesting device and/or user. In some implementations, the access control engine 914 can retrieve associated stored credentials (e.g., stored authentication tokens) from an authentication database (e.g., stored within the data node 904). The access control engine 914 can include software components, hardware components, or a combination of both. For example, the access control engine 914 includes one or more hardware components (e.g., processors) that are able to execute operations for authenticating users, devices, or other entities (e.g., services) that request access to an LLM associated with the data generation platform 902. The access control engine 914 can directly or indirectly access data, systems, or nodes associated with the third-party databases 908a-908n and can transmit data to such nodes. Additionally or alternatively, the access control engine 914 can receive data from and/or send data to the communication engine 912, the breach mitigation engine 916, the performance engine 918, and/or the generative model engine 920.

The breach mitigation engine 916 can execute tasks relating to the validation of inputs and outputs associated with the LLMs. For example, the breach mitigation engine 916 validates inputs (e.g., prompts) to prevent sensitive information leakage or malicious manipulation of LLMs, as well as validate the security or safety of the resulting outputs. The breach mitigation engine 916 can include software components (e.g., modules/virtual machines that include prompt validation models, performance criteria, and/or other suitable data or processes), hardware components, or a combination of both. As an illustrative example, the breach mitigation engine 916 monitors prompts for the inclusion of sensitive information (e.g., PII), or other forbidden text, to prevent leakage of information from the data generation platform 902 to entities associated with the target LLMs. The breach mitigation engine 916 can communicate with the communication engine 912, the access control engine 914, the performance engine 918, the generative model engine 920, and/or other components associated with the network 950 (e.g., the data node 904 and/or the third-party databases 908a-908n).

The performance engine 918 can execute tasks relating to monitoring and controlling performance of the data generation platform 902 (e.g., or the associated development pipeline). For example, the performance engine 918 includes software components (e.g., performance monitoring modules), hardware components, or a combination thereof. To illustrate, the performance engine 918 can estimate performance metric values associated with processing a given prompt with a selected LLM (e.g., an estimated cost or memory usage). By doing so, the performance engine 918 can determine whether to allow access to a given LLM by a user, based on the user's requested output and the associated estimated system effects. The performance engine 918 can communicate with the communication engine 912, the access control engine 914, the performance engine 918, the generative model engine 920, and/or other components associated with the network 950 (e.g., the data node 904 and/or the third-party databases 908a-908n).

The generative model engine 920 can execute tasks relating to machine learning inference (e.g., natural language generation based on a generative machine learning model, such as an LLM). The generative model engine 920 can include software components (e.g., one or more LLMs, and/or API calls to devices associated with such LLMs), hardware components, and/or a combination thereof. To illustrate, the generative model engine 920 can provide users' prompts to a requested, selected, or determined model (e.g., LLM) to generate a resulting output (e.g., to a user's query within the prompt). As such, the generative model engine 920 enables flexible, configurable generation of data (e.g., text, code, or other suitable information) based on user input, thereby improving the flexibility of software development or other such tasks. The generative model engine 920 can communicate with the communication engine 912, the access control engine 914, the performance engine 918, the generative model engine 920, and/or other components associated with the network 950 (e.g., the data node 904 and/or the third-party databases 908a-908n).

Engines, subsystems, or other components of the data generation platform 902 are illustrative. As such, operations, subcomponents, or other aspects of particular subsystems of the data generation platform 902 can be distributed, varied, or modified across other engines. In some implementations, particular engines can be deprecated, added, or removed. For example, operations associated with breach mitigation are performed at the performance engine 918 instead of at the breach mitigation engine 916.

Figure 10:
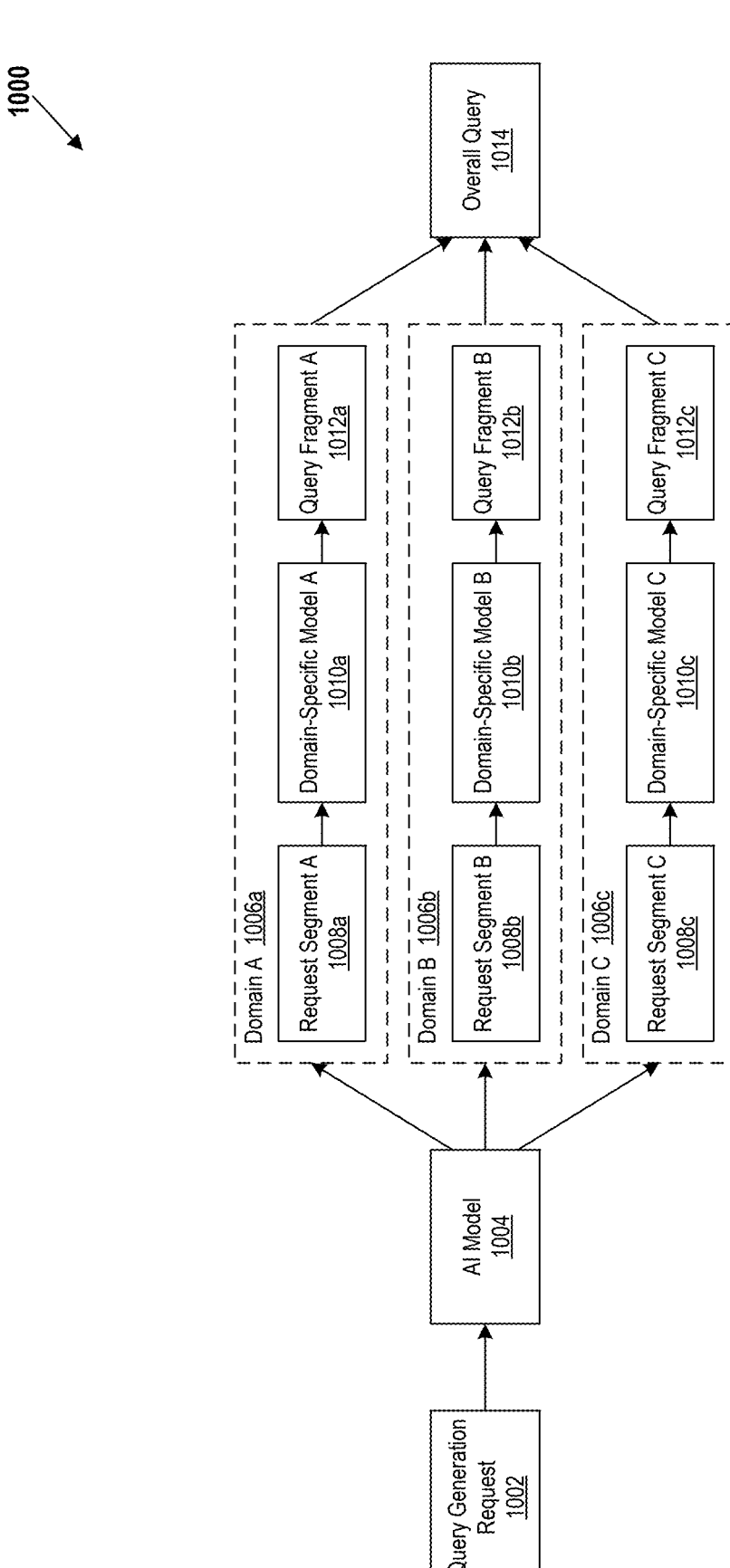
FIG. 10 is a block diagram illustrating an example environment for generating a distributed data query, in accordance with some implementations to the disclosed technology.

Dynamically Selecting Models for Distributed Data Queries Using the Data Generation Platform FIG. 10 is a block diagram illustrating an example environment 1000 for generating a distributed data query, in accordance with some implementations to the disclosed technology. The example environment 1000 includes a query generation request 1002, an AI model 1004, domains 1006, request segments 1008, domain-specific models 1010, query fragments 1012, and overall query 1014. Implementations of example environment 1000 can include different and/or additional components or can be connected in different ways. The environment 1000 includes a query generation request 1002 that is received by an AI model 1004. The query generation request 1002 can include a structured instruction for generation of an output (e.g., a generated query) using an LLM or other artificial intelligence model (i.e., AI model 1004). For example, the query generation request 1002 can be a request to retrieve stored information within certain parameters (e.g., a certain time frame, a certain monetary amount, and so forth), such as "Show me all customer transactions over $10,000 from the last quarter." The AI model 1004 partitions the query generation request 1002 into one or more request segments 1008 (such as a first request segment 1008a, a second request segment 1008b, a third request segment 1008c, and so forth) by mapping them to corresponding domains 1006 (such as a first domain 1006a, a second domain 1006b, a third domain 1006c, and so forth). The request segments 1008 can be portions of the query generation request 1002 that share common domain characteristics. For example, if a query includes retrieving both financial data and customer information, the data generation platform 902 can be segmented into separate components-one segment for the financial domain and another for the customer data domain.

A domain 1006 can indicate a specific data context, such as different departments or areas within an organization, and each can have their own specialized data requirements and compliance rules. For example, domains 1006 can include areas like compliance, finance, and customer data management. Each domain can maintain its own set of databases containing structured and/or unstructured data and operate under specific guidelines (e.g., regulatory requirements, operational constraints, data governance policies) that govern data access and/or processing within that domain. For each domain, there can be a corresponding domain-specific model (such as a first domain-specific model 1010a, a second domain-specific model 1010b, a third domain-specific model 1010c, and so forth).

A domain-specific model 1010 can be a specialized model that has been trained using domain-specific data and can be optimized to process queries within its particular domain. Domain-specific models 1010 can include small language models and/or specialized language models that are trained on domain-specific data such as compliance requirements, financial data, customer information, and so forth. Each domain-specific model generates query fragments 1012 (such as a first query fragment 1012a, a second query fragment 1012b, a third query fragment 1012c, and so forth) for its respective domain.

Each domain-specific model 1010 can be a single model or a suite of models. For example, within each domain-specific model 1010, there can be a set of further specialized models tailored to handle specific tasks or data types. For example, in the banking sector, specialized models can include particular models trained on different subsets of banking data and optimized for different functions (e.g., fraud detection). The specialized models can work together in an end-to-end workflow, where the output of one model serves as the input for the next. Alternatively, a domain-specific model 1010 can include a group of models that operate via majority decision and/or average, where multiple models evaluate the same data, and their outputs are aggregated to determine the final result of the domain-specific model 1010. For example, in a risk assessment domain, several models (same or different) can independently evaluate the risk of a transaction, and the final risk score can be determined based on the majority decision or average of these models.

Query fragments 1012 can include software-related information configured to operate as input in database management systems to retrieve domain-specific data in accordance with domain-specific guidelines. The AI model 1004 can aggregate the individual query fragments 1012 into an overall query 1014. The overall query 1014 can satisfy the guidelines associated with each database across all domains while maintaining compliance with regulatory and organizational standards.

For example, if a query generation request 1002 includes instructions to query customer transaction data across multiple departments, such as "show me all customer transactions over $10,000 from the last quarter with associated risk scores," the AI model 1004 can partition the query generation request 1002 into three distinct segments: one for the banking domain 1006a (to access transaction data), one for the risk assessment domain 1006b (to retrieve risk scores), and one for the compliance domain 1006c (to ensure regulatory requirements are met). Each domain's specialized model can then individually and separately process the segment. For example, the banking domain-specific model 1010a can generate a query fragment 1012a to retrieve the transaction records, the risk assessment domain-specific model 1010b can generate a query fragment 1012b to calculate risk scores, and the compliance domain-specific model 1010c can generate a query fragment 1012c to validate regulatory requirements like anti-money laundering checks. The AI model 1004 can combine the fragments into an overall query 1014 that retrieves the complete dataset specified by the query generation request 1002 while efficiently using system resources and maintaining compliance with each domain's guidelines.

FIG. 11 is a block diagram illustrating an example environment 1100 of a domain-specific model 1104 (e.g., domain-specific models 1010) used for distributed data queries, in accordance with some implementations to the disclosed technology. The example environment 1100 includes a request segment 1102, the domain-specific model 1104, candidate query fragments 1106, estimated metrics 1108, domain-specific training data 1110, domain-specific guidelines 1112, and selected query fragment 1114. Implementations of example environment 1100 can include different and/or additional components or can be connected in different ways.

The request segment 1102 (e.g., the first request segment 1008*a*, the second request segment 1008*b*, the third request segment 1008*c*) can be transmitted to its respective domain-specific model 1104 through a synchronous communication channel. The domain-specific model 1104 can be trained using domain-specific training data 1110. Domain-specific training data 1110 can include data within the domain of the domain-specific model 1104. Domain-specific model 1104 can include models such as credit scoring models, fraud detection algorithms, risk assessment systems, and so forth. The training data enables the domain-specific model 1104 to learn patterns and characteristics associated with compliant and non-compliant behavior within its specific domain. For example, a particular domain-specific model can learn that specific queried information must be anonymized prior to presenting the retrieved information to the user.

Upon receiving a request segment 1102, the domain-specific model 1104 generates one or more candidate query fragments 1106 (shown as candidate query fragment A 1106*a* and candidate query fragment B 1106*b*). Each candidate query fragment can include software-related information configured to operate as input in database management systems to retrieve domain-specific data. For each candidate query fragment, the domain-specific model 1104 can calculate estimated metrics 1108 (shown as estimated metrics A 1108*a* and estimated metrics B 1108*b*). The estimated metrics can include, for example, compliance measurements against domain-specific guidelines 1112, computation speed for query execution, token usage for processing requirements, resource usage for data retrieval, and so forth.

Domain-specific guidelines 1112 can include regulatory requirements and operational constraints that govern data access and processing within the specific domain. The guidelines establish the rules, procedures, and/or standards that are followed when handling data within that domain's context. Domain-specific guidelines 1112 can include, for example, data privacy requirements, access controls, encryption standards, breach notification protocols, data retention policies, authentication procedures, audit requirements, user permission protocols, cybersecurity measures, data governance policies, compliance validation criteria, risk management procedures, transparency requirements, human oversight protocols, and so forth. The guidelines can be derived from external regulatory sources and/or internal organizational policies, serving as benchmarks against which compliance of the query is measured and validated.

Based on the estimated metrics 1108 and compliance with domain-specific guidelines 1112, the domain-specific model 1104 can select a query fragment 1114 from the candidate query fragments 1106. For example, when processing a financial data query, the domain-specific model 1104 can generate multiple candidate query fragments 1106 with different approaches to accessing and joining financial tables. The domain-specific model 1104 can evaluate each candidate's estimated resource usage, processing speed, and compliance with financial regulations before selecting the selected query fragment 1114 that balances performance with regulatory requirements.

FIG. 12 is a flow diagram illustrating an example process of dynamically selecting models for distributed data queries, in accordance with some implementations to the disclosed technology. In some implementations, the example process 1200 is performed by a system including components of the example environment 900 illustrated and described in more detail with reference to FIG. 9. The system can be implemented on a terminal device, on a server, or on a telecom-munications network core. Implementations can include different and/or additional operations or can perform the operations in different orders.

In operation 1202, the data generation platform 902 can obtain an output generation request (e.g., the query generation request 1002 in FIG. 10) including an instruction for generation of an output using an AI model (e.g., an LLM). Examples of output generation requests are discussed in further detail with reference to output query generation request 1002 in FIG. 10. For example, an output generation request can be received via a user interface where users input their queries or instructions directly. The interface can be a web-based application, a mobile app, or a command-line interface, and the output generation request can be in natural language or structured query language. The data generation platform 902 can, in some implementations, obtain output generation requests through API calls from other systems or applications. External systems can programmatically send requests to the data generation platform 902. Additionally, output generation requests can be triggered by scheduled tasks or events. For example, the data generation platform 902 can be configured to automatically generate reports or perform data analysis at specific intervals, such as daily, weekly, or monthly. Event-driven requests can be set up, where certain conditions or triggers within the system initiate the generation of an output. For example, a significant change in market data or a detected anomaly in transaction patterns can prompt the data generation platform 902 to retrieve certain data.

In operation 1204, the data generation platform 902 can partition, using an AI model, the output generation request into one or more segments by associating the output generation request to a set of domains indicating (1) a set of databases and (2) a set of guidelines associated with the set of databases. The components of each segment of the output generation request can share a common domain. The AI model (discussed in further detail with reference to FIG. 10) can include, but is not limited to, LLMs, SVMs, k-nearest neighbor algorithms, decision-making algorithms, linear regression, random forest, naïve Bayes, logistic regression algorithms, or other suitable computational models.

The data generation platform 902 can generate vector representations of the output generation request. The data generation platform 902 can use one or more vector encoding models with transformer architectures, neural network architectures, or other architectures to generate vectors within a vector space representing semantic meaning of request components. The vector representations can be stored in one or more vector databases as numerical arrays capturing semantic relationships.

The data generation platform 902 can map vector representations to domains through one or more techniques, such as vector similarity calculations, pattern recognition across data structures, analysis of data dependencies, evaluation of compliance requirements, assessment of resource patterns, and so forth. For example, K-means or hierarchical clustering can be used to identify patterns and group the data into clusters that represent different domains. Clusters with frequent occurrences of the same terms can be mapped to corresponding domains. Further, the data generation platform 902 can compare vector representations by calculating the cosine of the angle between vectors to determine their directional similarity. For comparing textual elements, the data generation platform 902 can measure the intersection over the union of word sets in the expected (e.g., within a domain) and case-specific (e.g., within the output generation request) representations. The data generation platform 902 can identify specific patterns, keywords, or formats indicative of domain-specific information. In some implementations, the data generation platform 902 can use graph databases to represent relationships between vectors as nodes and edges to model interdependencies between domains.

In operation 1206, the data generation platform 902 can route each of the one or more segments to a set of domain-specific models (e.g., SLMs). Each domain-specific model can share the same domain as corresponding routed segments. Further, each domain-specific model can be trained using training data associated with the domain of the domain-specific model. The data generation platform 902 can transmit each segment to its respective domain-specific model through a synchronous communication channel. The data generation platform 902 can use various communication protocols, such as HTTP, gRPC, or WebSockets to establish this channel, depending on the system architecture and requirements. In some implementations, the data generation platform 902 can use different communication channels depending on different domains. For example, different domains may have different guidelines (e.g., encryption standards).

In operation 1208, the data generation platform 902 can generate, using the set of domain-specific models, a query fragment for each domain-specific model by using (e.g., by comparing) (1) a set of performance metric values associated with using the query fragment to retrieve domain-specific data from the set of databases and/or (2) a set of system resource metric values indicating an estimated usage of system resources (e.g., hardware resources, software resources, network resources, and so forth) to retrieve the domain-specific data using the query fragment. The query fragment can operate as an input in the set of databases to retrieve the domain-specific data in accordance with the set of guidelines of the domain. In some implementations, the data generation platform 902 can generate the query fragment by retrieving the domain-specific data from departmental databases, data lakes, and/or storage systems via, for example, a set of API calls and/or a set of direct database queries. The data generation platform 902 can generate the query fragments by measuring performance metrics including a compound value based on, for example, compliance, computation speed, resource usage, number of tokens, computation speed associated with query execution, resource allocation associated with data retrieval, compliance validation results, and/or accuracy.

Further, the data generation platform 902 can measure specific user features such as explicit user requests, inferred autonomy preferences, and/or skill level. The data generation platform 902 can modify at least one domain-specific model based on the performance metrics and specific user features. For example, the data generation platform 902 can track how users interact with the system, the types of queries they submit, and the complexity of their requests. By observing these interactions, the data generation platform 902 can infer whether a user is highly experienced or relatively new to the system. For more experienced users, the data generation platform 902 can adopt a less intrusive approach, providing them with the flexibility to explore and execute queries independently. These users may prefer minimal guidance and more control over the data retrieval process. The data generation platform 902 can adjust the domain-specific models to offer more customizable options or parameters in the generated query. Conversely, for less experienced users, the data generation platform 902 can take a more supportive role by automatically executing programmatic workflows and/or providing step-by-step guidance. For example, if a user frequently submits basic queries or requests assistance, the data generation platform 902 can infer that the user may benefit from additional support and can simplify the query process, offer more predefined templates, and/or automate routine tasks.

In operation 1210, the data generation platform 902 can aggregate, using the AI model, the query fragments into an overall query configured to satisfy the set of guidelines associated with each database of the set of domains. To resolve interdependencies between the fragments, the data generation platform 902 can map out the dependencies between the query fragments, identifying which fragments rely on data from other fragments and determining the order in which the fragments should be executed. For example, if a fragment retrieving customer details is required before retrieving transaction data, the data generation platform 902 can ensure that the customer details fragment is executed first. The data generation platform 902 can resolve conflicts that arise during the aggregation process (e.g., when fragments have overlapping data or when there are discrepancies between the data retrieved by different fragments). The data generation platform 902 can use predefined rules and guidelines to address these conflicts. For example, if two fragments retrieve different versions of the same data, the data generation platform 902 can use the most recent version.

The data generation platform 902 can validate that each query fragment adheres to the set of guidelines of the domain (which can be predetermined) before aggregating the query fragments. The data generation platform 902 can perform a set of compliance checks to validate that the overall query satisfies the set of guidelines. In some implementations, the data generation platform 902 can present the overall query to a user via a user interface configured to receive a user input indicating an acceptance or a denial of the overall query. The data generation platform 902 can associate each query fragment with compliance validation data indicating a degree of compliance of the query fragment with the set of guidelines and transmit each query fragment to the AI model through a communication channel. The data generation platform 902 can integrate the query fragments into the overall query based on interdependencies between the query fragments. In some implementations, the data generation platform 902 can detect a set of interdependencies between the query fragments and validate the overall query against the set of interdependencies.

In some implementations, the data generation platform 902 can input, into a computer program, the overall query to receive a set of requested data in accordance with the instruction of the output generation request. For example, the data generation platform 902 can input the overall query into computer programs through API calls to domain-specific services, direct database queries using structured query language (SQL), or interfaces with storage systems using defined protocols.

The data generation platform 902 can obtain a user-requested query. When processing user-requested queries, the platform can establish authority scores by evaluating historical actions, analyzing transaction amounts, and assessing hardware system interactions. Resource differences can be calculated by comparing computation speed, resource allocation requirements, and compliance validation results. The data generation platform 902 can establish a first score quantifying an authority of the user-requested query and establish a second score quantifying resource differences between the user-requested query and the overall query. The data generation platform 902 can select either the overall query or the user-requested query based on the first score and the second score. In some implementations, the data generation platform 902 can detect a set of conflicts between a user request and the overall query associated with a resource usage difference. In some implementations, the data generation platform 902 can automatically execute one or more actions (e.g., programmatic workflows) based on the resource usage difference exceeding a predefined threshold. The data generation platform 902 can notify a validation agent in response to a conflict between a user-requested query and the overall query.

Figure 13:
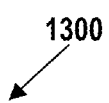
FIG. 13 shows a block diagram showing some of the components typically incorporated in at least some of the computer systems and other devices on which the disclosed system operates, in accordance with some implementations to the disclosed technology.

The data generation platform 902 can detect a focus area of a user based on historical queries and generate context-specific recommendations based on the focus area. In some implementations, the data generation platform 902 can detect a set of data patterns across multiple data warehouses and generate a set of query recommendations based on the detected set of data patterns. In some implementations, the data generation platform 902 can automatically execute a set of programmatic workflows based on a degree of user experience. For example, for a user that generates daily reports, the data generation platform 902 can automate this workflow by scheduling the report generation at the end of each day, automatically retrieving the relevant data, and sending the report to the user's email. This reduces the user's workload and ensures that they receive timely and accurate information without having to manually execute the queries. Suitable Computing Environments of the Data Generation Platform FIG. 13 shows a block diagram showing some of the components typically incorporated in at least some of the computer systems and other devices 1300 on which the disclosed system (e.g., the data generation platform 902) operates, in accordance with some implementations to the disclosed technology. In various implementations, these computer systems and other device(s) 1300 can include server computer systems, desktop computer systems, laptop computer systems, netbooks, mobile phones, personal digital assistants, televisions, cameras, automobile computers, electronic media players, web services, mobile devices, watches, wearables, glasses, smartphones, tablets, smart displays, virtual reality devices, augmented reality devices, etc. In various implementations, the computer systems and devices include zero or more of each of the following: input components 1304, including keyboards, microphones, image sensors, touch screens, buttons, track pads, mice, compact disc (CD) drives, digital video disc (DVD) drives, 3.5 mm input jack, High-Definition Multimedia Interface (HDMI) input connections, Video Graphics Array (VGA) input connections, Universal Serial Bus (USB) input connections, or other computing input components; output components 1306, including display screens (e.g., liquid crystal displays (LCDs), organic light-emitting diodes (OLEDs), cathode ray tubes (CRTs), etc.), speakers, 3.5 mm output jack, lights, light emitting diodes (LEDs), haptic motors, or other output-related components; processor(s) 1308, including a CPU for executing computer programs, a GPU for executing computer graphic programs and handling computing graphical elements; storage(s) 1310, including at least one computer memory for storing programs (e.g., application(s) 1312a-n, model(s) 1314a-n, and other programs) and data while they are being used, including the facility and associated data, an operating system including a kernel, and device drivers; a network connection component(s) 1316 for the computer system to communicate with other computer systems and to send and/or receive data, such as via the Internet or another network and its networking hardware, such as switches, routers, repeaters, electrical cables and optical fibers, light emitters and receivers, radio transmitters and receivers, and the like; a persistent storage(s) device 1318, such as a hard drive or flash drive for persistently storing programs and data; and computer-readable media drives 1320 (e.g., at least one non-transitory computer-readable medium) that are tangible storage means that do not include a transitory, propagating signal, such as a floppy, CD-ROM, or DVD drive, for reading programs and data stored on a computer-readable medium. While computer systems configured as described above are typically used to support the operation of the facility, those skilled in the art will appreciate that the facility can be implemented using devices of various types and configurations and having various components.

Figure 14:
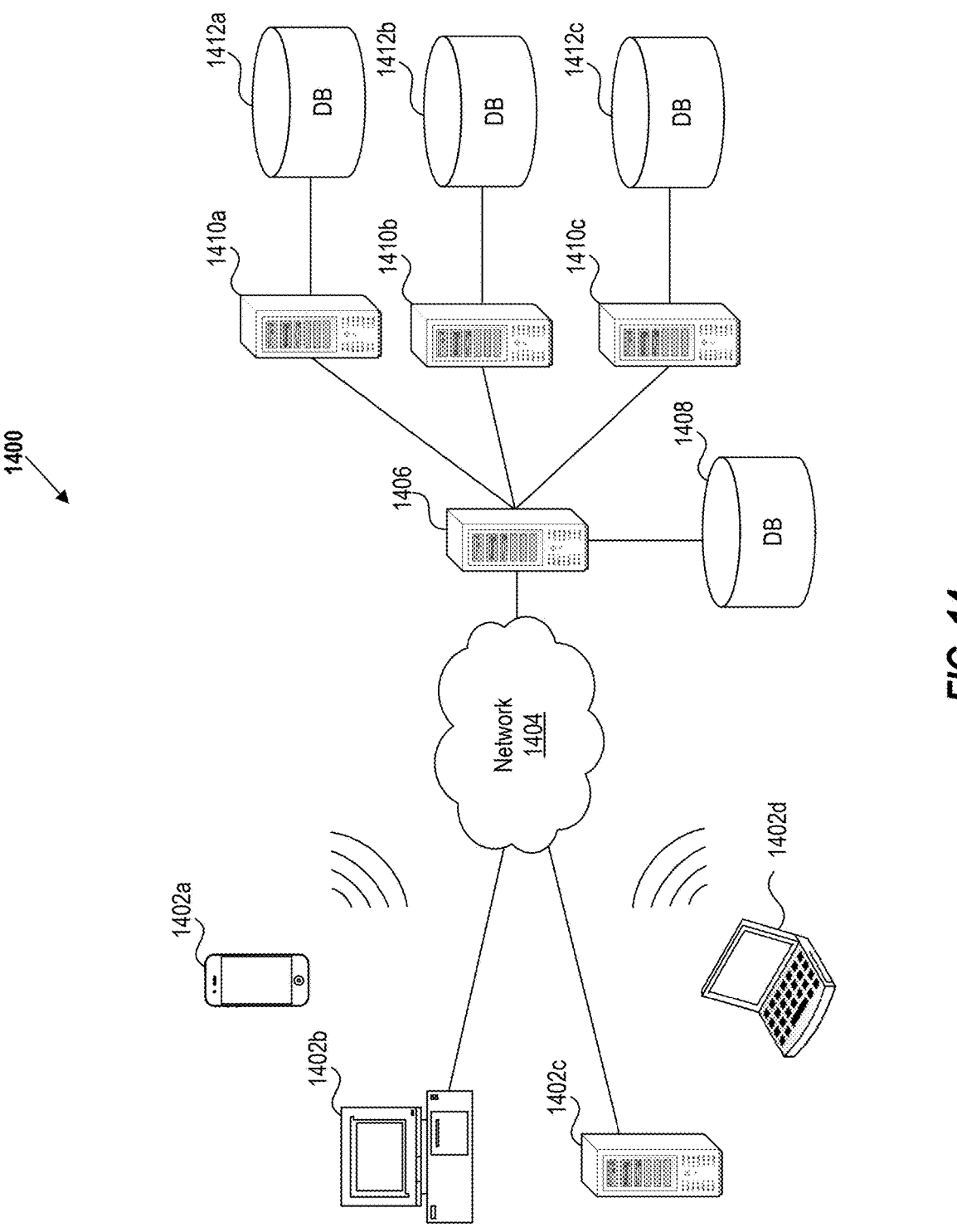
FIG. 14 is a system diagram illustrating an example of a computing environment in which the disclosed system operates, in accordance with some implementations to the disclosed technology.

FIG. 14 is a system diagram illustrating an example of a computing environment 1400 in which the disclosed system operates, in accordance with some implementations to the disclosed technology. In some implementations, environment 1400 includes one or more client computing devices 1402a-1402d, examples of which can host graphical user interfaces associated with client devices. For example, one or more of the client computing devices 1402a-1402d includes user devices and/or devices associated with services requesting responses to queries from LLMs. Client computing devices 1402 operate in a networked environment using logical connections through network 1404 (e.g., the network 950) to one or more remote computers, such as a server computing device (e.g., a server system housing the data generation platform 902 of FIG. 9). In some implementations, client computing devices 1402 can correspond to device 1300 (FIG. 13).

In some implementations, server computing device 1406 is an edge server that receives client requests and coordinates fulfillment of those requests through other servers, such as server computing devices 1410a-1410c. In some implementations, server computing devices 1406 and 1410 include computing systems. Though each server computing device 1406 and 1410 is displayed logically as a single server, server computing devices can each be a distributed computing environment encompassing multiple computing devices located at the same or at geographically disparate physical locations. In some implementations, each server computing device 1410 corresponds to a group of servers.

Client computing devices 1402 and server computing devices 1406 and 1410 can each act as a server or client to other server or client devices. In some implementations, server computing devices (1406, 1410a-1410c) connect to a corresponding database (1408, 1412a-1412c). For example, the corresponding database includes a database stored within the data node 904 (e.g., a sensitive token database, an event database, or another suitable database). As discussed above, each server computing device 1410 can correspond to a group of servers, and each of these servers can share a database or can have its own database (and/or interface with external databases, such as third-party databases 908a-908n). In addition to information described concerning the data node 904 of FIG. 9, databases 1408 and 1412 can warehouse (e.g., store) other suitable information, such as sensitive or forbidden tokens, user credential data, authentication data, graphical representations, code samples, system policies or other policies, templates, computing languages, data structures, software application identifiers, visual layouts, computing language identifiers, mathematical formulae (e.g., weighted average, weighted sum, or other mathematical formulas), graphical elements (e.g., colors, shapes, text, images, multimedia), system protection mechanisms (e.g., prompt validation model parameters or criteria), software development or data processing architectures, machine learning models, AI models, training data for AI/machine learning models, historical information, or other information.

Though databases 1408 and 1412 are displayed logically as single units, databases 1408 and 1412 can each be a distributed computing environment encompassing multiple computing devices, can be located within their corresponding server, or can be located at the same or at geographically disparate physical locations.

Network 1404 (e.g., corresponding to the network 950) can be a local area network (LAN) or a wide area network (WAN) but can also be other wired or wireless networks. In some implementations, network 1404 is the Internet or some other public or private network. Client computing devices 1402 are connected to network 1404 through a network interface, such as by wired or wireless communication. While the connections between server computing device 1406 and server computing device 1410 are shown as separate connections, these connections can be any kind of LAN, WAN, wired network, or wireless network, including network 1404 or a separate public or private network.

FIG. 15 shows a diagram of an AI model, in accordance with some implementations to the disclosed technology. AI model 1500 is shown. In some implementations, AI model 1500 can be any AI model. In some implementations, AI model 1500 can be part of, or work in conjunction with, server computing device 1406 (FIG. 14). For example, server computing device 1406 can store a computer program that can use information obtained from AI model 1500, provide information to AI model 1500, or communicate with AI model 1500. In other implementations, AI model 1500 can be stored in database 1408 and can be retrieved by server computing device 1406 to execute/process information related to AI model 1500.

In some implementations, AI model 1500 can be a machine learning model 1502. Machine learning model 1502 can include one or more neural networks or other machine learning models. As an example, neural networks can be based on a large collection of neural units (or artificial neurons). Neural networks can loosely mimic the manner in which a biological brain works (e.g., via large clusters of biological neurons connected by axons). Each neural unit of a neural network can be connected with many other neural units of the neural network. Such connections can be enforcing or inhibitory in their effect on the activation state of connected neural units. In some implementations, each individual neural unit can have a summation function that combines the values of all its inputs together. In some implementations, each connection (or the neural unit itself) can have a threshold function such that the signal must surpass the threshold before it propagates to other neural units. These neural network systems can be self-learning and trained, rather than explicitly programmed, and can perform significantly better in certain areas of problem solving, as compared to traditional computer programs. In some implementations, neural networks can include multiple layers (e.g., where a signal path traverses from front layers to back layers). In some implementations, backpropagation techniques can be utilized by the neural networks, where forward stimulation is used to reset weights on the "front" neural units. In some implementations, stimulation and inhibition for neural networks can be more free-flowing, with connections interacting in a more chaotic and complex fashion. As an example, with respect to FIG. 15, machine learning model 1502 can take inputs 1504 and provide outputs 1506.

In one use case, outputs 1506 can be fed back to machine learning model 1502 as input to train machine learning model 1502 (e.g., alone or in conjunction with user indications of the accuracy of outputs 1506, labels associated with the inputs, or other reference feedback information). In another use case, machine learning model 1502 can update its configurations (e.g., weights, biases, or other parameters) based on its assessment of its prediction (e.g., outputs 1506) and reference feedback information (e.g., user indication of accuracy, reference labels, or other information). In another use case, where machine learning model 1502 is a neural network, connection weights can be adjusted to reconcile differences between the neural network's prediction and the reference feedback. In a further use case, one or more neurons (or nodes) of the neural network can require that their respective errors are sent backward through the neural network to them to facilitate the update process (e.g., backpropagation of error). Updates to the connection weights can, for example, be reflective of the magnitude of error propagated backward after a forward pass has been completed. In this way, for example, the machine learning model 1502 can be trained to generate better predictions.

As an example, where the prediction models include a neural network, the neural network can include one or more input layers, hidden layers, and output layers. The input and output layers can respectively include one or more nodes, and the hidden layers can each include a plurality of nodes. When an overall neural network includes multiple portions trained for different objectives, there may or may not be input layers or output layers between the different portions. The neural network can also include different input layers to receive various input data. Also, in differing examples, data can be input to the input layer in various forms, and in various dimensional forms input to respective nodes of the input layer of the neural network. In the neural network, nodes of layers other than the output layer are connected to nodes of a subsequent layer through links for transmitting output signals or information from the current layer to the subsequent layer, for example. The number of the links can correspond to the number of the nodes included in the subsequent layer. For example, in adjacent fully connected layers, each node of a current layer can have a respective link to each node of the subsequent layer, noting that in some examples such full connections can later be pruned or minimized during training or optimization. In a recurrent structure, a node of a layer can be again input to the same node or layer at a subsequent time, while in a bi-directional structure, forward and backward connections can be provided. The links are also referred to as connections or connection weights, referring to the hardware-implemented connections or the corresponding "connection weights" provided by those connections of the neural network. During training and implementation, such connections and connection weights can be selectively implemented, removed, and varied to generate or obtain a resultant neural network that is thereby trained and that can be correspondingly implemented for the trained objective, such as for any of the above example recognition objectives.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples of the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples: alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology not only can include additional elements to those implementations noted above, but also can include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system can vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, either in this application or in a continuing application.

We claim:

1. One or more non-transitory, computer-readable storage medium comprising instructions recorded thereon, wherein the instructions, when executed by at least one data processor of a system, cause the system to:

receive, via an input interface, a query from a user;

determine a plurality of characteristics of the query, the plurality of characteristics comprising: (1) a complexity of the query, (2) a subject matter domain of the query, (3) regulatory constraints for the query, and (4) performance requirements for processing the query;

retrieve, from a model matrix, a plurality of profiles for a plurality of large language models (LLMs), each of the plurality of profiles comprising: (1) performance attributes, (2) resource consumption, and (3) regulatory compliance parameters;

select a particular LLM to process the query by:

applying one or more criteria to balance the resource consumption and the performance attributes of one or more LLMs of the plurality of LLMs with the performance requirements for processing the query;

evaluating regulatory compliance by cross-referencing the regulatory compliance parameters for one or more LLMs against the regulatory constraints for the query;

ranking the plurality of LLMs according to: (1) results of the applying of the one or more criteria and (2) results of the regulatory compliance;

prioritizing LLMs of the plurality of LLMs having successfully processed past queries matching the subject matter domain or the complexity of the query; and selecting a particular LLM of the plurality of LLMs according to selection logic that accounts for the ranking and the prioritizing;

generate a structured, human-readable explanation of the selection of the particular LLM, the structured, human-readable explanation comprising decision factors, rationale for LLM selection, and alternative LLMs considered when selecting the particular LLM; and record, in an immutable audit trail data structure, the selection of the particular LLM and the structured, human-readable explanation, wherein the audit trail data structure is secured to provide tamper-evident recordkeeping.

2. The one or more non-transitory, computer-readable storage medium of claim 1, wherein the instructions for determining the plurality of characteristics of the query further cause the system to:

classify the query into a subject matter domain using a domain classification model, wherein the domain classification model is configured to assign the query to a domain based on one or more features extracted from the query;

analyze the complexity of the query by comparing features of the query against a knowledge base comprising predefined complexity metrics and patterns;

determine the regulatory constraints for the query by invoking a rules engine configured to identify jurisdictional and sector-specific compliance requirements for the query; and determine the performance requirements for the query by analyzing the query using a performance predictor, wherein the performance predictor is configured to assess expected response time, memory requirements, and priority level for processing the query.

3. The one or more non-transitory, computer-readable storage medium of claim 1, wherein the instructions for selecting the particular LLM to process the query further cause the system to:

apply the one or more criteria to compare, for each LLM, the resource consumption and the performance attributes against the performance requirements of the query, wherein the one or more criteria comprise a tradeoff analysis between minimizing computational cost and maximizing response quality;

generate, for the plurality of LLMs, a plurality of scores indicating a degree of fit to the performance requirements of the query while managing resource consumption; and generate a ranking of the plurality of LLMs based on the plurality of scores, wherein the selection of the particular LLM is based at least in part on the ranking.

4. The one or more non-transitory, computer-readable storage medium of claim 1, wherein the instructions for evaluating regulatory compliance by cross-referencing the regulatory compliance parameters for each LLM against the regulatory constraints for the query further cause the system to:

determine, for each of the plurality of profiles for the plurality of LLMs, whether the profile includes a plurality of certifications and authorizations required by the regulatory constraints for the query; and exclude from further consideration any LLM for which the profile lacks at least one of the plurality of certifications and authorizations.

5. The one or more non-transitory, computer-readable storage medium of claim 1, wherein the instructions for generating the structured, human-readable explanation of the selection of the particular LLM further cause the system to:

parse the selection logic used to select the particular LLM to determine a plurality of selection factors;

select, from a plurality of explanation templates, an explanation template having a format corresponding to the plurality of selection factors and a type of the query; and embed, within the explanation template, both the selection logic for selecting the particular LLM and a list of alternative LLMs, each alternative LLM annotated with at least one reason for non-selection.

6. The one or more non-transitory, computer-readable storage medium of claim 1, wherein the instructions for recording in the immutable audit trail data structure further cause the system to:

generate a hash of the structured, human-readable explanation;

record a timestamp in the hash using a secure time server;

encrypt the hash with a cryptographic signature; and transmit the hash to a tamper-evident, append-only log.

7. A method comprising:

receiving a query from a user;

determining a plurality of characteristics of the query, the plurality of characteristics comprising regulatory constraints for the query and performance requirements for processing the query;

retrieving a plurality of profiles for a plurality of models, each of the plurality of profiles comprising: (1) performance attributes, (2) resource consumption, and (3) regulatory compliance parameters;

applying one or more criteria to balance the resource consumption and the performance attributes of each model of the plurality of models with the performance requirements for processing the query;

evaluating regulatory compliance by cross-referencing the regulatory compliance parameters for each model against the regulatory constraints for the query;

selecting a particular model according to: (1) results of the applying of the one or more criteria and (2) results of the regulatory compliance;

generating a structured, human-readable explanation of the selection of the particular model; and recording, in an immutable audit trail data structure, the selection of the particular model and the structured, human-readable explanation.

8. The method of claim 7, wherein determining the plurality of characteristics of the query further comprises:

determining the regulatory constraints for the query by invoking a rules engine configured to identify jurisdictional and sector-specific compliance requirements for the query; and determining the performance requirements for the query by analyzing the query using a performance predictor, wherein the performance predictor is configured to assess expected response time, memory requirements, and priority level for processing the query.

9. The method of claim 7, wherein selecting the particular model to process the query further comprises:

applying the one or more criteria to compare, for each model, the resource consumption and the performance attributes against the performance requirements of the query, wherein the one or more criteria comprise a tradeoff analysis between minimizing computational cost and maximizing response quality;

generating, for the plurality of models, a plurality of scores indicating a degree of fit to the performance requirements of the query while managing resource consumption; and generating a ranking of the plurality of models based on the plurality of scores, wherein the selection of the particular model is based at least in part on the ranking.

10. The method of claim 7, wherein evaluating regulatory compliance by cross-referencing the regulatory compliance parameters for each model against the regulatory constraints for the query further comprises:

determining, for each of the plurality of profiles for the plurality of models, whether the profile includes a plurality of certifications and authorizations required by the regulatory constraints for the query; and excluding from further consideration any model for which the profile lacks at least one of the plurality of certifications and authorizations.

11. The method of claim 7, wherein generating the structured, human-readable explanation of the selection of the particular model further comprises:

determining a plurality of selection factors for selecting the particular model;

selecting, from a plurality of explanation templates, an explanation template having a format corresponding to the plurality of selection factors and a type of the query; and embedding, within the explanation template, both the plurality of selection factors for selecting the particular model and a list of alternative models, each alternative model annotated with at least one reason for non-selection.

12. The method of claim 7, wherein recording in the immutable audit trail data structure further comprises:

generating a hash of the structured, human-readable explanation;

recording a timestamp in the hash using a secure time server;

encrypting the hash with a cryptographic signature; and transmitting the hash to a tamper-evident, append-only log.

13. The method of claim 7, wherein the plurality of characteristics further comprise a complexity of the query and a subject matter domain of the query, further comprising:

prioritizing models of the plurality of models having successfully processed past queries matching the subject matter domain or the complexity of the query; and selecting the particular model of the plurality of models further based on the prioritizing.

14. A system comprising:

a storage device; and one or more processors communicatively coupled to the storage device storing instructions thereon, that cause the one or more processors to:

receive a request from a user;

determine a plurality of characteristics of the request, the plurality of characteristics comprising regulatory constraints for the request and performance requirements for processing the request;

retrieve one or more profiles for one or more models, each of the one or more profiles comprising: (1) performance attributes, (2) resource consumption, and (3) regulatory compliance parameters;

apply one or more criteria relating to the resource consumption and the performance attributes of the one or more models and the performance requirements for processing the request;

evaluate regulatory compliance by cross-referencing the regulatory compliance parameters for each model against the regulatory constraints for the request;

select a particular model according to: (1) results of the applying of the one or more criteria and (2) results of the regulatory compliance;

generate a structured, human-readable explanation of the selection of the particular model; and record, in an immutable audit trail data structure, the selection of the particular model and the structured, human-readable explanation.

15. The system of claim 14, wherein the instructions for determining the plurality of characteristics of the request further cause the one or more processors to:

determine the regulatory constraints for the request by invoking a rules engine configured to identify jurisdictional and sector-specific compliance requirements for the request; and determine the performance requirements for the request by analyzing the request using a performance predictor, wherein the performance predictor is configured to assess expected response time, memory requirements, and priority level for processing the request.

16. The system of claim 14, wherein the instructions for selecting the particular model to process the request further cause the one or more processors to:

apply the one or more criteria to compare, for each model, the resource consumption and the performance attributes against the performance requirements of the request, wherein the one or more criteria comprise a tradeoff analysis between minimizing computational cost and maximizing response quality;

generate, for the one or more models, a one or more scores indicating a degree of fit to the performance requirements of the request while managing resource consumption; and generate a ranking of the one or more models based on the one or more scores, wherein the selection of the particular model is based at least in part on the ranking.

17. The system of claim 14, wherein the instructions for evaluating regulatory compliance by cross-referencing the regulatory compliance parameters for each model against the regulatory constraints for the request further cause the one or more processors to:

determine, for each of the one or profiles for the one or more models, whether the profile includes a plurality of certifications and authorizations required by the regulatory constraints for the request; and exclude from further consideration any model for which the profile lacks at least one of the plurality of certifications and authorizations.

18. The system of claim 14, wherein the instructions for generating the structured, human-readable explanation of the selection of the particular model further cause the one or more processors to:

determine a plurality of selection factors for selecting the particular model;

select, from a plurality of explanation templates, an explanation template having a format corresponding to the plurality of selection factors and a type of the request; and embed, within the explanation template, both the plurality of selection factors for selecting the particular model and a list of alternative models, each alternative model annotated with at least one reason for non-selection.

19. The system of claim 14, wherein the instructions for recording in the immutable audit trail data structure further cause the one or more processors to:

generate a hash of the structured, human-readable explanation;

record a timestamp in the hash using a secure time server;

encrypt the hash with a cryptographic signature; and transmit the hash to a tamper-evident, append-only log.

20. The system of claim 14, wherein the plurality of characteristics further comprise a complexity of the request and a subject matter domain of the request, and wherein the instructions further cause the one or more processors to:

prioritize models of the one or more models having successfully processed past queries matching the subject matter domain or the complexity of the request; and select the particular model of the one or more models further based on the prioritizing.

* * * * *